US012593324B2

(12) United States Patent
Sevindik

(10) Patent No.: US 12,593,324 B2
(45) Date of Patent: Mar. 31, 2026

(54) METHODS AND APPARATUS FOR COORDINATING DATA TRANSMISSION IN A COMMUNICATIONS NETWORK

(71) Applicant: Charter Communications Operating, LLC, St. Louis, MO (US)

(72) Inventor: Volkan Sevindik, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 959 days.

(21) Appl. No.: 17/528,109

(22) Filed: Nov. 16, 2021

(65) Prior Publication Data

US 2023/0156686 A1    May 18, 2023

(51) Int. Cl.

| | |
|---|---|
| *H04W 88/12* | (2009.01) |
| *H04B 7/0413* | (2017.01) |
| *H04L 12/28* | (2006.01) |
| *H04W 72/12* | (2023.01) |

(52) U.S. Cl.
CPC .......... *H04W 72/12* (2013.01); *H04B 7/0413* (2013.01); *H04L 12/2801* (2013.01); *H04W 88/12* (2013.01)

(58) Field of Classification Search
CPC ... H04W 72/12; H04W 88/12; H04W 72/046; H04B 7/0413; H04L 12/2801
See application file for complete search history.

(56) References Cited

U.S. PATENT DOCUMENTS

| | | | | |
|---|---|---|---|---|
| 8,774,217 B2 * | 7/2014 | Chapman | ........... | H04N 21/6168 |
| | | | | 370/282 |
| 9,525,610 B2 | 12/2016 | Radulescu et al. | | |
| 9,838,268 B1 | 12/2017 | Mattson | | |
| 10,340,976 B2 | 7/2019 | Kakinada et al. | | |
| 10,523,577 B2 | 12/2019 | White et al. | | |
| 10,944,684 B2 | 3/2021 | White et al. | | |
| 11,510,173 B2 * | 11/2022 | Priyanto | ............... | G01S 5/0215 |
| 2014/0092877 A1 * | 4/2014 | Kazmi | .................. | H04W 52/36 |
| | | | | 370/336 |
| 2014/0241377 A1 * | 8/2014 | Pantelias | ............. | H04L 27/2602 |
| | | | | 370/449 |
| 2016/0248600 A1 * | 8/2016 | Bernstein | ............ | H04L 41/0672 |
| 2017/0331670 A1 * | 11/2017 | Parkvall | .............. | H04W 52/028 |
| 2017/0366983 A1 * | 12/2017 | Gunasekara | ........ | H04L 43/0811 |

(Continued)

FOREIGN PATENT DOCUMENTS

| | | |
|---|---|---|
| EP | 3515111 A1 | 7/2019 |
| EP | 2629456 B1 | 8/2019 |

*Primary Examiner* — Jay P Patel
*Assistant Examiner* — Shehab A Alawdi
(74) *Attorney, Agent, or Firm* — Straub & Straub; Stephen T. Straub; Michael P. Straub

(57) ABSTRACT

The presentation invention relates to methods and apparatus for coordinating the transmission of data in a communications network. An exemplary method in accordance with an embodiment of the present invention includes the steps of: transmitting data from a cable modem termination system to a wireless base station receiving, at a cable modem termination system (CMTS), wireless base station multiple input multiple output (MIMO) information; and determining, at the CMTS, a data transmission schedule for transmitting data to a plurality of cable modems connected to the CMTS based on the received wireless base station MIMO information.

20 Claims, 25 Drawing Sheets

(56) References Cited

U.S. PATENT DOCUMENTS

| 2019/0037418 A1* | 1/2019 | Gunasekara | .......... | H04W 52/40 |
| 2019/0058999 A1 | 2/2019 | Gunasekara et al. | | |
| 2019/0215732 A1* | 7/2019 | Andreoli-Fang | ..... | H04W 28/26 |
| 2019/0288760 A1* | 9/2019 | Li | ........................ | H04B 7/0634 |
| 2022/0060346 A1* | 2/2022 | Sevindik | ............ | H04L 12/2801 |
| 2023/0082569 A1* | 3/2023 | Sevindik | ............ | H04L 27/2646 |
| | | | | 370/329 |

* cited by examiner

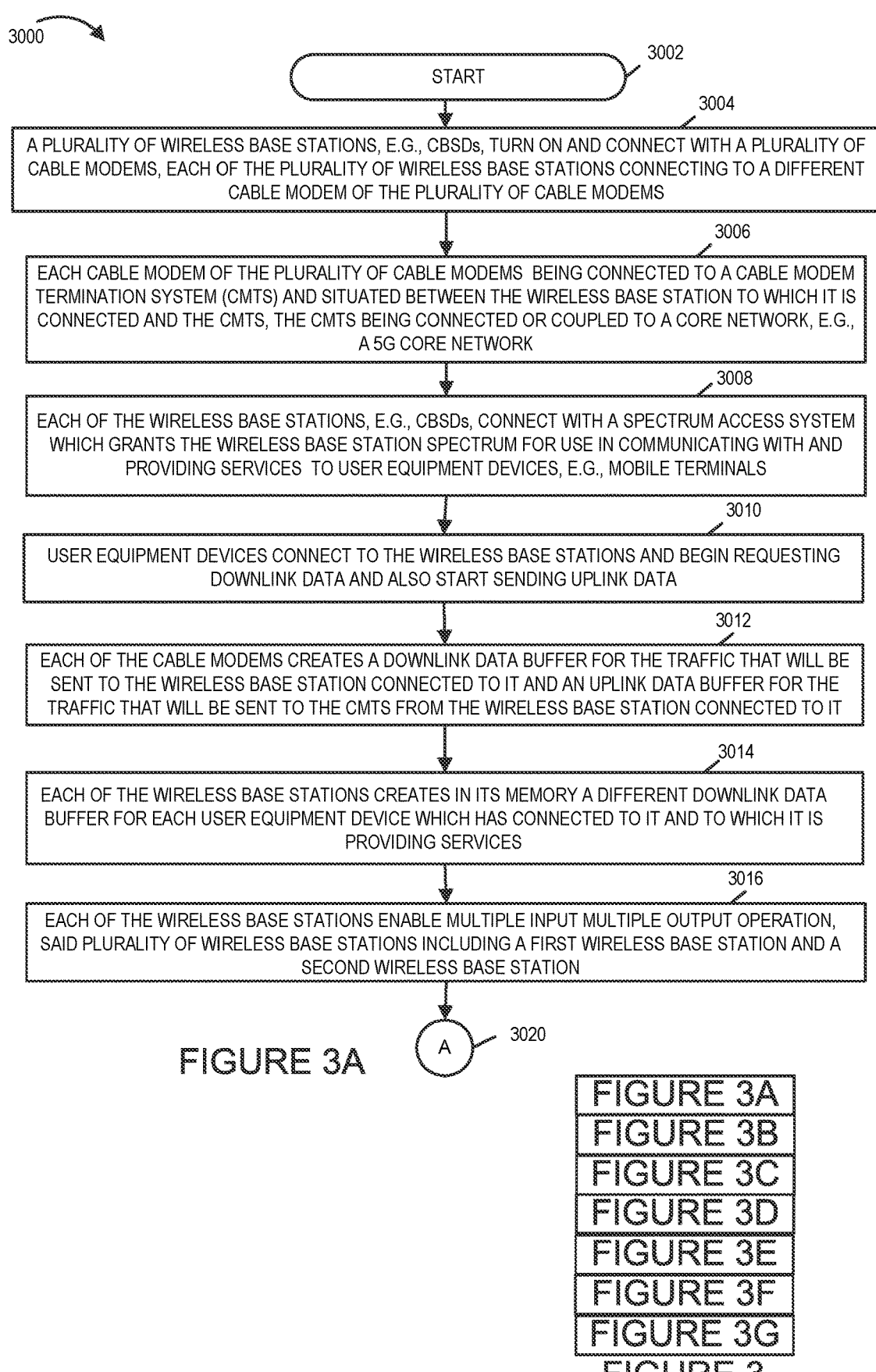

3000

3002
START

3004
A PLURALITY OF WIRELESS BASE STATIONS, E.G., CBSDs, TURN ON AND CONNECT WITH A PLURALITY OF CABLE MODEMS, EACH OF THE PLURALITY OF WIRELESS BASE STATIONS CONNECTING TO A DIFFERENT CABLE MODEM OF THE PLURALITY OF CABLE MODEMS

3006
EACH CABLE MODEM OF THE PLURALITY OF CABLE MODEMS BEING CONNECTED TO A CABLE MODEM TERMINATION SYSTEM (CMTS) AND SITUATED BETWEEN THE WIRELESS BASE STATION TO WHICH IT IS CONNECTED AND THE CMTS, THE CMTS BEING CONNECTED OR COUPLED TO A CORE NETWORK, E.G., A 5G CORE NETWORK

3008
EACH OF THE WIRELESS BASE STATIONS, E.G., CBSDs, CONNECT WITH A SPECTRUM ACCESS SYSTEM WHICH GRANTS THE WIRELESS BASE STATION SPECTRUM FOR USE IN COMMUNICATING WITH AND PROVIDING SERVICES TO USER EQUIPMENT DEVICES, E.G., MOBILE TERMINALS

3010
USER EQUIPMENT DEVICES CONNECT TO THE WIRELESS BASE STATIONS AND BEGIN REQUESTING DOWNLINK DATA AND ALSO START SENDING UPLINK DATA

3012
EACH OF THE CABLE MODEMS CREATES A DOWNLINK DATA BUFFER FOR THE TRAFFIC THAT WILL BE SENT TO THE WIRELESS BASE STATION CONNECTED TO IT AND AN UPLINK DATA BUFFER FOR THE TRAFFIC THAT WILL BE SENT TO THE CMTS FROM THE WIRELESS BASE STATION CONNECTED TO IT

3014
EACH OF THE WIRELESS BASE STATIONS CREATES IN ITS MEMORY A DIFFERENT DOWNLINK DATA BUFFER FOR EACH USER EQUIPMENT DEVICE WHICH HAS CONNECTED TO IT AND TO WHICH IT IS PROVIDING SERVICES

3016
EACH OF THE WIRELESS BASE STATIONS ENABLE MULTIPLE INPUT MULTIPLE OUTPUT OPERATION, SAID PLURALITY OF WIRELESS BASE STATIONS INCLUDING A FIRST WIRELESS BASE STATION AND A SECOND WIRELESS BASE STATION

| FIGURE 3A |
| FIGURE 3B |
| FIGURE 3C |
| FIGURE 3D |
| FIGURE 3E |
| FIGURE 3F |
| FIGURE 3G |

EACH OF THE WIRELESS BASE STATIONS ASSIGNS A SET OF ANTENNAS FROM THE TOTAL NUMBER OF ANTENNAS AT THE WIRELESS BASE STATION TO EACH USER EQUIPMENT DEVICE TO WHICH IT IS PROVIDING SERVICES

3024

EACH OF THE WIRELESS BASE STATIONS DETERMINES FOR EACH USER EQUIPMENT DEVICE IT IS PROVIDING SERVICES TO THE DOWNLINK DATA REQUIREMENTS OF THE USER EQUIPMENT DEVICE

3026

EACH OF THE WIRELESS BASE STATIONS DETERMINES FOR EACH USER EQUIPMENT DEVICE IT IS PROVIDING SERVICES A SET OF ITS ANTENNAS TO USE FOR COMMUNICATING DOWNLINK DATA, THE SET OF ANTENNAS INCLUDING ALL OF THE ANTENNAS AT THE WIRELESS BASE STATION (E.G., WHEN 1 BEAM USING ALL ANTENNAS IS TO BE FORMED) OR A SUBSET OF THE ANTENNAS AT THE WIRELESS BASE STATION

3028

EACH OF THE WIRELESS BASE STATIONS MAKES THE DETERMINATION OF THE SET OF ANTENNAS TO ASSIGN TO EACH USER EQUIPMENT DEVICE BASED ON THE DOWNLINK DATA REQUIREMENTS OR NEEDS OF THE USER EQUIPMENT DEVICE

3030

EACH OF THE WIRELESS BASE STATIONS ASSIGNS THE DETERMINED SET OF ANTENNAS TO EACH OF THE USER EQUIPMENT DEVICES FOR USE IN TRANSMITTING DOWNLINK DATA TO THE USER EQUIPMENT DEVICE

3032

THE FIRST WIRELESS BASE STATION MAKES A DETERMINATION OF HOW MANY ANTENNAS AND WHICH OF ITS ANTENNAS TO ASSIGN TO A FIRST USER EQUIPMENT DEVICE TO WHICH IT IS PROVIDING SERVICES

3034

THE FIRST WIRELESS BASE STATION ASSIGNS A FIRST SET OF ANTENNAS TO THE FIRST USER EQUIPMENT DEVICE

3036

THE FIRST WIRELESS BASE STATION MAKES A DETERMINATION OF HOW MANY ANTENNAS AND WHICH OF ITS ANTENNAS TO ASSIGN TO A SECOND USER EQUIPMENT DEVICE TO WHICH IT IS PROVIDING SERVICES

3038

THE FIRST WIRELESS BASE STATION ASSIGNS A SECOND SET OF ANTENNAS TO THE SECOND USER EQUIPMENT DEVICE

3040

THE SECOND WIRELESS BASE STATION MAKES A DETERMINATION OF HOW MANY ANTENNAS AND WHICH OF ITS ANTENNAS TO ASSIGN TO A THIRD USER EQUIPMENT DEVICE TO WHICH IT IS PROVIDING SERVICES

3042

THE SECOND WIRELESS BASE STATION ASSIGNS A THIRD SET OF ANTENNAS TO THE THIRD USER EQUIPMENT DEVICE

3044

THE SECOND WIRELESS BASE STATION MAKES A DETERMINATION OF HOW MANY ANTENNAS AND WHICH OF ITS ANTENNAS TO ASSIGN TO A FOURTH USER EQUIPMENT DEVICE TO WHICH IT IS PROVIDING SERVICES

3046

THE SECOND WIRELESS BASE STATION ASSIGNS A FOURTH SET OF ANTENNAS TO THE FOURTH USER EQUIPMENT DEVICE

FIGURE 3B

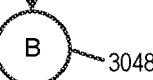

B ~3048

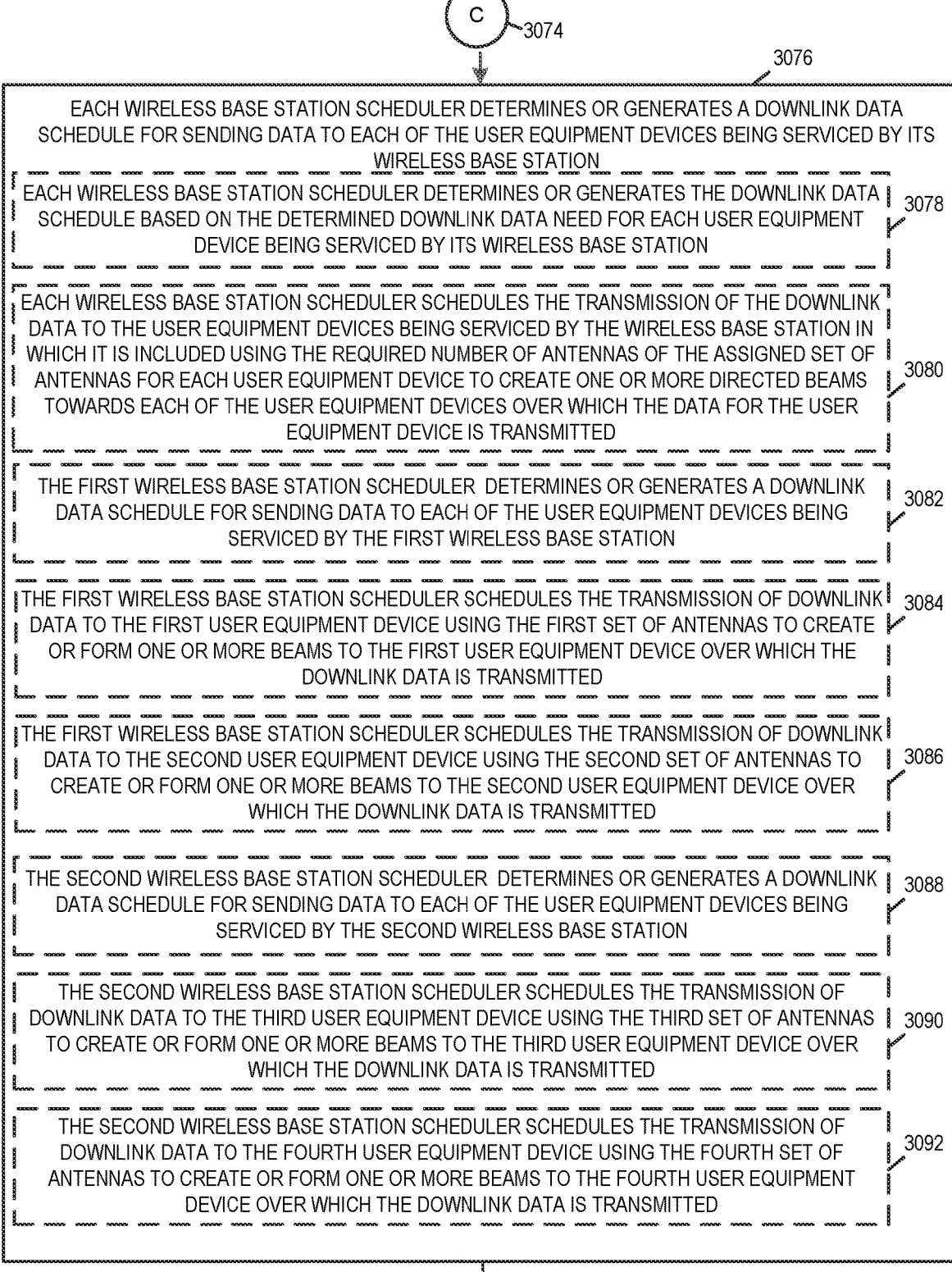

C ~3074

3076

EACH WIRELESS BASE STATION SCHEDULER DETERMINES OR GENERATES A DOWNLINK DATA SCHEDULE FOR SENDING DATA TO EACH OF THE USER EQUIPMENT DEVICES BEING SERVICED BY ITS WIRELESS BASE STATION

EACH WIRELESS BASE STATION SCHEDULER DETERMINES OR GENERATES THE DOWNLINK DATA SCHEDULE BASED ON THE DETERMINED DOWNLINK DATA NEED FOR EACH USER EQUIPMENT DEVICE BEING SERVICED BY ITS WIRELESS BASE STATION    3078

EACH WIRELESS BASE STATION SCHEDULER SCHEDULES THE TRANSMISSION OF THE DOWNLINK DATA TO THE USER EQUIPMENT DEVICES BEING SERVICED BY THE WIRELESS BASE STATION IN WHICH IT IS INCLUDED USING THE REQUIRED NUMBER OF ANTENNAS OF THE ASSIGNED SET OF ANTENNAS FOR EACH USER EQUIPMENT DEVICE TO CREATE ONE OR MORE DIRECTED BEAMS TOWARDS EACH OF THE USER EQUIPMENT DEVICES OVER WHICH THE DATA FOR THE USER EQUIPMENT DEVICE IS TRANSMITTED    3080

THE FIRST WIRELESS BASE STATION SCHEDULER DETERMINES OR GENERATES A DOWNLINK DATA SCHEDULE FOR SENDING DATA TO EACH OF THE USER EQUIPMENT DEVICES BEING SERVICED BY THE FIRST WIRELESS BASE STATION    3082

THE FIRST WIRELESS BASE STATION SCHEDULER SCHEDULES THE TRANSMISSION OF DOWNLINK DATA TO THE FIRST USER EQUIPMENT DEVICE USING THE FIRST SET OF ANTENNAS TO CREATE OR FORM ONE OR MORE BEAMS TO THE FIRST USER EQUIPMENT DEVICE OVER WHICH THE DOWNLINK DATA IS TRANSMITTED    3084

THE FIRST WIRELESS BASE STATION SCHEDULER SCHEDULES THE TRANSMISSION OF DOWNLINK DATA TO THE SECOND USER EQUIPMENT DEVICE USING THE SECOND SET OF ANTENNAS TO CREATE OR FORM ONE OR MORE BEAMS TO THE SECOND USER EQUIPMENT DEVICE OVER WHICH THE DOWNLINK DATA IS TRANSMITTED    3086

THE SECOND WIRELESS BASE STATION SCHEDULER DETERMINES OR GENERATES A DOWNLINK DATA SCHEDULE FOR SENDING DATA TO EACH OF THE USER EQUIPMENT DEVICES BEING SERVICED BY THE SECOND WIRELESS BASE STATION    3088

THE SECOND WIRELESS BASE STATION SCHEDULER SCHEDULES THE TRANSMISSION OF DOWNLINK DATA TO THE THIRD USER EQUIPMENT DEVICE USING THE THIRD SET OF ANTENNAS TO CREATE OR FORM ONE OR MORE BEAMS TO THE THIRD USER EQUIPMENT DEVICE OVER WHICH THE DOWNLINK DATA IS TRANSMITTED    3090

THE SECOND WIRELESS BASE STATION SCHEDULER SCHEDULES THE TRANSMISSION OF DOWNLINK DATA TO THE FOURTH USER EQUIPMENT DEVICE USING THE FOURTH SET OF ANTENNAS TO CREATE OR FORM ONE OR MORE BEAMS TO THE FOURTH USER EQUIPMENT DEVICE OVER WHICH THE DOWNLINK DATA IS TRANSMITTED    3092

D ~3094    FIGURE 3D

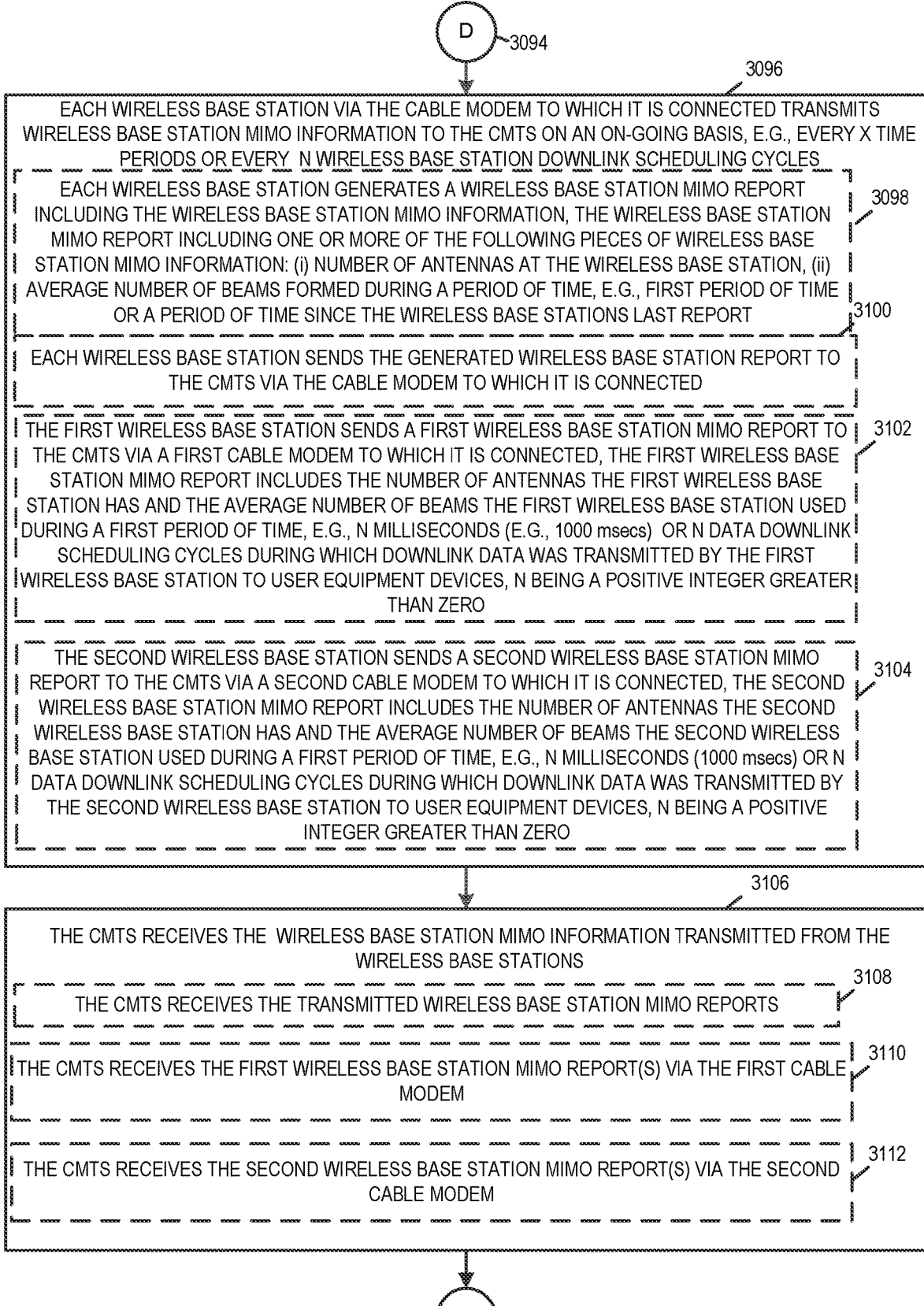

D 3094

3096

EACH WIRELESS BASE STATION VIA THE CABLE MODEM TO WHICH IT IS CONNECTED TRANSMITS WIRELESS BASE STATION MIMO INFORMATION TO THE CMTS ON AN ON-GOING BASIS, E.G., EVERY X TIME PERIODS OR EVERY N WIRELESS BASE STATION DOWNLINK SCHEDULING CYCLES

EACH WIRELESS BASE STATION GENERATES A WIRELESS BASE STATION MIMO REPORT INCLUDING THE WIRELESS BASE STATION MIMO INFORMATION, THE WIRELESS BASE STATION MIMO REPORT INCLUDING ONE OR MORE OF THE FOLLOWING PIECES OF WIRELESS BASE STATION MIMO INFORMATION: (i) NUMBER OF ANTENNAS AT THE WIRELESS BASE STATION, (ii) AVERAGE NUMBER OF BEAMS FORMED DURING A PERIOD OF TIME, E.G., FIRST PERIOD OF TIME OR A PERIOD OF TIME SINCE THE WIRELESS BASE STATIONS LAST REPORT    3098

3100

EACH WIRELESS BASE STATION SENDS THE GENERATED WIRELESS BASE STATION REPORT TO THE CMTS VIA THE CABLE MODEM TO WHICH IT IS CONNECTED

THE FIRST WIRELESS BASE STATION SENDS A FIRST WIRELESS BASE STATION MIMO REPORT TO THE CMTS VIA A FIRST CABLE MODEM TO WHICH IT IS CONNECTED, THE FIRST WIRELESS BASE STATION MIMO REPORT INCLUDES THE NUMBER OF ANTENNAS THE FIRST WIRELESS BASE STATION HAS AND THE AVERAGE NUMBER OF BEAMS THE FIRST WIRELESS BASE STATION USED DURING A FIRST PERIOD OF TIME, E.G., N MILLISECONDS (E.G., 1000 msecs) OR N DATA DOWNLINK SCHEDULING CYCLES DURING WHICH DOWNLINK DATA WAS TRANSMITTED BY THE FIRST WIRELESS BASE STATION TO USER EQUIPMENT DEVICES, N BEING A POSITIVE INTEGER GREATER THAN ZERO    3102

THE SECOND WIRELESS BASE STATION SENDS A SECOND WIRELESS BASE STATION MIMO REPORT TO THE CMTS VIA A SECOND CABLE MODEM TO WHICH IT IS CONNECTED, THE SECOND WIRELESS BASE STATION MIMO REPORT INCLUDES THE NUMBER OF ANTENNAS THE SECOND WIRELESS BASE STATION HAS AND THE AVERAGE NUMBER OF BEAMS THE SECOND WIRELESS BASE STATION USED DURING A FIRST PERIOD OF TIME, E.G., N MILLISECONDS (1000 msecs) OR N DATA DOWNLINK SCHEDULING CYCLES DURING WHICH DOWNLINK DATA WAS TRANSMITTED BY THE SECOND WIRELESS BASE STATION TO USER EQUIPMENT DEVICES, N BEING A POSITIVE INTEGER GREATER THAN ZERO    3104

3106

THE CMTS RECEIVES THE WIRELESS BASE STATION MIMO INFORMATION TRANSMITTED FROM THE WIRELESS BASE STATIONS

THE CMTS RECEIVES THE TRANSMITTED WIRELESS BASE STATION MIMO REPORTS    3108

THE CMTS RECEIVES THE FIRST WIRELESS BASE STATION MIMO REPORT(S) VIA THE FIRST CABLE MODEM    3110

THE CMTS RECEIVES THE SECOND WIRELESS BASE STATION MIMO REPORT(S) VIA THE SECOND CABLE MODEM    3112

E 3114    FIGURE 3E

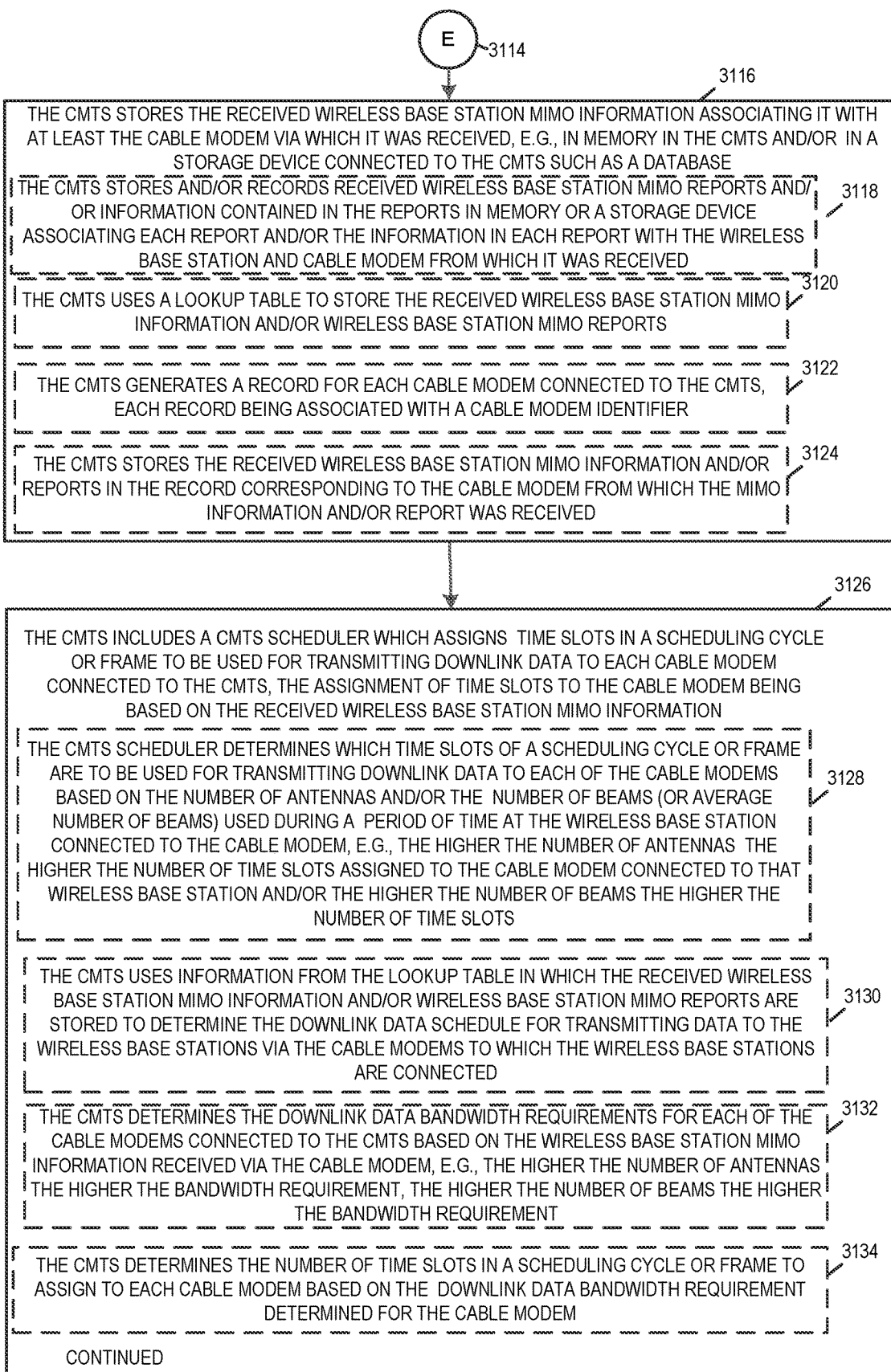

E ～3114

3116

THE CMTS STORES THE RECEIVED WIRELESS BASE STATION MIMO INFORMATION ASSOCIATING IT WITH AT LEAST THE CABLE MODEM VIA WHICH IT WAS RECEIVED, E.G., IN MEMORY IN THE CMTS AND/OR IN A STORAGE DEVICE CONNECTED TO THE CMTS SUCH AS A DATABASE

THE CMTS STORES AND/OR RECORDS RECEIVED WIRELESS BASE STATION MIMO REPORTS AND/ OR INFORMATION CONTAINED IN THE REPORTS IN MEMORY OR A STORAGE DEVICE ASSOCIATING EACH REPORT AND/OR THE INFORMATION IN EACH REPORT WITH THE WIRELESS BASE STATION AND CABLE MODEM FROM WHICH IT WAS RECEIVED        3118

THE CMTS USES A LOOKUP TABLE TO STORE THE RECEIVED WIRELESS BASE STATION MIMO INFORMATION AND/OR WIRELESS BASE STATION MIMO REPORTS        3120

THE CMTS GENERATES A RECORD FOR EACH CABLE MODEM CONNECTED TO THE CMTS, EACH RECORD BEING ASSOCIATED WITH A CABLE MODEM IDENTIFIER        3122

THE CMTS STORES THE RECEIVED WIRELESS BASE STATION MIMO INFORMATION AND/OR REPORTS IN THE RECORD CORRESPONDING TO THE CABLE MODEM FROM WHICH THE MIMO INFORMATION AND/OR REPORT WAS RECEIVED        3124

3126

THE CMTS INCLUDES A CMTS SCHEDULER WHICH ASSIGNS TIME SLOTS IN A SCHEDULING CYCLE OR FRAME TO BE USED FOR TRANSMITTING DOWNLINK DATA TO EACH CABLE MODEM CONNECTED TO THE CMTS, THE ASSIGNMENT OF TIME SLOTS TO THE CABLE MODEM BEING BASED ON THE RECEIVED WIRELESS BASE STATION MIMO INFORMATION

THE CMTS SCHEDULER DETERMINES WHICH TIME SLOTS OF A SCHEDULING CYCLE OR FRAME ARE TO BE USED FOR TRANSMITTING DOWNLINK DATA TO EACH OF THE CABLE MODEMS BASED ON THE NUMBER OF ANTENNAS AND/OR THE NUMBER OF BEAMS (OR AVERAGE NUMBER OF BEAMS) USED DURING A PERIOD OF TIME AT THE WIRELESS BASE STATION CONNECTED TO THE CABLE MODEM, E.G., THE HIGHER THE NUMBER OF ANTENNAS THE HIGHER THE NUMBER OF TIME SLOTS ASSIGNED TO THE CABLE MODEM CONNECTED TO THAT WIRELESS BASE STATION AND/OR THE HIGHER THE NUMBER OF BEAMS THE HIGHER THE NUMBER OF TIME SLOTS        3128

THE CMTS USES INFORMATION FROM THE LOOKUP TABLE IN WHICH THE RECEIVED WIRELESS BASE STATION MIMO INFORMATION AND/OR WIRELESS BASE STATION MIMO REPORTS ARE STORED TO DETERMINE THE DOWNLINK DATA SCHEDULE FOR TRANSMITTING DATA TO THE WIRELESS BASE STATIONS VIA THE CABLE MODEMS TO WHICH THE WIRELESS BASE STATIONS ARE CONNECTED        3130

THE CMTS DETERMINES THE DOWNLINK DATA BANDWIDTH REQUIREMENTS FOR EACH OF THE CABLE MODEMS CONNECTED TO THE CMTS BASED ON THE WIRELESS BASE STATION MIMO INFORMATION RECEIVED VIA THE CABLE MODEM, E.G., THE HIGHER THE NUMBER OF ANTENNAS THE HIGHER THE BANDWIDTH REQUIREMENT, THE HIGHER THE NUMBER OF BEAMS THE HIGHER THE BANDWIDTH REQUIREMENT        3132

THE CMTS DETERMINES THE NUMBER OF TIME SLOTS IN A SCHEDULING CYCLE OR FRAME TO ASSIGN TO EACH CABLE MODEM BASED ON THE DOWNLINK DATA BANDWIDTH REQUIREMENT DETERMINED FOR THE CABLE MODEM        3134

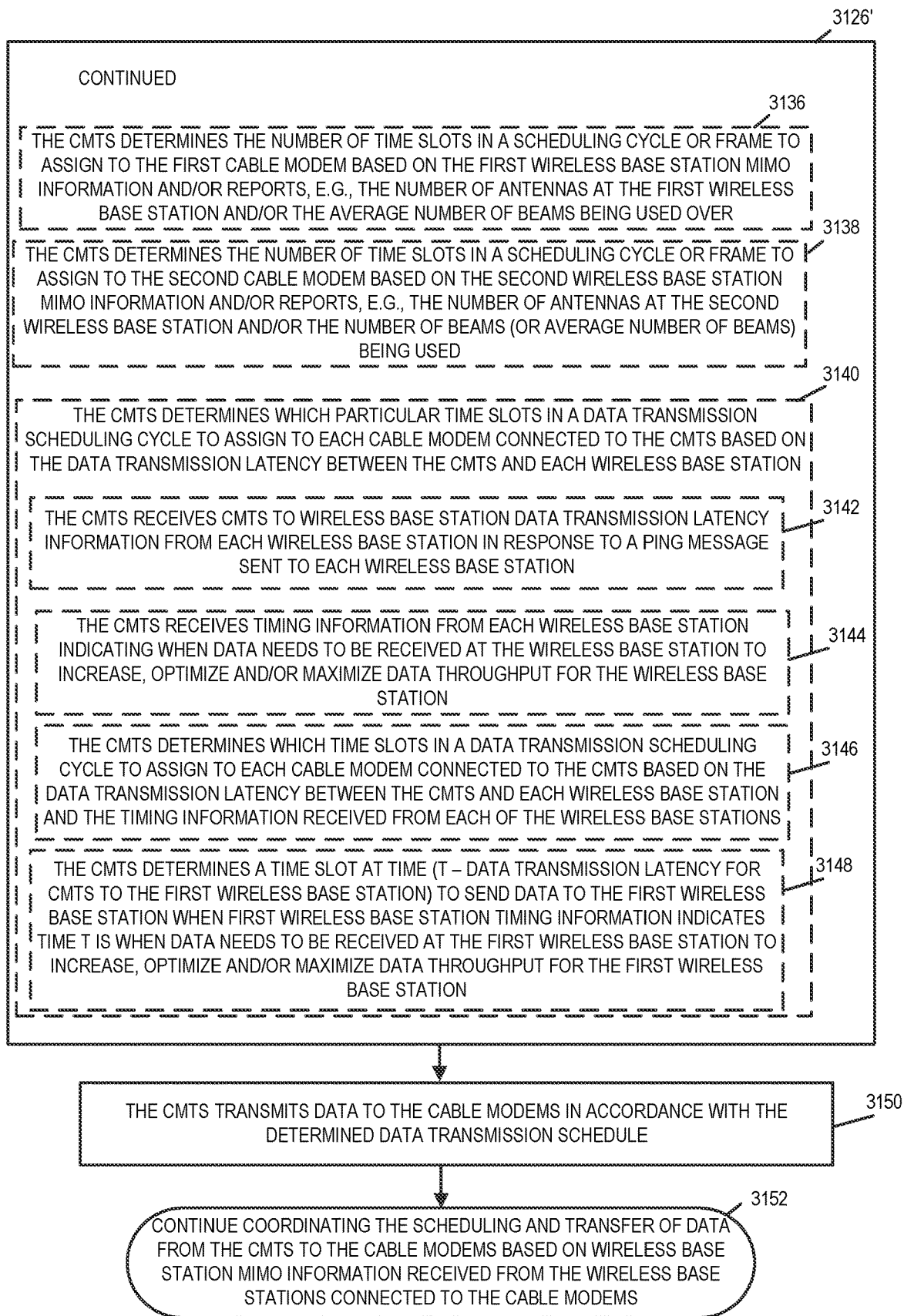

3126'

CONTINUED

3136

THE CMTS DETERMINES THE NUMBER OF TIME SLOTS IN A SCHEDULING CYCLE OR FRAME TO ASSIGN TO THE FIRST CABLE MODEM BASED ON THE FIRST WIRELESS BASE STATION MIMO INFORMATION AND/OR REPORTS, E.G., THE NUMBER OF ANTENNAS AT THE FIRST WIRELESS BASE STATION AND/OR THE AVERAGE NUMBER OF BEAMS BEING USED OVER

3138

THE CMTS DETERMINES THE NUMBER OF TIME SLOTS IN A SCHEDULING CYCLE OR FRAME TO ASSIGN TO THE SECOND CABLE MODEM BASED ON THE SECOND WIRELESS BASE STATION MIMO INFORMATION AND/OR REPORTS, E.G., THE NUMBER OF ANTENNAS AT THE SECOND WIRELESS BASE STATION AND/OR THE NUMBER OF BEAMS (OR AVERAGE NUMBER OF BEAMS) BEING USED

3140

THE CMTS DETERMINES WHICH PARTICULAR TIME SLOTS IN A DATA TRANSMISSION SCHEDULING CYCLE TO ASSIGN TO EACH CABLE MODEM CONNECTED TO THE CMTS BASED ON THE DATA TRANSMISSION LATENCY BETWEEN THE CMTS AND EACH WIRELESS BASE STATION

3142

THE CMTS RECEIVES CMTS TO WIRELESS BASE STATION DATA TRANSMISSION LATENCY INFORMATION FROM EACH WIRELESS BASE STATION IN RESPONSE TO A PING MESSAGE SENT TO EACH WIRELESS BASE STATION

3144

THE CMTS RECEIVES TIMING INFORMATION FROM EACH WIRELESS BASE STATION INDICATING WHEN DATA NEEDS TO BE RECEIVED AT THE WIRELESS BASE STATION TO INCREASE, OPTIMIZE AND/OR MAXIMIZE DATA THROUGHPUT FOR THE WIRELESS BASE STATION

3146

THE CMTS DETERMINES WHICH TIME SLOTS IN A DATA TRANSMISSION SCHEDULING CYCLE TO ASSIGN TO EACH CABLE MODEM CONNECTED TO THE CMTS BASED ON THE DATA TRANSMISSION LATENCY BETWEEN THE CMTS AND EACH WIRELESS BASE STATION AND THE TIMING INFORMATION RECEIVED FROM EACH OF THE WIRELESS BASE STATIONS

3148

THE CMTS DETERMINES A TIME SLOT AT TIME (T – DATA TRANSMISSION LATENCY FOR CMTS TO THE FIRST WIRELESS BASE STATION) TO SEND DATA TO THE FIRST WIRELESS BASE STATION WHEN FIRST WIRELESS BASE STATION TIMING INFORMATION INDICATES TIME T IS WHEN DATA NEEDS TO BE RECEIVED AT THE FIRST WIRELESS BASE STATION TO INCREASE, OPTIMIZE AND/OR MAXIMIZE DATA THROUGHPUT FOR THE FIRST WIRELESS BASE STATION

3150

THE CMTS TRANSMITS DATA TO THE CABLE MODEMS IN ACCORDANCE WITH THE DETERMINED DATA TRANSMISSION SCHEDULE

3152

CONTINUE COORDINATING THE SCHEDULING AND TRANSFER OF DATA FROM THE CMTS TO THE CABLE MODEMS BASED ON WIRELESS BASE STATION MIMO INFORMATION RECEIVED FROM THE WIRELESS BASE STATIONS CONNECTED TO THE CABLE MODEMS

ASSEMBLY OF COMPONENTS
(INCLUDED IN UE DEVICE)

CONTROL ROUTINES
COMPONENT THAT CONTROL
OPERATION OF UE DEVICE          802

COMMUNICATIONS COMPONENT          804

MESSAGE GENERATOR COMPONENT          806

MESSAGE PROCESSING COMPONENT          808

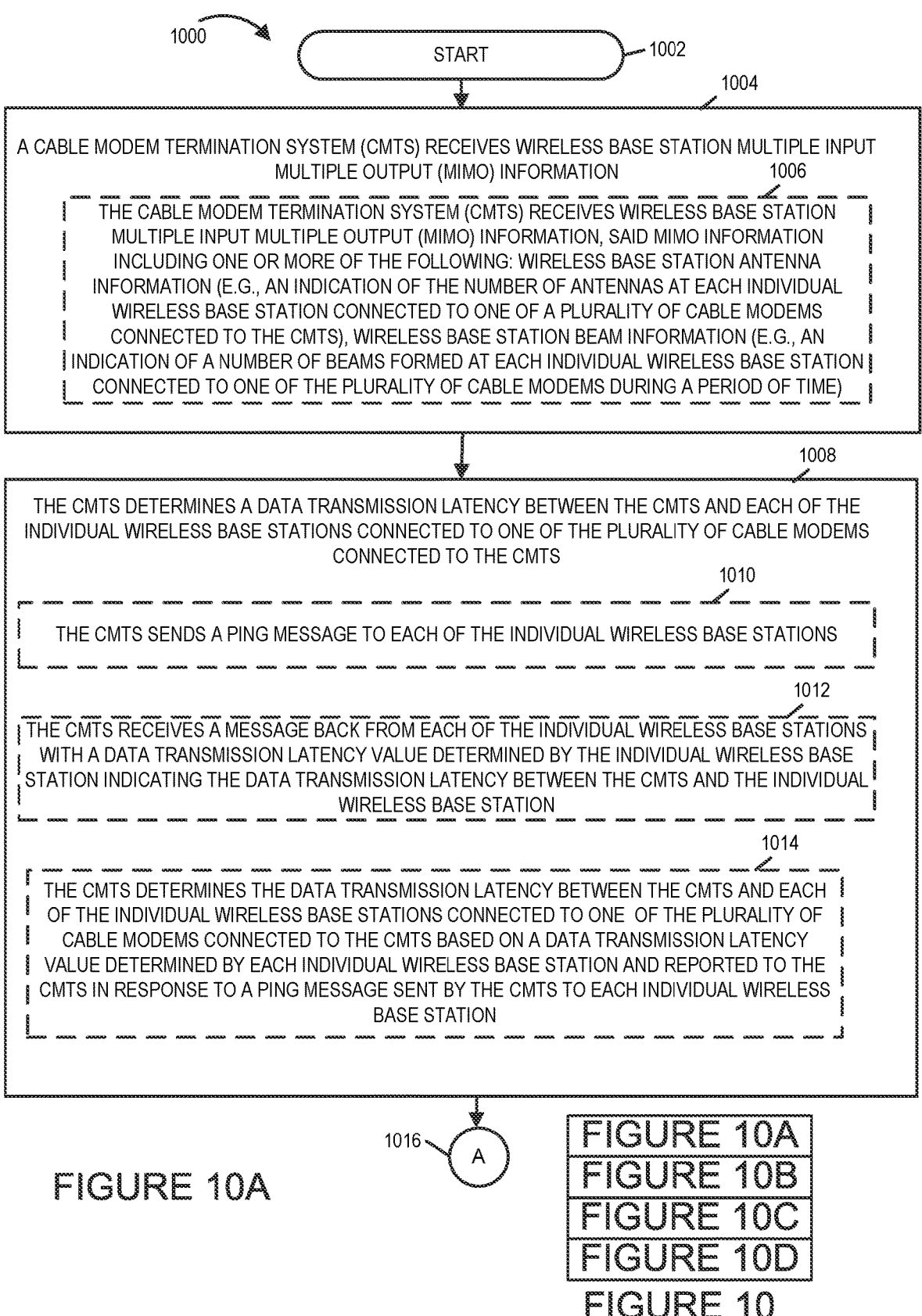

1000

START — 1002

1004

A CABLE MODEM TERMINATION SYSTEM (CMTS) RECEIVES WIRELESS BASE STATION MULTIPLE INPUT MULTIPLE OUTPUT (MIMO) INFORMATION     1006

THE CABLE MODEM TERMINATION SYSTEM (CMTS) RECEIVES WIRELESS BASE STATION MULTIPLE INPUT MULTIPLE OUTPUT (MIMO) INFORMATION, SAID MIMO INFORMATION INCLUDING ONE OR MORE OF THE FOLLOWING: WIRELESS BASE STATION ANTENNA INFORMATION (E.G., AN INDICATION OF THE NUMBER OF ANTENNAS AT EACH INDIVIDUAL WIRELESS BASE STATION CONNECTED TO ONE OF A PLURALITY OF CABLE MODEMS CONNECTED TO THE CMTS), WIRELESS BASE STATION BEAM INFORMATION (E.G., AN INDICATION OF A NUMBER OF BEAMS FORMED AT EACH INDIVIDUAL WIRELESS BASE STATION CONNECTED TO ONE OF THE PLURALITY OF CABLE MODEMS DURING A PERIOD OF TIME)

1008

THE CMTS DETERMINES A DATA TRANSMISSION LATENCY BETWEEN THE CMTS AND EACH OF THE INDIVIDUAL WIRELESS BASE STATIONS CONNECTED TO ONE OF THE PLURALITY OF CABLE MODEMS CONNECTED TO THE CMTS

1010

THE CMTS SENDS A PING MESSAGE TO EACH OF THE INDIVIDUAL WIRELESS BASE STATIONS

1012

THE CMTS RECEIVES A MESSAGE BACK FROM EACH OF THE INDIVIDUAL WIRELESS BASE STATIONS WITH A DATA TRANSMISSION LATENCY VALUE DETERMINED BY THE INDIVIDUAL WIRELESS BASE STATION INDICATING THE DATA TRANSMISSION LATENCY BETWEEN THE CMTS AND THE INDIVIDUAL WIRELESS BASE STATION

1014

THE CMTS DETERMINES THE DATA TRANSMISSION LATENCY BETWEEN THE CMTS AND EACH OF THE INDIVIDUAL WIRELESS BASE STATIONS CONNECTED TO ONE OF THE PLURALITY OF CABLE MODEMS CONNECTED TO THE CMTS BASED ON A DATA TRANSMISSION LATENCY VALUE DETERMINED BY EACH INDIVIDUAL WIRELESS BASE STATION AND REPORTED TO THE CMTS IN RESPONSE TO A PING MESSAGE SENT BY THE CMTS TO EACH INDIVIDUAL WIRELESS BASE STATION

| FIGURE 10A |
| FIGURE 10B |
| FIGURE 10C |
| FIGURE 10D |

FIGURE 10

A ~1016

1018

THE CMTS DETERMINES A DATA TRANSMISSION SCHEDULE FOR TRANSMITTING DATA TO A PLURALITY OF CABLE MODEMS CONNECTED TO THE CMTS    1020

THE CMTS DETERMINES A DATA TRANSMISSION SCHEDULE FOR TRANSMITTING DATA TO THE PLURALITY OF CABLE MODEMS CONNECTED TO THE CMTS BASED ON THE   1022 RECEIVED WIRELESS BASE STATION MIMO INFORMATION

THE CMTS DETERMINES A DATA TRANSMISSION SCHEDULE FOR TRANSMITTING DATA TO THE PLURALITY OF CABLE MODEMS CONNECTED TO THE CMTS BASED ON WIRELESS BASE STATION ANTENNA INFORMATION, SAID WIRELESS BASE STATION MIMO INFORMATION INCLUDING SAID WIRELESS BASE STATION ANTENNA INFORMATION, SAID WIRELESS BASE STATION ANTENNA INFORMATION INDICATING A NUMBER OF ANTENNAS AT EACH INDIVIDUAL WIRELESS BASE STATION CONNECTED TO ONE OF THE PLURALITY OF CABLE MODEMS

THE CMTS DETERMINES A DATA TRANSMISSION SCHEDULE FOR TRANSMITTING DATA TO THE PLURALITY OF CABLE MODEMS CONNECTED TO THE CMTS BASED ON THE NUMBER OF ANTENNAS AT EACH OF THE INDIVIDUAL WIRELESS BASE STATIONS CONNECTED TO ONE OF THE PLURALITY OF CABLE MODEMS   1024

THE CMTS DETERMINES A DATA TRANSMISSION SCHEDULE THAT INCLUDES SCHEDULING A LARGER NUMBER OF TIME SLOTS IN A DATA TRANSMISSION SCHEDULE CYCLE FOR TRANSMITTING DATA TO A FIRST CABLE MODEM THAN FOR TRANSMITTING DATA TO A SECOND CABLE MODEM, SAID PLURALITY OF CABLE MODEMS INCLUDING SAID FIRST CABLE MODEM AND SAID SECOND CABLE MODEM, SAID FIRST CABLE MODEM BEING CONNECTED TO AND PROVIDING SERVICES TO A FIRST WIRELESS BASE STATION, SAID SECOND CABLE MODEM BEING CONNECTED TO AND PROVIDING SERVICES TO A SECOND WIRELESS BASE STATION, SAID FIRST WIRELESS BASE STATION HAVING MORE ANTENNAS THAN SAID SECOND WIRELESS BASE STATION   1026

THE CMTS DETERMINES A DATA TRANSMISSION SCHEDULE FOR TRANSMITTING DATA TO THE PLURALITY OF CABLE MODEMS CONNECTED TO THE CMTS BASED ON WIRELESS BASE STATION BEAM INFORMATION, SAID WIRELESS BASE STATION MIMO INFORMATION INCLUDING SAID WIRELESS BASE STATION BEAM INFORMATION, SAID WIRELESS BASE STATION BEAM INFORMATION INDICATING A NUMBER OF BEAMS GENERATED, FORMED, CREATED, AND/OR USED AT EACH INDIVIDUAL WIRELESS BASE STATION CONNECTED TO ONE OF THE PLURALITY OF CABLE MODEMS DURING A PERIOD OF TIME   1028

THE CMTS DETERMINES A DATA TRANSMISSION SCHEDULE FOR TRANSMITTING DATA TO THE PLURALITY OF CABLE MODEMS CONNECTED TO THE CMTS BASED ON THE NUMBER OF BEAMS GENERATED, FORMED, CREATED AND/OR USED AT EACH OF THE INDIVIDUAL WIRELESS BASE STATIONS CONNECTED TO ONE OF THE PLURALITY OF CABLE MODEMS DURING THE PERIOD OF TIME   1030

1032

THE CMTS DETERMINES A DATA TRANSMISSION SCHEDULE THAT INCLUDES SCHEDULING A LARGER NUMBER OF TIME SLOTS IN A DATA TRANSMISSION SCHEDULE CYCLE FOR TRANSMITTING DATA TO A FIRST CABLE MODEM THAN FOR TRANSMITTING DATA TO A SECOND CABLE MODEM, SAID PLURALITY OF CABLE MODEMS INCLUDING SAID FIRST CABLE MODEM AND SAID SECOND CABLE MODEM, SAID FIRST CABLE MODEM BEING CONNECTED TO AND PROVIDING SERVICES TO A FIRST WIRELESS BASE STATION, SAID SECOND CABLE MODEM BEING CONNECTED TO AND PROVIDING SERVICES TO A SECOND WIRELESS BASE STATION, SAID FIRST WIRELESS BASE STATION HAVING GENERATED, FORMED, CREATED AND/OR USED MORE BEAMS THAN SAID SECOND WIRELESS BASE STATION DURING A FIRST PERIOD OF TIME

PART A

FIGURE 10B

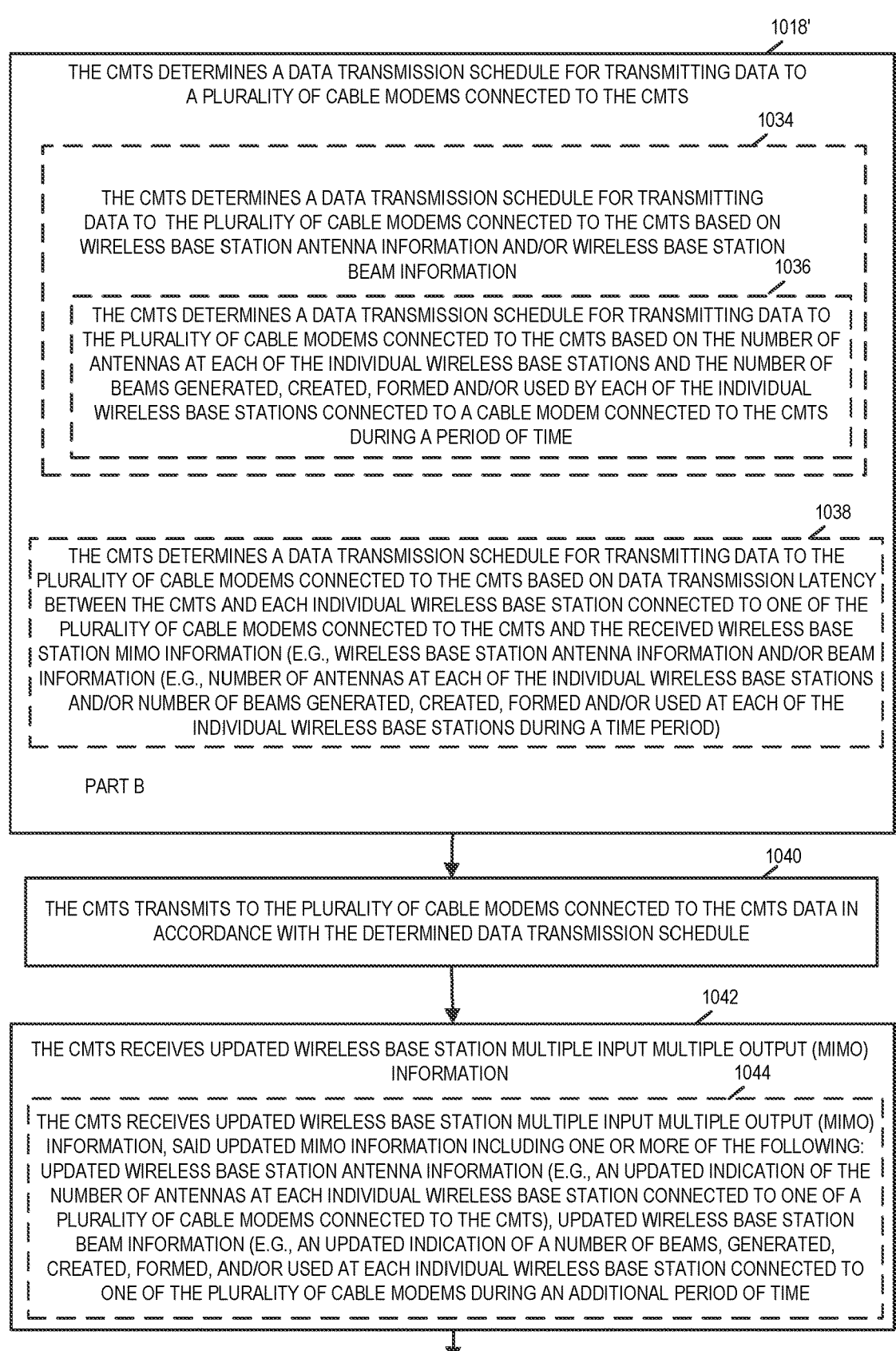

1018'

THE CMTS DETERMINES A DATA TRANSMISSION SCHEDULE FOR TRANSMITTING DATA TO A PLURALITY OF CABLE MODEMS CONNECTED TO THE CMTS

1034

THE CMTS DETERMINES A DATA TRANSMISSION SCHEDULE FOR TRANSMITTING DATA TO THE PLURALITY OF CABLE MODEMS CONNECTED TO THE CMTS BASED ON WIRELESS BASE STATION ANTENNA INFORMATION AND/OR WIRELESS BASE STATION BEAM INFORMATION

1036

THE CMTS DETERMINES A DATA TRANSMISSION SCHEDULE FOR TRANSMITTING DATA TO THE PLURALITY OF CABLE MODEMS CONNECTED TO THE CMTS BASED ON THE NUMBER OF ANTENNAS AT EACH OF THE INDIVIDUAL WIRELESS BASE STATIONS AND THE NUMBER OF BEAMS GENERATED, CREATED, FORMED AND/OR USED BY EACH OF THE INDIVIDUAL WIRELESS BASE STATIONS CONNECTED TO A CABLE MODEM CONNECTED TO THE CMTS DURING A PERIOD OF TIME

1038

THE CMTS DETERMINES A DATA TRANSMISSION SCHEDULE FOR TRANSMITTING DATA TO THE PLURALITY OF CABLE MODEMS CONNECTED TO THE CMTS BASED ON DATA TRANSMISSION LATENCY BETWEEN THE CMTS AND EACH INDIVIDUAL WIRELESS BASE STATION CONNECTED TO ONE OF THE PLURALITY OF CABLE MODEMS CONNECTED TO THE CMTS AND THE RECEIVED WIRELESS BASE STATION MIMO INFORMATION (E.G., WIRELESS BASE STATION ANTENNA INFORMATION AND/OR BEAM INFORMATION (E.G., NUMBER OF ANTENNAS AT EACH OF THE INDIVIDUAL WIRELESS BASE STATIONS AND/OR NUMBER OF BEAMS GENERATED, CREATED, FORMED AND/OR USED AT EACH OF THE INDIVIDUAL WIRELESS BASE STATIONS DURING A TIME PERIOD)

PART B

1040

THE CMTS TRANSMITS TO THE PLURALITY OF CABLE MODEMS CONNECTED TO THE CMTS DATA IN ACCORDANCE WITH THE DETERMINED DATA TRANSMISSION SCHEDULE

1042

THE CMTS RECEIVES UPDATED WIRELESS BASE STATION MULTIPLE INPUT MULTIPLE OUTPUT (MIMO) INFORMATION

1044

THE CMTS RECEIVES UPDATED WIRELESS BASE STATION MULTIPLE INPUT MULTIPLE OUTPUT (MIMO) INFORMATION, SAID UPDATED MIMO INFORMATION INCLUDING ONE OR MORE OF THE FOLLOWING: UPDATED WIRELESS BASE STATION ANTENNA INFORMATION (E.G., AN UPDATED INDICATION OF THE NUMBER OF ANTENNAS AT EACH INDIVIDUAL WIRELESS BASE STATION CONNECTED TO ONE OF A PLURALITY OF CABLE MODEMS CONNECTED TO THE CMTS), UPDATED WIRELESS BASE STATION BEAM INFORMATION (E.G., AN UPDATED INDICATION OF A NUMBER OF BEAMS, GENERATED, CREATED, FORMED, AND/OR USED AT EACH INDIVIDUAL WIRELESS BASE STATION CONNECTED TO ONE OF THE PLURALITY OF CABLE MODEMS DURING AN ADDITIONAL PERIOD OF TIME

B    1046    FIGURE 10C

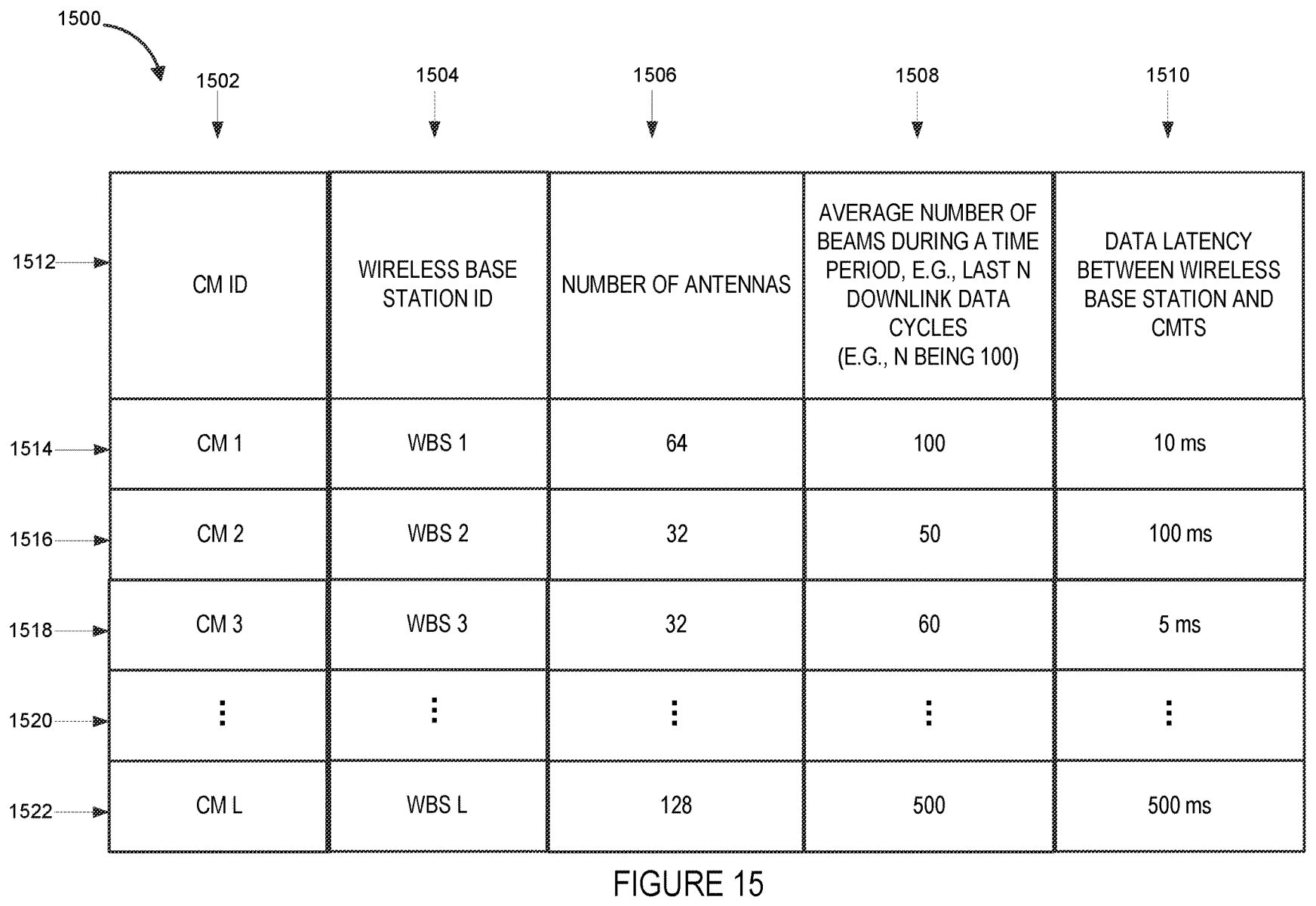

| CM ID | WIRELESS BASE STATION ID | NUMBER OF ANTENNAS | AVERAGE NUMBER OF BEAMS DURING A TIME PERIOD, E.G., LAST N DOWNLINK DATA CYCLES (E.G., N BEING 100) | DATA LATENCY BETWEEN WIRELESS BASE STATION AND CMTS |
|---|---|---|---|---|
| CM 1 | WBS 1 | 64 | 100 | 10 ms |
| CM 2 | WBS 2 | 32 | 50 | 100 ms |
| CM 3 | WBS 3 | 32 | 60 | 5 ms |
| ... | ... | ... | ... | ... |
| CM L | WBS L | 128 | 500 | 500 ms |

FIGURE 15

METHODS AND APPARATUS FOR COORDINATING DATA TRANSMISSION IN A COMMUNICATIONS NETWORK

FIELD OF INVENTION

The present invention relates to methods and apparatus for coordinating and/or managing data transfer in communications networks. The present invention is also directed to implementing methods and apparatus in cable systems, e.g., Data Over Cable Service Interface Specification (DOCSIS) networks. The present invention more particularly relates to methods and apparatus for coordinating the scheduling and transfer of downlink data from a cable modem termination system to a plurality of wireless base stations, e.g., Citizens Broadband Radio Service Devices, which are coupled to the cable modem termination system via separate cable modems. The present invention further relates to methods and apparatus for coordinating the scheduling and transfer of massive Multiple Input Multiple Output downlink data from a cable modem termination system to a wireless base station coupled to the cable modem termination system via a cable modem.

BACKGROUND OF THE INVENTION

With the introduction of new 5G networks and 5G wireless networks, new wireless base station network configurations and deployment models are being implemented. One of the main features that 5G systems, e.g., Citizens Broadband Radio Service Network (CBRS) 5G New Radio systems, are implementing is massive Multiple Input Massive Output (MIMO) feature. The massive MIMO feature utilizes a large number of antennas at a wireless base station, e.g., Citizen Broadband Radio Service Device (CBSD), to form highly directed beams with each beam being directed towards a single user. The massive MIMO feature is used in 5G systems to increase the data transmission throughput and/or the reliability of the wireless channel between the wireless base station and a user equipment device such as a mobile terminal. Each user equipment device in the network can also utilize a different number of antennas each time it receives data from a wireless base station.

Wireless base stations implementing massive MIMO can also utilize different numbers of antennas to create a plurality of beams for each user equipment device or terminal in the network with the number of beams being created depending on the quality of service class and/or the downlink throughput requirements for the particular user equipment device or terminal.

With respect to massive MIMO, the wireless base station has multiple antennas, e.g., 128 or 256 antennas, and it uses a subset of those antennas to form one or more beams to a user equipment device through which data is transmitted from the wireless base station to the user equipment device. The antennas are typically directional antennas.

The wireless base station can form one beam or multiple beams at the same time, e.g., $2^N$ beams (N being an integer greater than 0, e.g., 2, 4, 8, 16, 32, etc. beams) to a user equipment device using a sub-set of antennas or alternatively can form one beam to a user equipment device. The number of beams used to transmit data can increase the capacity of the data throughput to the user equipment device and/or the strength of the signal to the user equipment device. The decision on how many beams to utilize is based on a variety of factors including the needs of the user equipment device, throughput requirements for the user equipment device, and location of the user equipment device to the base station. For example, if the user equipment device is on the edge of a cell then the base station may utilize more antennas to transmit data to that user equipment device than for a user equipment device at the center of the cell. The larger number of antennas for example being used to create one strong beam to the user equipment device on the cell edge. In another example, the wireless base station may utilize multiple antennas to generate or form beams to a user equipment device in the center of the cell to increase the capacity of the data throughput to the user equipment device, e.g., 4 beams are formed to obtain 1 Gigabyte/second downlink to the user equipment device. Hence, the number of beams can be based on capacity or coverage range.

In multi-user massive MIMO, multiple beams are generated at the same time for different user equipment devices.

In various strand based deployment models, 5G systems include wireless base stations which connect to a core network via a Cable Modem Termination System. The wireless base stations, e.g., CBSDs, are placed on or connected to the cable strand of a cable network. The wireless base station receives its data and power from the cable network, e.g., a DOCSIS network, which includes a cable modem (CM) and a cable modem termination system (CMTS). There is a one to many relationship between the cable modem and the cable modem termination system, i.e., more than one cable modem is connected to a single cable modem termination system. There is typically a one to one relationship between the wireless base station and the cable modem. That is each wireless base station is connected to a single cable modem via which it receives power and data from the cable modem termination system.

The cable modem termination system sends or transmits data to each cable modem it is providing services to in a time divided manner. Each cable modem being assigned a time slot during which the cable modem termination system will send its data to the cable modem. The assignments typically being round robin wherein each cable modem is treated the same. Each cable modem in turn receiving its downlink data from the cable modem termination system in its assigned time slot. As there is no coordination between the cable modem termination system and the wireless base station the advantages of massive MIMO can be lost or degraded as the wireless base station may not receive data from cable modem termination system in a timely manner and hence it From the foregoing, it should be understood that there is a need for new and/or improved methods and apparatus for coordinating the scheduling and transmission of downlink data from cable modem termination systems to wireless base stations. Furthermore, it should be understood that there is a need to solve the problem of how to improve downlink data throughput from cable modem termination system to wireless base stations implementing massive MIMO with respect to user equipment devices to which the wireless base stations are providing services. From the above it should also be understood that there is a need for new and/or improved methods and apparatus for efficiently and effectively communicating and managing the communication of data, e.g., data packets, between devices in communications networks. Furthermore, there is a need for a technology solution to how to communicate downlink data from CMTS devices to wireless base stations implementing massive MIMO without degrading the quality of service provided to users of wireless base stations coupled to CMTS devices. There is a further need for new and/or improved methods and apparatus for dynamically managing or updating CMTS data scheduling on a per cable modem basis based on data throughput requirements of wireless base station connected to the cable modem.

SUMMARY OF THE INVENTION

The present invention provides new and/or improved methods and apparatus for coordinating the scheduling and transmission of downlink data between a CMTS and wireless base station to which it is providing services. The present invention is also directed to implementing new and/or improved methods of scheduling and transmitting data to a plurality of cable modems in cable systems, e.g., Data Over Cable Service Interface Specification (DOCSIS) networks which are coupled to wireless base stations via the plurality of cable modems. Various features of the present invention relate to methods and apparatus for efficiently and effectively managing and coordinating the scheduling and/or transmission of downlink data from a CMTS to a plurality of different cable modems at least some of which are providing services to wireless base stations, e.g., wireless base stations implement massive MIMO features. Various embodiments of the present invention also provide new and/or improved methods and apparatus for scheduling and transmitting data between cable modems, cable modem termination systems and wireless base stations which allows for the dynamic management of the amount of downlink data to be sent from a CMTS to a wireless base station via a cable modem which is situated on the communications path between the CMTS and the wireless base station. Various embodiments include new and/or improved methods and apparatus for communicating downlink data from CMTS devices to wireless base stations without degrading the quality of service provided to users of wireless base stations coupled to CMTS devices. Various embodiments of the present invention include new and/or improved methods and apparatus for improving massive MIMO wireless base station implementations by coordinating CMTS data transfer to the wireless base station via cable modems so that data is provided in a timely and efficient manner. Various embodiments of the present invention solve one or more of the problems discussed above.

In explaining the various features and/or embodiments of the invention, the features and/or embodiments will sometimes be discussed in the context of examples where the wireless base stations are CBSD devices in a CBRS network connected to a cable modem which is connected to a CMTS which in turn is connected to a core network. However, such examples are to facilitate understanding of the invention and it should be appreciated that the methods and apparatus are not limited to CBRS embodiments or wireless base stations which are CBSDs.

An exemplary method in accordance with one embodiment of the present invention includes the steps of: receiving, at a cable modem termination system (CMTS), wireless base station multiple input multiple output (MIMO) information; and determining, at the CMTS, a data transmission schedule for transmitting data to a plurality of cable modems connected to the CMTS based on the received wireless base station MIMO information. In some embodiments, the method further includes: transmitting from the CMTS to the plurality of cable modems connected to the CMTS data in accordance with the determined data transmission schedule.

In various embodiments, the wireless base station MIMO information includes: wireless base station antenna information, said wireless base station antenna information indicating a number of antennas at each individual wireless base station connected to one of the plurality of cable modems.

In some embodiments, the step of determining, at the CMTS, a data transmission schedule for transmitting data to a plurality of cable modems connected to the CMTS based on the received wireless base station MIMO information includes: determining the data transmission schedule based on the number of antennas at each of the individual wireless base stations connected to one of the plurality of cable modems. In some embodiments, the cable modems connected to wireless base stations with a higher number of antennas are assigned more time slots in the data transmission schedule than cable modems connected to wireless base stations with a lesser number of antennas (e.g., cable modem 1 is connected to wireless base station 1 which is operating in MIMO mode of operation and has 16 antennas is assigned more time slots in the data transmission schedule than cable modem 2 which is connected to wireless base station 2 which is operating in MIMO mode of operation and has 4 antennas).

In some embodiments, each data schedule cycle of the data transmission schedule includes a plurality of time slots, the number of time slots assigned to each of the plurality of cable modems being proportional to the number of antennas at the individual wireless base station to which the cable modem is connected.

In some embodiments, the step of determining, at the CMTS, a data transmission schedule for transmitting data to a plurality of cable modems connected to the CMTS based on the received wireless base station MIMO information includes: determining a data transmission schedule that includes scheduling a larger number of time slots in a data transmission schedule cycle for transmitting data to a first cable modem than for transmitting data to a second cable modem, said first cable modem providing services to a first wireless base station, said second cable modem providing services to a second wireless base station, said first wireless base station having more antennas than said second wireless base station.

In some embodiments, the wireless base station MIMO information includes: wireless base station beam information, said wireless base station beam information indicating a number of beams formed at each individual wireless base station connected to one of the plurality of cable modems during a period of time.

In various embodiments, the period of time is one of the following: (i) a period of time specified by the CMTS, (ii) a period of time based on a CMTS downlink data transmission scheduling cycle, (iii) a period of time based on each individual wireless base station's downlink data transmission scheduling cycle, and (iv) a period of time included with an indication of the number of beams formed at an individual wireless base station during said period of time.

In some embodiments, the step of determining, at the CMTS, a data transmission schedule for transmitting data to a plurality of cable modems connected to the CMTS based on the received wireless base station MIMO information includes: determining the data transmission schedule based on the number of beams formed during the period of time at each of the individual wireless base stations connected to one of the plurality of cable modems.

In some embodiments the cable modems connected to wireless base stations with a higher number of beams are assigned more time slots in the data transmission schedule than cable modems connected to wireless base stations with a lesser number of beams (e.g., cable modem 1 is connected to wireless base station 1 which is operating in MIMO mode of operation and has 100 beams formed during a first period of time is assigned more time slots in the data transmission schedule than cable modem 2 which is connected to wireless base station 2 which is operating in MIMO mode of operation and has 50 beams formed during the first period of time).

In some embodiments, the wireless base station MIMO information further includes: wireless base station beam information, said wireless base station beam information indicating a number of beams formed at each individual wireless base station connected to one of the plurality of cable modems during a period of time. In some embodiments, the step of determining, at the CMTS, a data transmission schedule for transmitting data to a plurality of cable modems connected to the CMTS based on the received wireless base station MIMO information includes: determining the data transmission schedule based on the number of beams formed at each of the individual wireless base stations connected to one of the plurality of cable modems during a period of time in addition to said number of antennas at each individual wireless base station connected to one of the plurality of cable modems.

In various embodiments, the method further includes the step of determining, by the CMTS, a data transmission latency between the CMTS and each of the individual wireless base stations connected to one of the plurality of cable modems connected to the CMTS. In some embodiments, the step of determining, by the CMTS, a data transmission latency between the CMTS and each individual wireless base station connected to one of the plurality of cable modems connected to the CMTS includes: (i) sending a ping message to each of said individual wireless base stations, and (ii) receiving a message back from each of the individual wireless base stations with a data transmission latency value determined by the individual wireless base station indicating the data transmission latency between the CMTS and the individual wireless base station.

In various embodiments, the data transmission schedule for transmitting data to a plurality of cable modems connected to the CMTS is also based on said determined data transmission latency between the CMTS and each of said individual wireless base stations in addition to said number of antennas at each individual wireless base station connected to one of the plurality of cable modems.

In some embodiments the step of determining, at the CMTS, a data transmission schedule for transmitting data to a plurality of cable modems connected to the CMTS based on the received wireless base station MIMO information further incudes: basing said data transmission schedule on said determined data transmission latency between the CMTS and each of the said individual wireless base stations in addition to said number of antennas at each individual wireless base station connected to one of the plurality of cable modems.

In some embodiments, the method further includes the step of determining, by the CMTS, a data transmission latency between the CMTS and each of the individual wireless base stations connected to one of the plurality of cable modems connected to the CMTS; and the wireless base station MIMO information includes: wireless base station beam information, said wireless base station beam information indicating a number of beams formed at each individual wireless base station connected to one of the plurality of cable modems during a period of time. In some such embodiments, the data transmission schedule for transmitting data to a plurality of cable modems connected to the CMTS is also based on said determined data transmission latency between the CMTS and each of said individual wireless base stations in addition to said number of beams formed at each individual wireless base station connected to one of the plurality of cable modems during the period of time.

In some embodiments, the method includes the additional step of: determining, by the CMTS, a data transmission latency between the CMTS and each of the individual wireless base stations connected to one of the plurality of cable modems connected to the CMTS. In some such embodiments, the wireless base station MIMO information also includes: wireless base station beam information, said wireless base station beam information indicating a number of beams formed at each individual wireless base station connected to one of the plurality of cable modems during a period of time; and, the data transmission schedule for transmitting data to a plurality of cable modems connected to the CMTS is based on said determined data transmission latency between the CMTS and each of said individual wireless base stations in addition to said number of beams formed at each individual wireless base station connected to one of the plurality of cable modems during the period of time and said number of antennas at each individual wireless base station connected to one of the plurality of cable modems.

In some embodiments, the method further includes the steps of: (i) generating, at each individual wireless base station, connected to one of the plurality of cable modems a MIMO information report; and (ii) transmitting, by each of the individual wireless base stations, said generated MIMO information report to the CMTS via the cable modem to which the individual wireless base station is connected (e.g., by sending a MIMO information report message or the MIMO information report included in another message sent to the CMTS).

In some embodiments, the CMTS receives the wireless base station multiple input multiple output (MIMO) information from a plurality of wireless base stations operating in a MIMO mode of operation, each of said wireless base station being connected to the CMTS via a different cable modem. In some embodiments, the cable modems are connected to the CMTS via a cable network. In some embodiments, the wireless base stations are CBSDs operating in a CBRS network.

In various embodiments, the method further includes the steps of: receiving, at the CMTS, updated wireless base station multiple input multiple output (MIMO) information (e.g., an updated number of beams formed by each individual wireless base station since the prior MIMO information was provided by the individual wireless base stations); and dynamically determining, at the CMTS, an updated data transmission schedule for transmitting data to the plurality of cable modems connected to the CMTS based on the received updated wireless base station MIMO information (e.g., dynamically increasing or decreasing the number of time slots assigned to one or more of the plurality of cable modems in a data transmission schedule cycle based on the updated MIMO information, e.g., increasing the number of time slots assigned to a cable modem connected to a wireless base station whose number of formed beams in the updated MIMO information is higher than the number of beams formed in original received MIMO information, and/or in comparison to other cable modems connected to other wireless base stations). In some such embodiments, the method further includes the steps of: transmitting from the CMTS to the plurality of cable modems connected to the CMTS data in accordance with the determined updated data transmission schedule.

In various embodiments, the method includes the additional step of: determining the data transmission schedule for transmitting data to the plurality of cable modems based upon data transmission latencies between the CMTS and each of the plurality of wireless base stations connected to the plurality of cable modems in addition to the wireless base station MIMO information.

In some embodiments, one or more of the plurality of cable modems are connected to a wireless base station. In some such embodiments, one or more of the plurality of cable modems are not connected to a wireless base station. In some such embodiments, the step of determining, at the CMTS, a data transmission schedule for transmitting data to a plurality of cable modems connected to the CMTS based on received wireless base station MIMO information includes prioritizing transmitting data to the cable modems connected to wireless base station over cable modems that are not connected to wireless base station (e.g., scheduling more time slots for use in data transmission scheduling cycle to be used for cable modems connected to wireless base stations than to cable modems that are not connected to wireless base station).

The present invention is also applicable to apparatus and system embodiments wherein one or more devices implement the steps of the method embodiments. In some apparatus embodiments each of the cable modems, cable modem termination systems, wireless base stations, CBSDs, user equipment devices, mobile terminals, cable modem termination system power management devices, resource allocation management devices, SAS devices, and each of the other apparatus/devices/nodes of the system include one or more processors and/or hardware circuitry, input/output interfaces including receivers and transmitters, and a memory. The memory including instructions when executed by one or more of the processors control the apparatus/device/node of the system to operate to perform the steps and/or functions of various method embodiments of the invention.

The present invention is also applicable to and includes apparatus and systems such as for example, apparatus and systems that implement the steps and/or functions of the method embodiments. For example, a communication system in accordance with one embodiment of the present invention include: a cable modem termination system, said cable modem termination system (CMTS) including: a memory, and a first processor that controls the CMTS to perform the following operations: receiving wireless base station multiple input multiple output (MIMO) information; and determining a data transmission schedule for transmitting data to a plurality of cable modems connected to the CMTS based on the received wireless base station MIMO information.

In some embodiments, the first processor further controls the CMTS to perform the additional operation of: transmitting from the CMTS to the plurality of cable modems connected to the CMTS data in accordance with the determined data transmission schedule.

In various embodiments, the wireless base station MIMO information includes: wireless base station antenna information, said wireless base station antenna information indicating a number of antennas at each individual wireless base station connected to one of the plurality of cable modems.

In some embodiments, the operation of determining a data transmission schedule for transmitting data to a plurality of cable modems connected to the CMTS based on the received wireless base station MIMO information includes: determining the data transmission schedule based on the number of antennas at each of the individual wireless base stations connected to one of the plurality of cable modems.

The present invention is also directed to non-transitory computer readable medium embodiments. In an exemplary non-transitory computer readable medium, the non-transitory computer readable medium includes a first set of computer executable instructions which when executed by a processor of a cable modem termination system cause the cable modem termination system to perform the steps of: receiving wireless base station multiple input multiple output (MIMO) information; and determining a data transmission schedule for transmitting data to a plurality of cable modems connected to the CMTS based on the received wireless base station MIMO information.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 3 illustrates the combination of FIGS. 3A, 3B, 3C, 3D, 3E, 3F, and 3G.

FIG. 3A illustrates the steps of the first part of an exemplary method in accordance with one embodiment of the present invention.

FIG. 3B illustrates the steps of the second part of an exemplary method in accordance with one embodiment of the present invention.

FIG. 3D illustrates the steps of the fourth part of an exemplary method in accordance with one embodiment of the present invention.

FIG. 3E illustrates the steps of the fifth part of an exemplary method in accordance with one embodiment of the present invention.

FIG. 3F illustrates the steps of the sixth part of an exemplary method in accordance with one embodiment of the present invention.

FIG. 3G illustrates the steps of the seventh part of an exemplary method in accordance with one embodiment of the present invention.

FIG. 10 illustrates the combination of FIGS. 10A, 10B, 10C, and 10D.

FIG. 10A illustrates the steps of the first part of an exemplary method in accordance with an embodiment of the present invention.

FIG. 10B illustrates the steps of the second part of an exemplary method in accordance with an embodiment of the present invention.

FIG. 10C illustrates the steps of the third part of an exemplary method in accordance with an embodiment of the present

FIG. 15 illustrates an exemplary table in accordance with an embodiment of the present invention in which a CMTS stores information, e.g., wireless base station MIMO information, data transmission latency information and associations of individual wireless base stations with the cable modems providing them services in accordance with an embodiment of the present invention.

DETAILED DESCRIPTION

Figure 1:
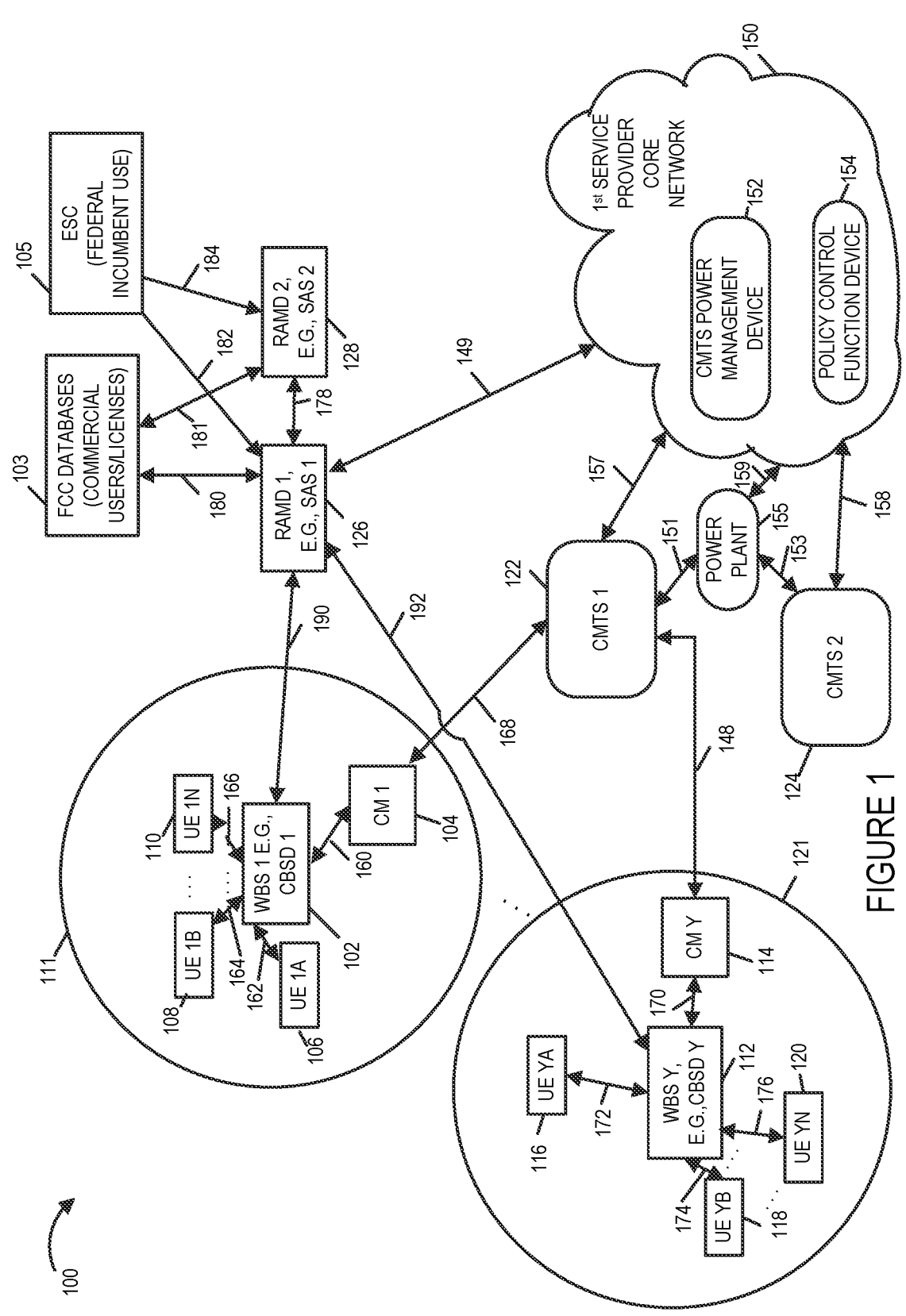
FIG. 1 illustrates an exemplary system in accordance with one embodiment of the present invention.

The current invention is particularly applicable to service providers which operate both wireless and wired networks that use a strand based deployment model for at least a portion of their wireless base stations. In the strand based deployment model, the service provider places or connects one or more of its wireless base stations, e.g., Citizen Broadband Radio Service Devices (CBSDs) in a Citizen Broadband Radio Service (CBRS) network, to the service provider's cable strand to provide services, e.g., 5G services, to its subscribers. Each of the wireless base stations, e.g., CBSDs, is connected to a separate cable modem (CM) and each of the separate cable modems is in turn connected to a cable modem termination system (CMTS). The cable modem termination system is a server which typically resides in the service provider's data center. The cable modem termination system may be, and in some embodiments, is located in the service provider's cable head end location. The cable modem termination system is connected to the service provider's core network, e.g., a 5G core network. In some embodiments, the service provider's data center and the cable modem termination systems located in the data center are located in the service providers core network.

The cable modem termination system receives data from core network elements and/or devices and will schedule and send this data to the wireless base stations, e.g., CBSDs, via the cable modems to which the CBSDs are connected.

The cable modem termination system typically receives power from a power plant that is owned and/or operated by the service provider. The cable modem termination system provides power to the cable modems to which it is connected. Each cable modem in turn typically provides power to the wireless base station, e.g., CBSD, which is connected to the cable modem. A cable modem in most embodiments supports and/or is connected to a single wireless base station. Each cable modem termination system may, and typically, does support a plurality of cable modems, i.e., has a plurality of cable modems connected to it. In some embodiments, the cable modem termination system supports thousands or tens of thousands of cable modems.

As discussed above, the present invention provides new and/or improved methods and apparatus for coordinating the scheduling and transmission of downlink data between a CMTS and wireless base station to which it is providing services. The present invention is also directed to implementing new and/or improved methods of scheduling and transmitting data to a plurality of cable modems in cable systems, e.g., Data Over Cable Service Interface Specification (DOCSIS) networks which are coupled to wireless base stations via the plurality of cable modems. Various features of the present invention relate to methods and apparatus for efficiently and effectively managing and coordinating the scheduling and/or transmission of downlink data from a CMTS to a plurality of different cable modems at least some of which are providing services to wireless base stations, e.g., wireless base stations implement massive MIMO features. Various embodiments of the present invention also provide new and/or improved methods and apparatus for scheduling and transmitting data between cable modems, cable modem termination systems and wireless base stations which allows for the dynamic management of the amount of downlink data to be sent from a CMTS to a wireless base station via a cable modem which is situated on the communications path between the CMTS and the wireless base station. Various embodiments include new and/or improved methods and apparatus for communicating downlink data from CMTS devices to wireless base stations without degrading the quality of service provided to users of wireless base stations coupled to CMTS devices. Various embodiments of the present invention include new and/or improved methods and apparatus for improving massive MIMO wireless base station implementations by coordinating CMTS data transfer to the wireless base station via cable modems so that data is provided in a timely and efficient manner. Various embodiments of the present invention solve one or more of the problems discussed above.

For explanatory purposes various features of the current invention will be explained using a 5G new radio CBRS wireless network with wireless base station, e.g., CBSDs, which have massive MIMO capabilities. However, as also explained above a CBRS wireless network is merely an exemplary wireless network in which the invention may be implemented.

Citizens Broadband Radio Service networks are networks that include user equipment devices, e.g., mobile or wireless devices such as for example cell phones, smart phones, laptops, tablets, Citizens Broadband Radio Service Devices (CBSDs) which serve as access points/base stations, and Spectrum Access Systems which are resource allocation management devices that provide spectrum assignments and manage frequency interference through power management of the wireless base stations (CBSDs) transmission power. The Citizens Broadband Radio Service network utilizes 150 megahertz in the 3550-3700 MHz band referred to as the 3.5 GHz Band. One important aspect of the CBRS network is the limitation of interference, e.g., radio transmission, from multiple transmission sources, e.g., multiple CBSD devices located near each other or in close proximity to one another. The CBRS network includes resource allocation management devices referred to as Spectrum Access Systems that obtain information about registered or licensed commercial users in the 3.5 GHz band from FCC databases and information about federal incumbent users of the band from ESC (Environmental Sensing Capability) system and interact directly or indirectly with CBSDs operating in the band to ensure that Citizens Broadband Radio Service users operate in a manner consistent with their authorizations and promote efficient use of the spectrum resource. Among the Spectrum Access System functions as defined in the Amendment of the Commission's Rules with Regard to Commercial Operations in the 3550-3650 MHz Band released Apr. 21, 2015 are that: it determines the available frequencies at a given geographic location and assign them to CBSDs; it determines the maximum permissible transmission power level for CBSDs at a given location and communicates that information to the CBSDs; it registers and authenticates the identification information and location of CBSDs; it enforces exclusion and protection zones, including any future changes to such Zones, to ensure compatibility between Citizens Broadband Radio Service users and incumbent federal operations; it protects Priority Access Licensees (PAL) from impermissible interference from other Citizens Broadband Radio Service users such as the General Authorized Access users; ensures secure and reliable transmission of information between the SAS, ESC, and CBSDs; and it facilitates coordination and information exchange between SASs. Through the management of the CBSDs power transmission levels in a geographical area the SAS manages the radio interference in the geographical area.

FIG. 1 illustrates an exemplary communications system 100 having an architecture implemented in accordance with the present invention. This exemplary communications system includes a 5G Citizens Broadband Radio Service wireless network, a core network and a cable network which couples at least some of the wireless base stations of the CBRS network to the core network. In the exemplary embodiment, a first service provider or operator operates and/or owns the cable network, the CBRS wireless network and the core network. The communications system 100 includes a plurality of wireless base stations (WBS 1 (e.g., Citizens Broadband Radio Service Device (CBSD) 1 102, . . . , WBS Y (e.g., CBSD Y) 112, a resource allocation management device (RAMD 1)(e.g., Spectrum Access System device 1 (SAS 1)) 126, a RAMD 2 (e.g., SAS 2) 128, databases of commercial users/licenses (e.g., an FCC Database) 103, an Environmental Sensing Capability (e.g., Federal Incumbent Use) (ESC)) system 105, a plurality of user equipment (UE) devices UE 1A 106, UE 1B 108, . . . , UE 1N 110, UE YA 116, UE YB 118, . . . , UE YN 120, Cable Modem (CM) 1 104, . . . , Cable Modem Y 114, Cable Modem Termination System (CMTS) 1 122, Cable Modem Termination System 124, Cable Modem Termination System Power Management Device 152, Policy Control Function Device 154, communications links 148, 149, 156, 158, 160, 162, 164, . . . , 166, 168, 170, 172, 174, . . . , 176, 178, 181, 182, 184, 190, 192, a first cell 111 illustrating the first base station 102's coverage area, a second cell 121 illustrating the second base station 112's coverage area.

The first cell 111 of the network is serviced by the WBS 1 (e.g., CBSD 1) 102. The first cell 111 illustrates the wireless coverage range of WBS 1 (e.g., CBSD 1) 102 at a first time T1. The user equipment devices also sometimes referred to as user terminal devices UE 1A 106, UE 1B 108, . . . , UE 1N 110 are located in the first cell 111 and are in active wireless communications with WBS 1 (e.g., CBSD 1) 102. Communications links 162, 164, and 166 illustrate wireless communications channels, e.g., radio channels, over which WBS 1 (e.g., CBSD 1) 102 and UE 1A 106, UE 1B 108, . . . , UE 1N 110 communicate respectively.

The second cell 121 of the wireless network is serviced by WBS 2 (e.g., CBSD 2) 112. The second cell 121 illustrates the wireless coverage range of WBS 2 (e.g., CBSD 2) 112 at the first time T1. The user equipment devices UE YA 116, UE YB 118, . . . , UE YN 120, (Y being an integer greater than 1) are located in the second cell 121 and are in communication with WBS 2 (e.g., CBSD 2) 112. Communications links 172, 174, . . . , 176 illustrate wireless communications channels, e.g., radio channels, over which WBS 2 (e.g., CBSD 2) 112 and UE YA 116, UE YB 116, . . . , UE YN 1260 communicate respectively.

The wireless base station WBS 1 102, . . . , WBS Y 112 implement massive MIMO with respect to communicating with the user equipment devices to which the wireless base station are providing services. The user equipment devices are also enabled and utilize massive MIMO to communicate with the wireless base station from which they are being provided services. The communications link, e.g., wireless communications links, between the wireless base station and the user equipment devices are formed from one or more beams, e.g., massive MIMO beams, used to communicate data and/or information, e.g., downlink data. The wireless base station each in include a plurality of antennas as discussed above to implement the massive MIMO features.

As discussed above, with respect to massive MIMO, the wireless base station has multiple antennas. e.g., 128 or 256 antennas, and it uses a subset of those antennas to form one or more beams to a user equipment device through which data is transmitted from the wireless base station to the user equipment device. The antennas are typically directional antennas.

The wireless base station can form one beam or multiple beams at the same time, e.g., $2^N$ beams (N being an integer greater than 0, e.g., 2, 4, 8, 16, 32, etc. beams) to a user equipment device using a sub-set of antennas or alternatively can form one beam to a user equipment device. The number of beams used to transmit data can increase the capacity of the data throughput to the user equipment device and/or the strength of the signal to the user equipment device. The decision on how many beams to utilize is based on a variety of factors including the needs of the user equipment device, throughput requirements for the user equipment device, and location of the user equipment device to the base station. For example, if the user equipment device is on the edge of a cell then the base station may utilize more antennas to transmit data to that user equipment device than for a user equipment device at the center of the cell. The larger number of antennas for example being used to create one strong beam to the user equipment device on the cell edge. In another example, the wireless base station may utilize multiple antennas to generate or form beams to a user equipment device in the center of the cell to increase the capacity of the data throughput to the user equipment device. e.g., 4 beams are formed to obtain 1 Gigabyte/second downlink to the user equipment device. Hence, the number of beams can be based on capacity or coverage range. In multi-user massive MIMO, multiple beams are generated at the same time for different user equipment devices by the wireless base stations of the system 100.

Resource Allocation Management Device (RAMD) 1 (e.g., SAS 1) 126 is coupled to Resource Allocation Management Device (RAMD) 2 (e.g., SAS 2) 128 via communications link 178. RAMD 1 (e.g., SAS 1) 126 is coupled to databases 103 via communications link 180. RAMD 2 (e.g., SAS 2) 128 is coupled to databases 103 via communications link 181. ESC system 105 is coupled to RAMD 1 (e.g., SAS 1) 126 and RAMD 2 (e.g., SAS 2) 128 via communications links 182 and 184. The ESC system is used to detect, sense Navy radar operations in the wireless bands utilized for communications in the wireless network, e.g., in CBRS networks the ESC detects or senses Navy radar operation within 3550-3650 MHz near the coasts, and provide notifications over the communications links to RAMD 1 (e.g., SAS 1) 126 and RAMD 2 (e.g., SAS 2) 128. RAMD 1 (e.g., SAS 1) 126 manages the WBS 1 (e.g., CBSD 1) 102 and WBS 2 (e.g., CBSD 2) 112 spectrum allocation and transmission power to limit interference in the wireless network (e.g., CBRS wireless network). RAMD 2 (e.g., SAS 2) 128 manages other wireless base stations (e.g., CBSDs) in the wireless network which are not shown in FIG. 1. Resource Allocation Management Device 1 (e.g., SAS 1) 126 and Resource Allocation Management Device 2 (e.g., SAS 2) 128 communicate and share information regarding the wireless network coverage of the wireless base stations (e.g., CBSDs) each respectively manage and coordinate management of the allocation of spectrum and power transmission levels of wireless base stations (e.g., CBSDs) throughout the wireless network. While only two Resource Allocation Management Devices (e.g., SAS devices) are shown in FIG. 1 it should be understood that additional Resource Allocation Management Devices (e.g., SAS devices) are typically used in the wireless network (e.g., CBRS network). The WBS 1 102, and WBS Y 112 coupled and/or connected to the RAMD 1 126 via the 1st service provider core network 150. The RAMD 1 126 is coupled to the first service provider's core network 150 via communications link 149. The WBS 1 102 is coupled and/or connected to the RAMD 1 126 via communications link 190. WBSD 2 112 is coupled and/or connected to RAMS 1 128 via communications link 192.

WBS 1 102 is coupled and/or connected to cable modem 104 via communications link 160. The cable modem 1 104 is coupled and/or connected to the cable modem termination system 1 122 via communications link 168. The cable modem termination system 1 122 is coupled and/or connected to the first service provider core network 150 via communications link 156. The WBS 1 102 communicates with the devices in the first service provider core network 150 via cable modem 104 and CMTS 1 122.

WBS Y 112 is coupled and/or connected to cable modem CM Y 114 via communications link 170. Cable Modem Y 114 is coupled and/or connected to the cable modem termination system 1 122 via communications link 148. The cable modem termination system 1 122 is coupled and/or connected to the first service provider core network 150 via communications link 156. The WBS Y 112 communicates with the devices in the first service provider core network 150 via the cable modem Y 114 and CMTS 1 122.

WBS 1 102, WBS Y 112, CM 1 104, CM Y 114, CMTS 1 122 and CMTS 2 124 are owned and/or operated by the first service provider.

The nodes, devices and elements of the first service providers core network 150 are interconnected via a communications network including communications links which allow the various nodes, devices and elements of the first service providers core network 150 to communicate and exchange information and data.

The first service provider's core network 150 in this exemplary embodiment is a 5G network including a cable modem termination system power management device 152 and a policy control function device 154. The 5G network core typically also includes a session management function device or node, security gateway function device or node, an access and mobility management function (AMF) device and a user plane function (UPF) device. The cable modem termination system power management device 152 is connected and/or coupled to a power plant system 155 via communications link 159. The cable modem termination system power management device 152 controls the management, supply and/or distribution of power for the cable modem system. The cable modem termination system power management device 152 instructs the CMTS devices in specific regions on whether it needs to reduce power and/or have the cable modems connected to the CMTS devices enter a power savings mode of operation as will be explained herein. In some embodiments, the CMTS power management device 152 is not located in the core network of the first service provider but is instead coupled and/or connected to the core network of the first service provider. In some embodiments, the CMTS power management device 152 is located at the service provider's power plant 155. The service provider's power plant 155 supplies power to the cable modem termination system devices in the cable modem system. In this example, the service provider's power plant 155 supplies power to the cable modem termination system 1 122 and cable modem termination system 2 124 via power cables 151 and 153 respectively as in this example CMTS 1 122 and CMTS 2 124 are located at different locations. In some embodiments the power plant also supplies power to the service providers data center and/or location at which the core network devices are located so that the power plant can provide power to one, some or all of the service providers equipment located in the data center, e.g., CMTS devices, and/or core network, e.g., CMTS power management device, etc.

CMTS 2 124 is coupled to the core network via communications link 158. CMTS 1 and CMTS 2 may be, and in some embodiments are, included in a cable head end system of first service provider.

The cable modems 1 104 and cable modem Y 114 may be, and in some embodiments are DOCSIS compliant cable modems, e.g., DOCSIS compliant 3.0, 3.1, 4.0 cable modems. The particular release/version of DOCSIS is not important to the invention as the messages exchanged between the cable modem and the CMTS devices may be, and in some embodiments are, text messages which can be sent between any CMTS and cable modem.

The communications links 148, 149, 156, 158, 159, 160, 168, 170, 178, 180, 181, 182, 183, 190, and 192 as well as the communications links coupling together the elements of the core network 150 are typically wired communications links or fiber optic cables. The communications links 162, 164, . . . , 166, 172, 174, . . . , 176 are wireless or over the air communications links. It is to be understood that the communication links shown in system 100 are only exemplary and other network configurations and communications links may be employed that couple together the devices, servers, nodes, entities, databases and controllers of the system. Elements or steps with the same reference numbers used in different figures are the same or similar and those elements or steps will not be described in detail again.

While for the sake of simplicity in explaining the invention system 100 only illustrates two active wireless base stations (e.g., CBSD devices), two cable modems, two CMTS devices, two Resource Allocation Management Devices (e.g., SAS devices) and a few UE devices, it will be appreciated that system 100 typically includes a large plurality of active wireless base stations (e.g., CBSDs) in the wireless network supporting a large plurality of UE devices with a large number of the plurality of active wireless base stations being coupled to the core network via a cable modem and CMTS. The cable system includes a large plurality of cable modem termination systems each coupled to a large plurality of cable modems which may be either connected to a single wireless base station, e.g., CBSD, or another device or devices. As previously discussed, the CMTS devices are typically located in the service provider's data center or cable head end and provide high speed data service connections.

The Cable Modem Termination System powers up the cable modems connected to it through the communications link which connects the cable modem termination system to the cable modem. The communications link for example may be, and in some embodiments is, an Ethernet cable. The Cable Modem Termination System also powers the wireless base station, e.g., CBSD, which is connected to the cable modem termination system via the cable modem. That is the Cable Modem Termination System first powers up the cable modem which in turn provides and/or supplies power to the wireless base station, e.g., CBSD. The power passing through the cable modem and communications link connecting the wireless base station and the cable modem. In some embodiments, the communications link coupling the cable modem to the wireless base station is an Ethernet cable.

The cable modems are located on the cable strands to provide the connection to the wireless base stations, e.g., a DOCSIS connection to CBSDs in a CBRS system.

The first service provider will also operate one or more power plants, e.g., power plant 155 in system 100. Each power plant is the power house which provides power for all Cable Modem Termination Systems in the network. Power plants are local power resources that are responsible for the provisioning and distribution of power for all Cable Modem Termination Systems and Cable Modems (through the CMTSs) running in the local region for which the power plant is supplying power. Cables through which power is supplied run from the power plant to Cable Modem Termination Systems.

Figure 2:
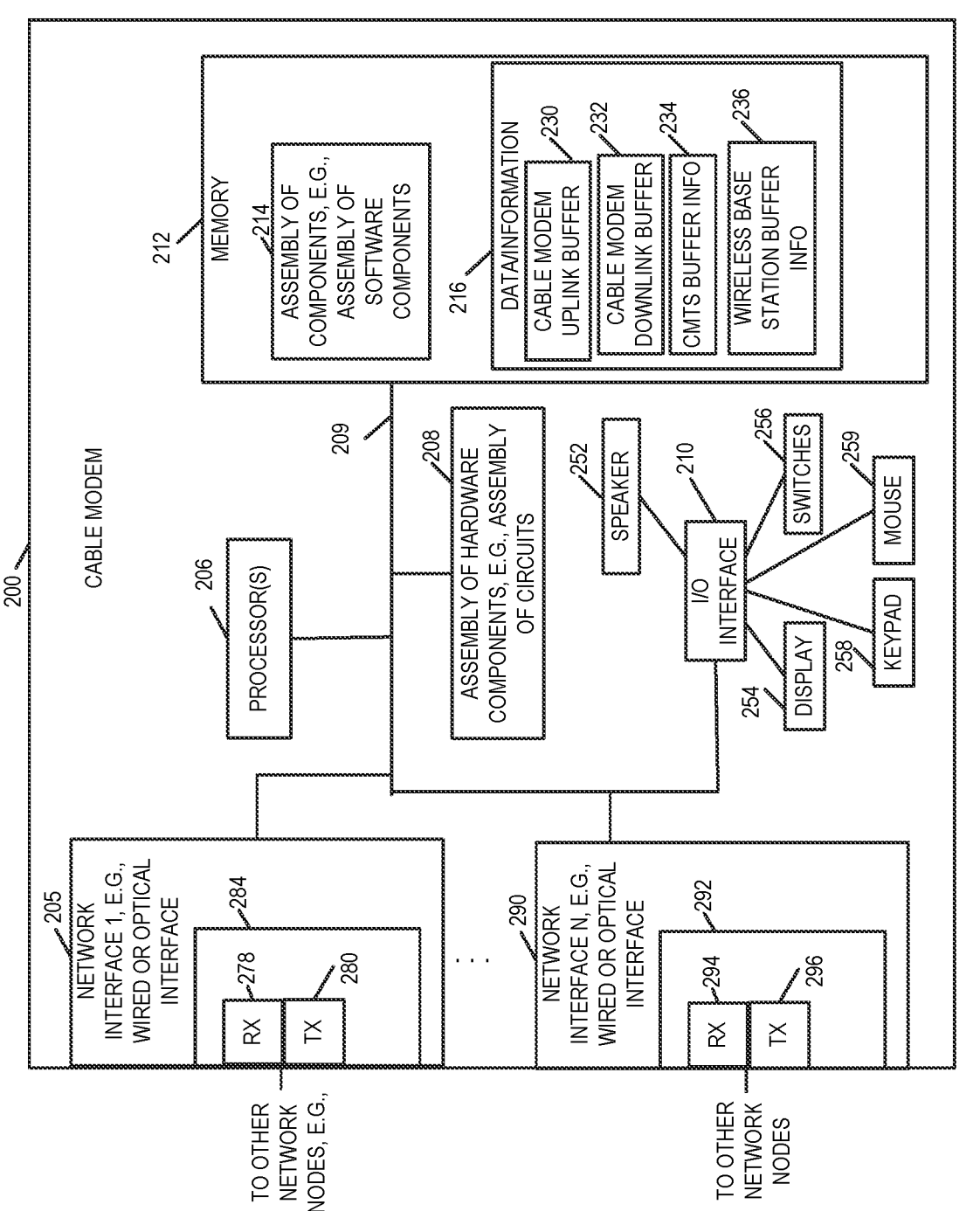
FIG. 2 illustrates details of an exemplary cable modem in accordance with one embodiment of the present invention.

FIG. 2 is a drawing of an exemplary cable modem such as a cable modem 1 104 of system 100. The cable modem 200 includes a plurality of network interfaces 1 205, . . . , network interface N 290, e.g., each being a wired or optical interface, a processor(s) 206 (e.g., one or more processors), e.g., a CPU, an assembly of hardware components 208, e.g., an assembly of circuits, and I/O interface 210 and memory 212 coupled together via a bus 209 over which the various elements may interchange data and information. The cable modem 200 further includes a speaker 252, a display 254, switches 256, keypad 258 and mouse 259 coupled to I/O interface 210, via which the various I/O devices (252, 254, 256, 258, 259) may communicate with other elements (206, 208, 212) of the cable modem 200. Network interface 205 includes a receiver 278 and a transmitter 280. Network interface 290 includes receiver 299 and transmitter 296. In some embodiments, network interfaces 205 and/or 290 includes multiple receivers and transmitters. The network interfaces 205 and 290 are used to communicate with other devices, e.g., wireless base station and/or cable modem termination system. In some embodiments, receiver 278 and transmitter 280 are part of a transceiver 284. In some embodiments, receiver 294 and transmitter 296 are part of a transceiver 292. Memory 212 includes an assembly of component 214, e.g., an assembly of software components, and data/information 216. Data/information 216 typically includes, among other things, cable modem uplink buffer 230, cable modem downlink buffer 232, cable modem termination system buffer information 234, and wireless base station buffer information 236. In some embodiments, the cable modems disclosed in the figures and/or discussed in connection with the various embodiments of the invention are implemented in accordance with cable modem 200. The cable modem has faster processing time than either the CMTS or the wireless base station. The cable modem acts as a pass through device receiving downlink data from the CMTS and communicating or transmitting it to the wireless base station. The cable modem in at least some embodiments uses a single downlink buffer to hold all downlink data and a single uplink buffer to hold all uplink data. In various embodiments, the cable modem transmits downlink data to the wireless base station as it receives and processes it therein avoiding the introduction of additional delay in the transmission of the downlink data from the CMTS to the wireless base station. For example, cable modem 1 (e.g., CM 1 104), . . . , cable modem Y (CM Y 114) of FIG. 1 are implemented in accordance with cable modem 200.

Figure 3C:
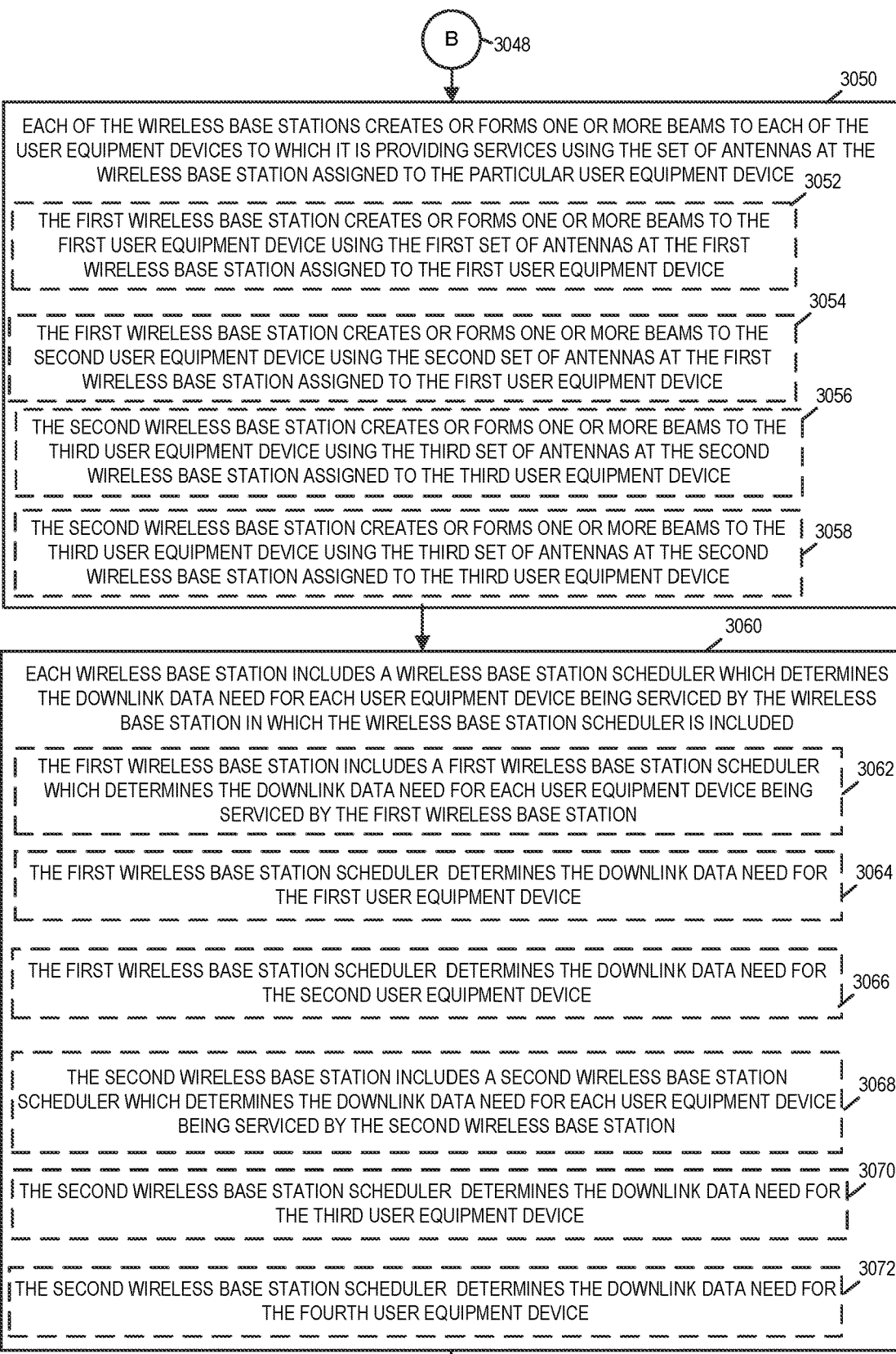
FIG. 3C illustrates the steps of the third part of an exemplary method in accordance with one embodiment of the present invention.

FIG. 3, which comprises the combination of FIGS. 3A, 3B, 3C, 3D, 3E, 3F, and 3G illustrates an exemplary method 3000. FIG. 3A illustrates the steps of the first part of an exemplary method 3000 in accordance with one embodiment of the present invention. FIG. 3B illustrates the steps of the second part of an exemplary method 3000 in accordance with one embodiment of the present invention. FIG. 3C illustrates the steps of the third part of an exemplary method 3000 in accordance with one embodiment of the present invention. FIG. 3D illustrates the steps of the fourth part of an exemplary method 3000 in accordance with one embodiment of the present invention. FIG. 3E illustrates the steps of the fifth part of an exemplary method 3000 in accordance with one embodiment of the present invention. FIG. 3F illustrates the steps of the sixth part of an exemplary method 3000 in accordance with one embodiment of the present invention. FIG. 3G illustrates the steps of the seventh part of an exemplary method 3000 in accordance with one embodiment of the present invention.

For explanatory purposes the exemplary method 3000 will be explained in connection with the exemplary system 100 illustrated in FIG. 1 wherein the wireless network is a CBRS network, wireless base stations are CBSD devices implementing massive MIMO, the resource allocation management devices are SAS devices, the core network is a 5G network, the cable network is a DOCSIS cable network. The user equipment devices to which the wireless base stations provide services also support massive MIMO. However, it should be understood that the method may be implemented using other system configurations then those illustrated in FIG. 1. For example, the method may be, and in some embodiments is implemented by the system 1300 illustrated in FIG. 12. While it will be readily understood that additional steps and signaling are performed in connection with communicating information, messages, and packets between devices, the method 3000 focuses on and discusses the steps and signaling for understanding the invention.

The method 3000 starts in start step 3002 shown on FIG. 3A. Operation proceeds from start step 3002 and proceeds to step 3004.

In step 3004, a plurality of wireless base stations, e.g., CBSDs, turn on and connect with a plurality of cable modems. Each of the plurality of wireless base stations connects to a different cable modem of the plurality of cable modem. For example, with respect to system 100 wireless base stations 1, . . . , Y (e.g., CBSD 1 102, . . . , CBSD Y of system 100) turn on and connect with cable modems 1, . . . Y respectively (e.g., CM 1 104, . . . , CM Y 114 of system 100). Operation proceeds from step 3004 to step 3006.

In step 3006, each cable modem of the plurality of cable modems is connected to a cable modem termination system (CMTS) and situated between the wireless base station to which it is connected and the CMTS. The CMTS is connected or coupled to a core network, e.g., a 5G core network. For example with respect to system 100, cable modem 1 is connected to and powered by cable modem termination system 1 122 of system 100. Cable modem 1 122 is positioned or situated between the wireless base station 1 102 and the cable modem termination system 122. Cable modem Y 114 is positioned or situated between the wireless base station 2 112 and the CMTS 1 122. The wireless base stations (e.g., CBSD 1 102 and CBSD Y 1112) connect to their service provider's core network via the cable modem to which they are connected and cable modem termination system to which it in turn is connected. The cable modem termination system (CMTS 1 122 of system 100) being connected to the core network (e.g., core network 150 of system 100). Operation proceeds from step 3006 to step 3008.

In step 3008, each of the wireless base stations, e.g., CBSDs, connect with a Spectrum Access System (e.g., SAS 1 126 of system 100). The Spectrum Access System grants spectrum to the wireless base stations (e.g., CBSDs) for use in communicating with and providing services to user equipment devices (e.g., UE 1A 106, UE 1B 108, . . . , UE 1N 110, UE YA 116, UE YB 118, . . . , UE YN 120 of system 100). Operation proceeds from step 3008 to step 3010.

In step 3010, the user equipment devices connect to the wireless base stations and begin requesting downlink data and also start sending uplink data. Operation proceeds from step 3010 to step 3012.

In step 3012, each of the cable modems creates a downlink data buffer for traffic that will be sent to the wireless base station connected to it and an uplink data buffer for the traffic that will be sent to the CMTS from wireless base station connected to it. Operation proceeds from step 3012 to step 3014.

In step 3014, each of the wireless base stations creates in its memory a different downlink data buffer for each user equipment device which has connected to it and to which it is actively/currently providing services.

Operation proceeds from step 3014 to step 3016.

In some embodiments, the CMTS receives data from the core network to which it is connected, e.g., a 5G core network, and will begin sending or transmitting the data to the wireless base station through the cable modems which connects the wireless base stations to the CMTS upon the wireless base station powering up. At this time the CMTS stores the received data at the CMTS and then distributes the stored data in accordance with a CMTS data transmission schedule which it generates. Initially, the CMTS data transmission schedule distributes data equally to each of the cable modems which are connected to it. In some embodiments, the CMTS utilizes a round robin method of distributing/transmitting the data making no distinction between cable modem which are connected to wireless base station and those that are not connected to wireless base station. Nor is a distinction made in the distribution of data to cable modems based on whether or not the wireless base station is implementing multiple input multiple output (MIMO) operation. This is sometimes referred to as first cable modem termination system mode of operation. With a second cable termination system mode of operation including the CMTS determining data transmission scheduling based on wireless base station MIMO information as described below.

In step 3016, each of the wireless base stations enables multiple input multiple output (MIMO) or massive MIMO operation. The plurality of wireless base station include a first wireless base station, e.g., CBSD 1 102 of system 100) and a second wireless base station (e.g., CBSD Y 112 of system 100) which enable MIMO or massive MIMO operation. Operation proceeds from step 3016 to step 3022 shown on FIG. 3B via connection node B 3020.

In step 3022, each of the wireless base stations assigns a set of antennas from the total number of antennas at the wireless base station to each user equipment device to which it is providing services. In some embodiments step 3022 includes one or more sub-steps 3024, 3026, 3030, 3032, 3034, 3036, 3038, 3040, 3042, 3044, 3046.

In sub-step 3024, each of the wireless base stations determines for each user equipment device it is providing services to the downlink data requirements of the user equipment device. In some embodiments, this is includes making said determination based on device type of the user equipment device and/or quality of service contract information with respect to the user equipment device or the user operating the user equipment device.

In sub-step 3026, each of the wireless base stations determines for each user equipment device to which it is providing services, a set of its antennas to use for communicating downlink data. The set of antennas including all of the antennas at the wireless base station (e.g., when 1 beam using all antennas is to be formed) or a sub-set of the antennas at the wireless base station (e.g., when multiple beams to different user equipment devices are to be formed simultaneously or concurrently). In most embodiments, the wireless base station antennas are directional antennas. Sub-step 3026 in some embodiments includes sub-step 3028. In sub-step 3028, each of the wireless base stations makes the determination of the set of antennas to assign to each user equipment based on the downlink data requirements or needs of the user equipment device and/or the location of the user equipment device. In some embodiments, the determination of the set of antennas to assign to each user equipment device is also based on the channel conditions of the downlink connection to the user equipment device and/or the number of user equipment devices being serviced by the wireless base station.

In sub-step 3030, each of the wireless base stations assigns the determined set of antennas to each of the user equipment devices for use in transmitting downlink data to the user equipment device.

In sub-step 3032, the first wireless base station (e.g., CBSD 1 102) makes a determination of how many antennas and which of its antennas to assign to a first user equipment device (e.g., UE 1A 106) to which it is providing services.

In sub-step 3034, the first wireless base station assigns a first set of antennas to the first user equipment device (e.g., the antennas determined in sub-step 3032).

In sub-step 3036, the first wireless base station (e.g., CBSD 1 102) makes a determination of how many antennas and which of its antennas to assign to a second user equipment device (e.g., UE 1B 108) to which it is providing services.

In sub-step 3038, the first wireless base station assigns a second set of antennas to the first user equipment device (e.g., the antennas determined in sub-step 3036).

In sub-step 3040, the second wireless base station (e.g., CBSD Y 112) makes a determination of how many antennas and which of its antennas to assign to a third user equipment device (e.g., UE YA 116) to which it is providing services.

In sub-step 3042, the second wireless base station assigns a third set of antennas to the third user equipment device (e.g., the antennas determined in sub-step 3040).

In sub-step 3044, the second wireless base station makes a determination of how many antennas and which of its antennas to assign to a fourth user equipment device (e.g., UE YB 118) to which it is providing services.

In sub-step 3046, the second wireless base station assigns a fourth set of antennas to the fourth user equipment device (e.g., the antennas determined in sub-step 3044.

Operation proceeds from step 3022 to step 3050 shown on FIG. 3C via connection node B 3048. In step 3050, each of the wireless base stations creates or forms one or more beams to each of the user equipment devices to which it is providing services using the set of antennas at the wireless base station assigned to the particular user equipment device. In some embodiments step 3050 includes one or more sub-steps 3052, 3054, 3056, and 3058. In sub-step 3052, the first wireless base station creates or forms one or more beams to the first user equipment device using the first set of antennas. In sub-step 3054, the first wireless base station creates or forms one or more beams to the second user equipment device using the second set of antennas. In sub-step 3056, the second wireless base station creates or forms one or more beams to the third user equipment device using the third set of antennas. In sub-step 3058, the second wireless base station creates or forms one or more beams to the fourth user equipment device using the fourth set of antennas.

Operation proceeds from step 3050 to step 3060. In step 3060, each wireless base station determines the downlink data need for each user equipment device being serviced by the wireless base station. Each of the wireless base stations typically includes a wireless base station data scheduler which makes these determinations for the wireless base station. In some embodiments, step 3060 includes one or more sub-step 3062, 3064, 3066, 3068, 3072, and 3072.

In sub-step 3062, the first wireless base station includes a first wireless base station scheduler which determines the downlink data need for each user equipment device being serviced by the first wireless base station. In sub-step 3064, the first wireless base station scheduler determines the downlink data need for the first user equipment device. In sub-step 3066, the first wireless base station scheduler determines the downlink data need for the second user equipment device. In sub-step 3068, the second wireless base station includes a second wireless base station scheduler which determines the downlink data need for each user equipment device being serviced by the second wireless base station. In sub-step 3070, the second wireless base station scheduler determines the downlink data need for the third user equipment device. In sub-step 3072, the second wireless base station scheduler determines the downlink data need for the fourth user equipment device. Operation proceeds from step 360 to step 7076 shown on FIG. 3D via connection node C 3074.

In step 3076, each wireless base station scheduler determines or generates a downlink data schedule for sending data to each of the user equipment devices being serviced by the wireless base station in which the wireless base station scheduler is included. In some embodiments step 3076 includes one or more sub-steps 3078, 3080, 3082, 3084, 3086, 3088, 3090, and 3092.

In sub-step 3078, each wireless base station scheduler determines or generates the downlink data schedule based on the determined downlink data need for each user equipment device being serviced by its wireless base station.

In sub-step 3080, each wireless base station scheduler schedules the transmission of the downlink data to the user equipment devices being serviced by the wireless base station in which it is included using the required number of antennas of the assigned set of antennas for each user equipment device to create or form one or more directed beams towards each of the user equipment devices over which the data for the user equipment device is transmitted from the wireless base station. In some embodiments, the one or more directed beams is a plurality of beams which are formed or created by a plurality of directional MIMO antennas.

In step 3082, the first wireless base station scheduler determines or generates a downlink data schedule for sending data to each of the user equipment devices being serviced by the first wireless base station.

In step 3084, the first wireless base station scheduler schedules the transmission of downlink data to the first user equipment device using the first set of antennas to create or form one or more beams to the first user equipment device over which the downlink data is transmitted. In some embodiments, the one or more beams is a plurality of beams.

In step 3086, the first wireless base station scheduler schedules the transmission of downlink data to the second user equipment device using the second set of antennas to create or form one or more beams to the second user equipment device over which the downlink data is transmitted. In some embodiments, the one or more beams is a plurality of beams.

In step 3088, the second wireless base station scheduler determines or generates a downlink data schedule for sending data to each of the user equipment devices being serviced by the second wireless base station.

In step 3090, the second wireless base station scheduler schedules the transmission of downlink data to the third user equipment device using the third set of antennas to create or form one or more beams to the third user equipment device over which the downlink data is transmitted. In some embodiments, the one or more beams is a plurality of beams.

In step 3092, the second wireless base station scheduler schedules the transmission of downlink data to the fourth user equipment device using the fourth set of antennas to create or form one or more beams to the fourth user equipment device over which the downlink data is transmitted. In some embodiments, the one or more beams is a plurality of beams.

Operation proceeds from step 3076 to step 3096 shown on FIG. 3E.

In step 3096, each wireless base station via the cable modem to which it is connected transmits wireless base station MIMO information to the CMTS on an on-going basis, e.g., every X time periods or every N wireless base station downlink scheduling cycles. N being an integer greater than zero. X being a positive integer greater than 0. In some embodiments, the X time periods are a time period equal to the length of time for one complete CMTS downlink data cycle. In some embodiments, the X time period of time is a amount of time, e.g., 10 seconds, 100 msecs, etc. In some embodiments, the time period is specified by the CMTS to the wireless base stations. In some embodiments, each wireless base station's MIMO information is reported to the CMTS with respect to a different period of time. The period of time to which the MIMO information corresponds being determined by the CMTS based on information contained in MIMO information or the time the MIMO information was last received from the wireless base station. In some embodiments step 3096 includes one or more sub-steps 3098, 3100, 3102, and 3104.

In sub-step 3098, each wireless base station generates a wireless base station MIMO report including the wireless base station MIMO information. The wireless base station MIMO information including one or more of the following pieces of wireless base station MIMO information: (i) the number of antennas at the wireless base station, (ii) average number of beams created or formed during a period of time, e.g., during a period of time included with the MIMO information and/or period of time since last MIMO report by the wireless base station, or a period of time specified by the CMTS. The wireless base station MIMO information also typically includes wireless base station identification information, e.g., a wireless base station identifier which identifies the wireless base station to which the MIMO information corresponds.

In sub-step 3100, each wireless base station sends the generated wireless base station report to the CMTS via the cable modem to which it is connected.

In sub-step 3102, the first wireless base station sends a first wireless base station MIMO report to the CMTS via the first cable modem to which it is connected. The first wireless base station MIMO report having been generated by the first wireless base station. The first wireless base station MIMO report including: (i) the number of antennas the first wireless base has, and the average number of beams the first wireless base station formed, generated or used during a period of time, e.g., a first period of time, e.g., N milliseconds (e.g., 1000 msecs) or N data downlink scheduling cycles during which downlink data was transmitted by the first wireless base station to user equipment devices, N being a positive integer greater than zero. The first wireless base station MIMO report also includes a first wireless base station identifier from which the first wireless base station can be identified. In some embodiments, the period of time is specified by the CMTS. In some embodiments, the period of time is included with the first wireless base station MIMO information sent to the CMTS. In various embodiments, the first wireless base station generates and sends on a recurring basis first wireless base station reports to the CMTS with updated information since the last report, e.g., generating and sending a report after the passage of a recurring amount of time or a recurring time period, e.g., a time period specified by the CMTS. In some embodiments, the first wireless base station only sends a report when the MIMO information previously provided needs to be updated because it is out of date such as for example if the number of antennas has changed or the average number of beams being formed by the first wireless base station during a period of time has changed.

In sub-step 3104, the second wireless base station sends a second wireless base station MIMO report to the CMTS via the second cable modem to which it is connected. The second wireless base station MIMO report having been generated by the second wireless base station. The second wireless base station MIMO report including: (i) the number of antennas the second wireless base has and the average number of beams the second wireless base station formed, generated or used during a period of time, e.g., a second period of time, e.g., N milliseconds (e.g., 1000 msecs) or N data downlink scheduling cycles during which downlink data was transmitted by the second wireless base station to user equipment devices, N being a positive integer greater than zero. In some embodiments, the period of time is specified by the CMTS. In some embodiments, the period of time is included with the second wireless base station MIMO information sent to the CMTS. The second wireless base station MIMO report also includes a second wireless base station identifier from which the second wireless base station can be identified. In various embodiments, the second wireless base station generates and sends on a recurring basis second wireless base station reports to the CMTS with updated information since the last report, e.g., generating and sending a report after the passage of a recurring amount of time or a recurring time period, e.g., a time period specified by the CMTS. In some embodiments, the second wireless base station only sends a report when the MIMO information previously provided needs to be updated because it is out of date such as for example if the number of antennas has changed or the average number of beams being formed by the second wireless base station during a period of time has changed.

Operation proceeds from step 3096 to step 3106. In step 3106, the CMTS receives the wireless base station MIMO information transmitted from the wireless base stations. In some embodiments step 3106 includes one or more sub-steps 3108, 3110, and 3112.

In sub-step 3108, the CMTS receives the transmitted wireless base station MIMO report(s).

In sub-step 3110, the CMTS receives the first wireless base station MIMO reports via the first cable modem.

In sub-step 3112, the CMTS receives the second wireless base station report(s) via the second cable modem.

Operation proceeds from step 3106 to step 3116 shown on FIG. 3F via connection node E 3114.

In step 3116, the CMTS stores the received wireless base station MIMO information associated it with at least the cable modem via which it was received, e.g., in memory in the CMTS and/or in a storage device connected to the CMTS such as a database. In most embodiments it also associates it with a wireless base station identifier which identifies the wireless base station to which the received wireless base station MIMO information corresponds or belongs. Table 1500 illustrates an exemplary table generated by the CMTS used to store wireless base station MIMO information. The table may be, and in some embodiments is, stored in memory of the CMTS.

Step 3116 in some embodiments includes one or more sub-steps 3118, 3120, 3122, and 3124.

In sub-step 3118, the CMTS stores and/or records received wireless base station MIMO reports and/or information contained in each report in memory and/or a storage device associating each report and/or information contained in each report with the wireless base station and cable modem from which it was received.

In sub-step 3120, the CMTS uses a lookup table to store the received wireless base station MIMO information and/or wireless base station MIMO reports.

In sub-step 3122, the CMTS generates a record for each cable modem connected to the CMTS. Each record is associated with a cable modem identifier.

In sub-step 3124, the CMTS stores the received wireless base station MIMO information and/or reports in the record corresponding to the cable modem from which the MIMO information and/or report was received.

Operation proceeds from step 3116 to step 3126.

Figure 16:
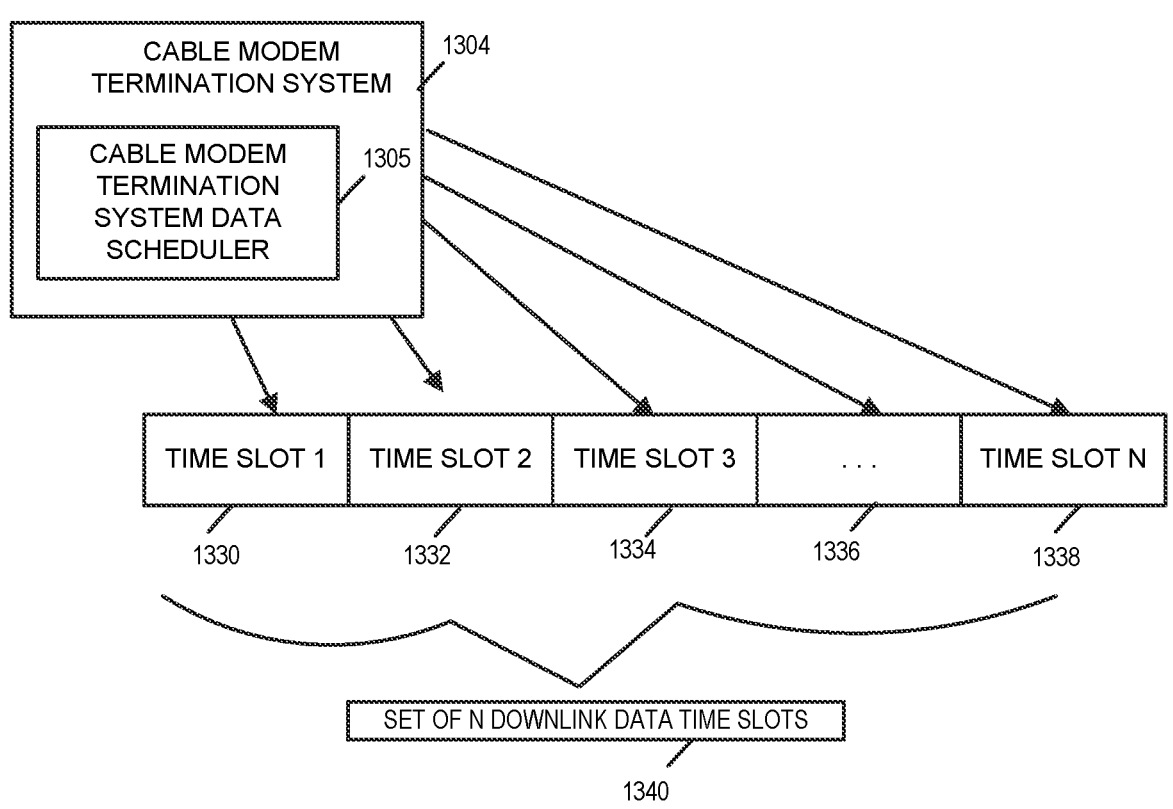
FIG. 16 illustrates an exemplary cable modem termination system and an exemplary downlink data transmission schedule cycle including a set of downlink data time slots.

In step 3126, the CMTS includes a CMTS scheduler which assigns time slots in a scheduling cycle or frame to be used for transmitting downlink data to each cable modem connected to the CMTS. The assignment of time slots to the cable modems being based on the received wireless base station MIMO information. Diagram 1600 of FIG. 16 illustrates a cable modem termination system 1304 which includes a cable modem termination system data scheduler 1305. The cable modem termination system data scheduler 1305 generates or creates a downlink data transmission schedule. The CMTS operates in a time division mode of operation in which it divides up a period of time for transmitting downlink data to the plurality of cable modems to which it is connected. The period of time is sometimes referred to as a downlink data transmission cycle or frame.

Diagram 1600 shown in FIG. 16 includes an example wherein, the downlink data transmission data cycle includes a set of N downlink data time slots 1340. The set of N downlink data time slots includes time slot 1 1330, time slot 2 1332, time slot 3 1334, . . . 1336, time slot N 1338. The cable modem termination system data scheduler determines a downlink data transmission schedule which identifies which time slot of the set of N downlink data time slots will be used to transmit downlink data to each cable modem. For example, time slots 1 and 2 may be used to transmit downlink data to the second wireless base station via the second cable modem and remaining time slots of the set of N time slots may be used to transmit data to the first wireless base station via first cable modem. The arrows from the cable modem termination system 1304 represent data being transmitted during the time slots. The CMTS downlink data transmission cycle repeats with a recurring set of N downlink data time slots. The CMTS data scheduler determining and assigning for each of the downlink data transmission cycles which slots will be used to transmit data to which cable modems. The CMTS data scheduler making the determinations and/or assignments based on the received wireless base station MIMO information. In at least some embodiments, the CMTS data scheduler also makes the determinations of the assignment of data slots based on the data transmission latency between the CMTS and each wireless base station in addition to the wireless base station MIMO information (e.g., number of antennas at each wireless base station and/or number of beams formed, created, generated or used during a period of time by the wireless base station).

Step 3126 in some embodiments includes one or more sub-steps 3128, 3130, 3132, 3134, 3136, 3138, and 3140. Step 3126 is continued on FIG. 3G and shown as step 3126'.

In sub-step 3128, the CMTS scheduler determines which time slots of a scheduling cycle or frame are to be used for transmitting downlink data to each of the cable modems based on the number of antennas and/or the number of beams or average number of beams used during a period of time at the wireless base station connected to the cable modem, e.g., the higher the number of antennas the higher number of time slots assigned to the cable modem connected to that wireless base station.

In sub-step 3130, the CMTS uses information form the lookup table in which the received wireless base station MIMO information and/or wireless base station MIMO reports are stored to determine the downlink data schedule for transmitting data to the wireless base stations via the cable modems to which the wireless base stations are connected.

In sub-step 3132, the CMTS determines the downlink data bandwidth requirements for each of the cable modems connected to the CMTS based on the wireless base station MIMO information received via the cable modem, e.g., the higher the number of antennas the higher the bandwidth requirement or the higher the average number of beams used during a period of time the higher the bandwidth requirement.

In sub-step 3134, the CMTS determines the number of time slots in a scheduling cycle or frame to assign to each cable modem based on the downlink data bandwidth requirement determined for the cable modem.

In sub-step 3136 shown on FIG. 3G, the CMTS determines the number of time slots in a scheduling cycle or frame to assign to the first cable modem based on the first wireless base station MIMO information and/or reports, e.g., the number of antennas at the first wireless base station and/or the average number of beams being formed, created or used during a time period, e.g., a first time period.

In sub-step 3138 shown on FIG. 3G, the CMTS determines the number of time slots in a scheduling cycle or frame to assign to the second cable modem based on the second wireless base station MIMO information and/or reports, e.g., the number of antennas at the second wireless base station and/or the number of beams (or average number of beams) being formed, created or used during a time period, e.g., a second time period. The first and second time period may be the same and/or different periods of time.

In various embodiments, the CMTS scheduler will assign and use a higher number of time slots in a data transmission scheduling cycle to transmit data to a first cable modem connected to a first wireless base station than to a second cable modem connected to a second wireless base station wherein the first wireless base station has a higher number of antennas than the second wireless base station. In various embodiments, the CMTS scheduler initially assigns each cable modem the same number of time slots. Then upon receipt of the wireless base station MIMO information increases the number of time slots in a downlink data transmission scheduling cycle to use for sending data to each cable modem commensurate with the number of antennas at each wireless base station. The higher the number of antennas at a wireless base station, the higher the number of time slots dedicated or assigned to the cable modem to which the wireless base station is connected. Similarly, the CMTS scheduler may, and in some embodiments does, use the number of beams formed, generated, created or used at a wireless base station during a period of time to determine the number of time slots to use for sending data to a cable modem. The number of times slots being assigned being commensurate with the number of beams being formed, created, generated, and/or used during a period of time. The higher the number of beams is an indication that there is higher data throughput requirement for the wireless base station and hence the cable modem connected to and providing services to the wireless base station.

In sub-step 3140, the CMTS determine which particular time slots in a data transmission scheduling cycle or frame to assign to each cable modem connected to the CMTS based on the downlink data transmission latency between the CMTS and each wireless base station when data is sent from the CMTS to each wireless base station. Sub-step 3140 includes one or more sub-steps 3142, 3144, 3146 and 3148.

In sub-step 3142, the CMTS receives CMTS to wireless base station data transmission latency information from each wireless base station in response to a ping message sent to each wireless base station connected to a cable modem connected to the CMTS.

In sub-step 3144, the CMTS receives timing information from each wireless base station indicating when data needs to be received at the wireless base station to increase, optimize and/or maximize data throughput for the wireless base station. In some embodiments, the timing information is included in the wireless base station MIMO information.

In sub-step 3146, the CMTS determines which time slots in a data transmission scheduling cycle or frame to assign to each cable modem connected to the CMTS based on the data transmission latency between the CMTS and each wireless base station and the timing information received from each if the wireless base stations.

In sub-step 3138, the CMTS determines a time slot at time (T-Data Transmission Latency for CMTS to the first wireless base station) to send data to the first wireless base station when the first wireless base station timing information indicates time T is when data needs to be received at the first wireless base station to increase, optimize, and/or maximize data throughput for the first wireless base station.

Operation proceeds from step 3126 to step 3150.

In step 3150, the CMTS transmits data to the cable modems in accordance with the determined data transmission schedule. Operation proceeds from step 3150 to step 3152.

In step 3152, continue coordinating the scheduling and transfer of data from the CMTS to the cable modems based on wireless base station MIMO information received from the wireless base station connected to the cable modems, e.g., updated wireless base station MIMO information.

As discussed in sub-step 3140, in various embodiments of the invention in order to coordinate the assigned number of slots at the correct time, the CMTS needs to know the data transmission latency between itself and the wireless base station to which it is sending data. In order to measure this data transmission latency, the CMTS sends a ping message to the wireless base station. The wireless base station will record the data transmission latency based on which the ping message was received and will send this information to the CMTS. In some embodiments, it merely sends when the ping message was received and the CMTS determines the data transmission latency as it is aware of when it send the ping message, the data transmission latency being receipt of ping time–ping transmission time. In order for the wireless base station to transmit data at time T, the CMTS schedules and transmits data to the wireless base station at a time of "T-Data transmission latency."

While the method 3000 illustrated in FIG. 3, has been explained with respect to a single CMTS the method may be, and typically is implemented for multiple CMTS which each are connected to a plurality of cable modems which in turn are connected to a plurality of wireless base stations. It is to be understood as shown in system 100 that each network may, and typically does, include multiple CMTS which may implement the method 3000.

Figure 4:
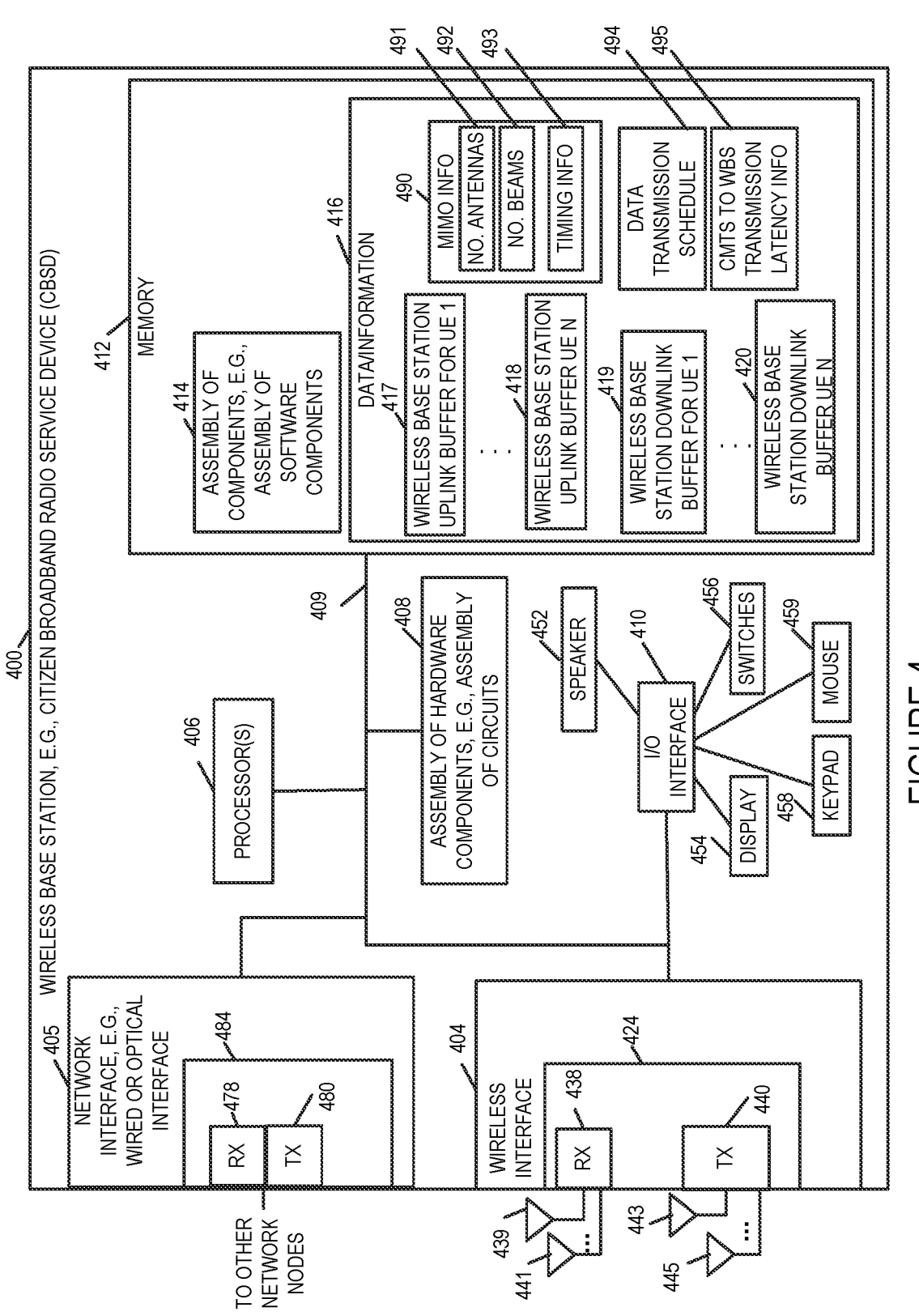
FIG. 4 illustrates details of an exemplary wireless base station (e.g., Citizens Broadband Radio Service Device (CBSD)) in accordance with one embodiment of the present invention.

FIG. 4 is a drawing of an exemplary wireless base station (WBS) (e.g., Citizens Broadband Radio Service Device (CBSD), LTE base station, 4G base station, 5G base station) 400 in accordance with an exemplary embodiment. The wireless base station device (e.g., CBSD device) 400 supports massive MIMO operation. In some embodiments, the wireless base station (e.g., CBSD device) 400 also includes the capabilities of a CBSD as defined by the Federal Communications Commission's Rules with Regard to Commercial Operations in the 3550-3650 MHz Band. Exemplary wireless base station (e.g., CBSD device) 400 includes a wireless interface 404, a network interface 405, e.g., a wired or optical interface, processor(s) 406 (one or more processors), e.g., a CPU, an assembly of hardware components 408, e.g., an assembly of circuits, and I/O interface 410 and memory 412 coupled together via a bus 409 over which the various elements may interchange data and information. Wireless base station 400 further includes a speaker 452, a display 454, switches 456, keypad 458 and mouse 459 coupled to I/O interface 410, via which the various I/O devices (452, 454, 456, 458, 459) may communicate with other elements (404, 405, 406, 408, 412) of the wireless base station 400. Network interface 405 includes a receiver 478 and a transmitter 480. In some embodiments, receiver 478 and transmitter 480 are part of a transceiver 484. Wireless interface 404 includes a wireless receiver 438 and a wireless transmitter 440. In some embodiments, receiver 438 and transmitter 440 are part of a transceiver 442. In various embodiments, wireless interface 404 includes a plurality of wireless receivers and a plurality of wireless transmitters. Wireless receiver 438 is coupled to a plurality of receive antennas (receive antenna 1 439, . . . , receive antenna M 441), via which wireless base station 400 can receive wireless signals from other wireless communications devices including a second wireless communications device, e.g., a UE device. Wireless transmitter 440 is coupled to a plurality of wireless transmit antennas (transmit antenna 1 443, . . . , transmit antenna N 445) via which the wireless base station 400 can transmit signals to other wireless communications devices including a second wireless communications device, e.g., a UE device. The transmit antennas can be used to operate in massive MIMO mode of operation in which the wireless base station uses the antennas to form one or more beams to transmit data to one or more of the user equipment devices. The transmit antennas are typically directional antennas. Memory 412 includes an assembly of component 414, e.g., an assembly of software components, and data/information 416. Data/information 416 includes wireless base station uplink buffer UE 1 417, . . . , wireless base station uplink buffer UE N 418, wireless base station downlink buffer UE 1 419, . . . , wireless base station UE N 420, MIMO information, e.g., MIMO reports, 490, data transmission schedule 494 and CMTS to wireless base station latency information 495. The CMTS to wireless base station latency information is the amount of latency or delay introduced by the transmission of data from the CMTS to the wireless base station and is sometime determined by the wireless base station from a ping message received by the wireless base station from the CMTS. The wireless base station determining the CMTS to wireless base station transmission latency by subtracting the time of transmission of the ping message from the time of arrival at the wireless base station. The time of transmission being included in or derived from the ping message. The data transmission schedule information 494 includes one or more of the following: (i) information about the CMTS data transmission schedule for transmitting data to the wireless base station (e.g., information indicating when and how much data will be transmitted to the CMTS in each data transmission cycle such as which time slots in a data transmission cycle are assigned to the wireless base station, and (ii) information about the data transmission schedule generated by the wireless base station to transmit to communicate/transmit downlink data to the user equipment devices it is services. The MIMO information 490 in some embodiments includes number of antennas 491 at the wireless base station, number of beams, e.g., number of beams generated, formed, created, and/or during a period of time at the wireless base (e.g., average number of beams over the time period), timing information 493 specifying or indicating time(s) or recurring time periods when wireless base station requests receipt of data from the CMTS (e.g., time prior to the start of its data transmission cycle so that the data can be transmitted to the UEs without a gap when no data is available for transmission because no data has been received from the CMTS). The timing information is used to coordinate the transmission of data from the CMTS to the wireless base station. The wireless base station providing the timing information and the CMTS to wireless base station transmission latency to the CMTS so that the CMTS can generate a coordinated CMTS downlink data transmission schedule that optimizes when the CMTS transmission to and wireless base station receipt of data to be provided to the user equipment devices being serviced by the wireless base station.

The wireless base station includes a separate uplink data buffer for each user equipment device which is connected to the wireless base station, e.g., to which it is actively providing services. The wireless base station also includes a separate downlink data buffer for each user equipment device which is connected to the wireless base station, e.g., to which it is actively providing services. In some embodiments, the wireless base stations discussed in the Figures and/or in connection with the embodiments of the present invention described are implemented in accordance with wireless base station 400. For example, WBS 1 (e.g., CBSD 1) 102 and/or WBS 2 (e.g., CBSD 2) 112 of system 100, may be, and in some embodiments are, implemented in accordance with wireless base station 400.

Figure 5:
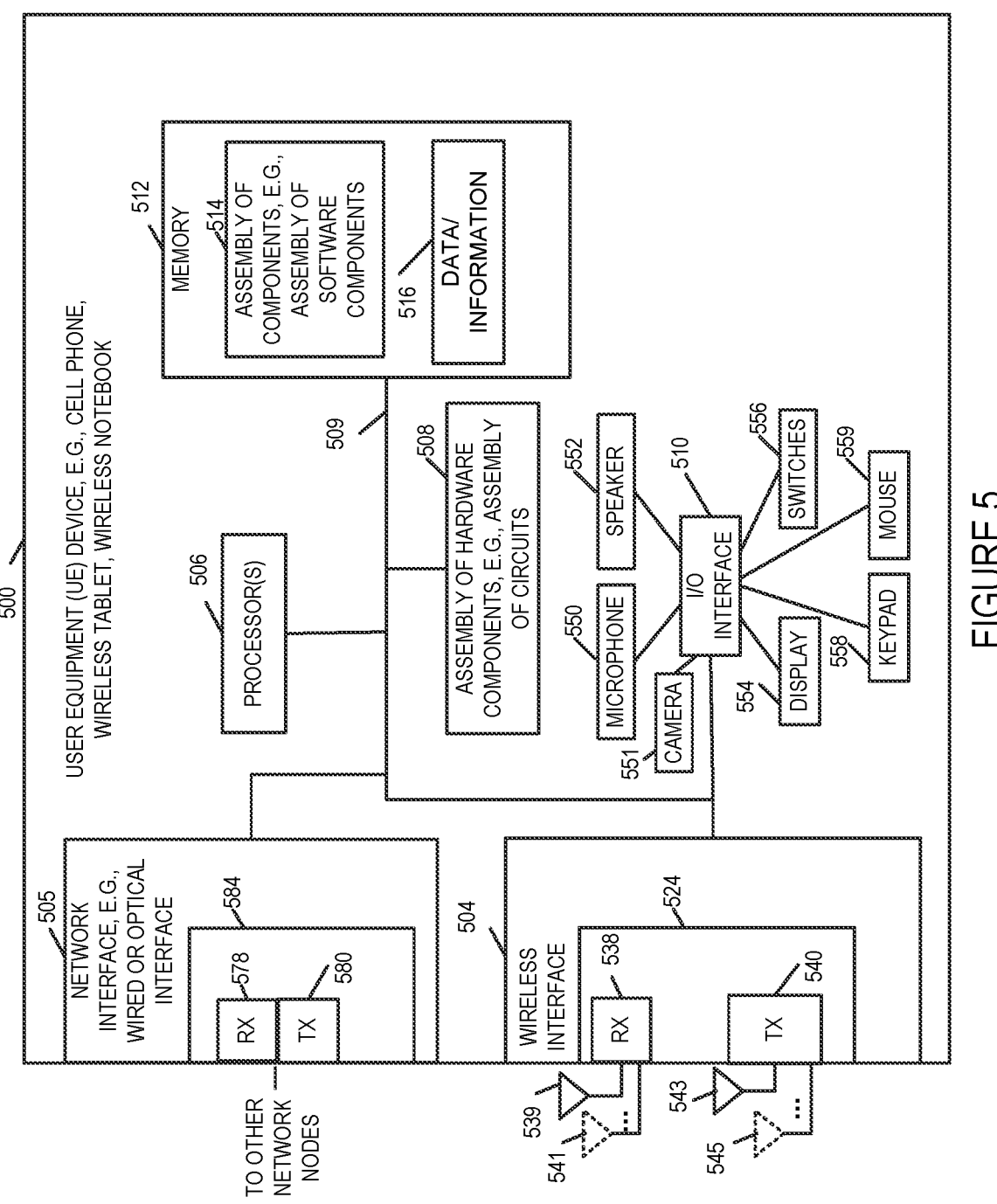
FIG. 5 illustrates details of an exemplary User Equipment (UE) device in accordance with one embodiment of the present invention.

FIG. 5 is a drawing of an exemplary user equipment (UE) device 500 in accordance with an exemplary embodiment. UE device 500 is, e.g., a mobile device such as a cell phone, a smart phone, wireless tablet or wireless notebook. UE device 500, in some embodiments, includes CBRS, 5G, Long Term Evolution (LTE), e.g., 4G LTE, mobile device capabilities. The user equipment device 500 supports massive MIMO operation. Exemplary UE device 500 includes a wireless interface 504, a network interface 505, a processor (s) 506, e.g., a CPU, an assembly of hardware components 508, e.g., an assembly of circuits, and I/O interface 510 and memory 512 coupled together via a bus 509 over which the various elements may interchange data and information. UE device 500 further includes a microphone 550, camera 551, speaker 552, a display 554, e.g., a touch screen display, switches 556, keypad 558 and mouse 559 coupled to I/O interface 510, via which the various 1/O devices (550, 551, 552, 554, 556, 558, 559) may communicate with other elements (504, 505, 506, 508, 512) of the UE device. Network interface 505 includes a receiver 578 and a transmitter 580. In some embodiments, receiver 578 and transmitter 580 are part of a transceiver 584. Wireless interface 504 includes a wireless receiver 538 and a wireless transmitter 540. In some embodiments, receiver 538 and transmitter 540 are part of a transceiver 524. In various embodiments, wireless interface 504 includes a plurality of wireless receivers and a plurality of wireless transmitters. Wireless receiver 538 is coupled to one or more receive antennas (receive antenna 1 539, . . . , receive antenna M 541), via which UE device 500 can receive wireless signals from other wireless communications devices including, e.g., a wireless base station such as wireless base station 400. Wireless transmitter 540 is coupled to one or more wireless transmit antennas (transmit antenna 1 543, . . . , transmit antenna N 545) via which the UE device 500 can transmit signals to other wireless communications device including a first wireless communications device, e.g., a wireless base station 400. Memory 512 includes an assembly of components 514, e.g., an assembly of software components, and data/information 516. The user equipment devices illustrated in FIG. 1 may be, and in some embodiments are, implemented in accordance with user equipment device 500.

Figure 6:
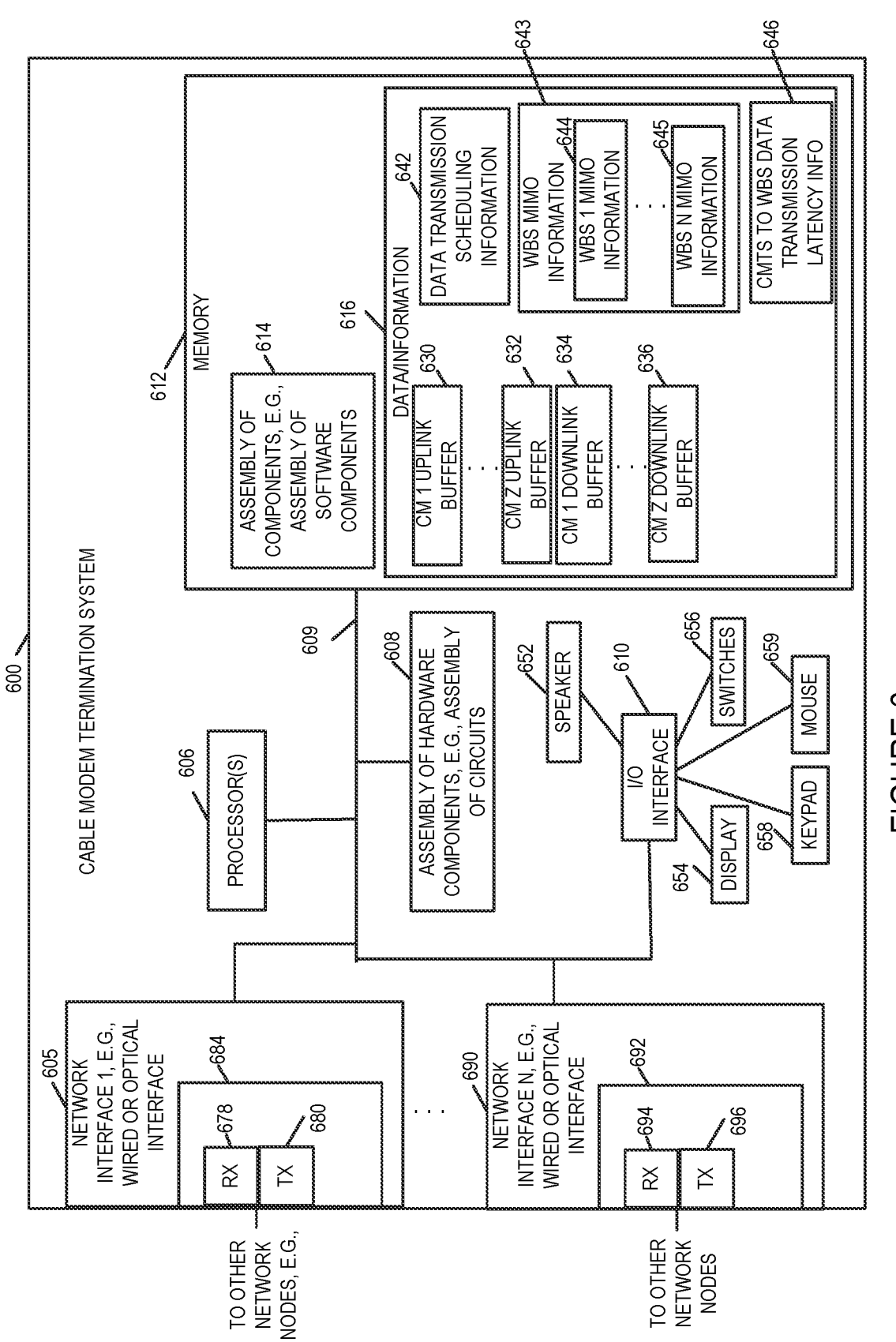
FIG. 6 illustrates details of an exemplary cable modem termination system in accordance with one embodiment of the present invention.

FIG. 6 is a drawing of an exemplary cable modem termination system in accordance with an exemplary embodiment. The cable modem termination system in some embodiments is implemented in accordance with DOCSIS standards. The cable modem termination system 600 includes a plurality of network interfaces 605, . . . , 690, e.g., a wired or optical interface, a processor(s) 606 (e.g., one or more processors), e.g., a CPU, an assembly of hardware components 608, e.g., an assembly of circuits, and I/O interface 610 and memory 612 coupled together via a bus 609 over which the various elements may interchange data and information. The computing device 600 further includes a speaker 652, a display 654, switches 656, keypad 658 and mouse 659 coupled to I/O interface 610, via which the various I/O devices (652, 654, 656, 658, 659) may communicate with other elements (605, . . . , 690, 606, 608, 612) of the cable modem termination system 600. Network interface 605 includes a receiver 678 and a transmitter 680. The network interface 605 is typically used to communicate with other devices, e.g., cable modems, CMTS power management device, other devices in the network core. In some embodiments, receiver 678 and transmitter 680 are part of a transceiver 684. Memory 612 includes an assembly of component 614, e.g., an assembly of software components, and data/information 616. Data/information 616 includes, among other things, uplink and downlink buffers for each cable modem to which it is connected which are shown as CM 1 uplink buffer 630, . . . , CM Z uplink buffer 632 and CM 1 downlink buffer 634, . . . , CM Z downlink buffer 636. The data information 616 also includes data transmission scheduling information 642, e.g., information on the amount of data and when that data is to be transmitted to each of the cable modems connected to the wireless base station. The data transmission scheduling information in some embodiments includes the CMTS data transmission schedule and/or the CMTS data transmission scheduling cycle information, e.g., which time slots in a data transmission cycle are assigned to which cable modem. In some embodiments, the data transmission scheduling information 642 includes the information shown in table 1700 of FIG. 17. Data/information 616 also includes wireless base station (WBS) MIMO information 642, e.g., wireless base station MIMO reports or reported information. The wireless base station MIMO information 643 includes WBS 1 MIMO information, . . . , WBS N MIMO information, for each wireless base station connected to a cable modem connected to the CMTS. In some embodiments, N the number of wireless base stations is equal to Z the number of cable modems. In other embodiments, N is less than Z. The wireless base station MIMO information including, number of antennas at the wireless base station, number of beams formed, created, generated and/or used at the wireless base station during a period of time, and/or timing information used to coordinate the transmission of data to the wireless base station so that it is received at the wireless base station from the CMTS in a timely manner. The data/information 616 also includes CMTS to wireless base station (WBS) data transmission latency information 646. The data transmission latency information 646 including information indicating the amount of latency or delay introduced when transmitting data from the CMTS to each wireless base station. For example, the amount of time from CMTS transmission of a ping message to a wireless base station to the ping message's receipt at the wireless base station. The wireless base station MIMO information in some embodiments includes the information illustrated in table 1500 shown in FIG. 15. In some embodiments, cable modem termination systems disclosed in the figures and/or discussed in connection with the various embodiments of the invention are implemented in accordance with cable modem termination system 600. For example, cable modem termination system 1 122 and cable modem termination system 2 124 of system 100 of FIG. 1 are implemented in accordance with cable modem termination system 600.

Figure 7:
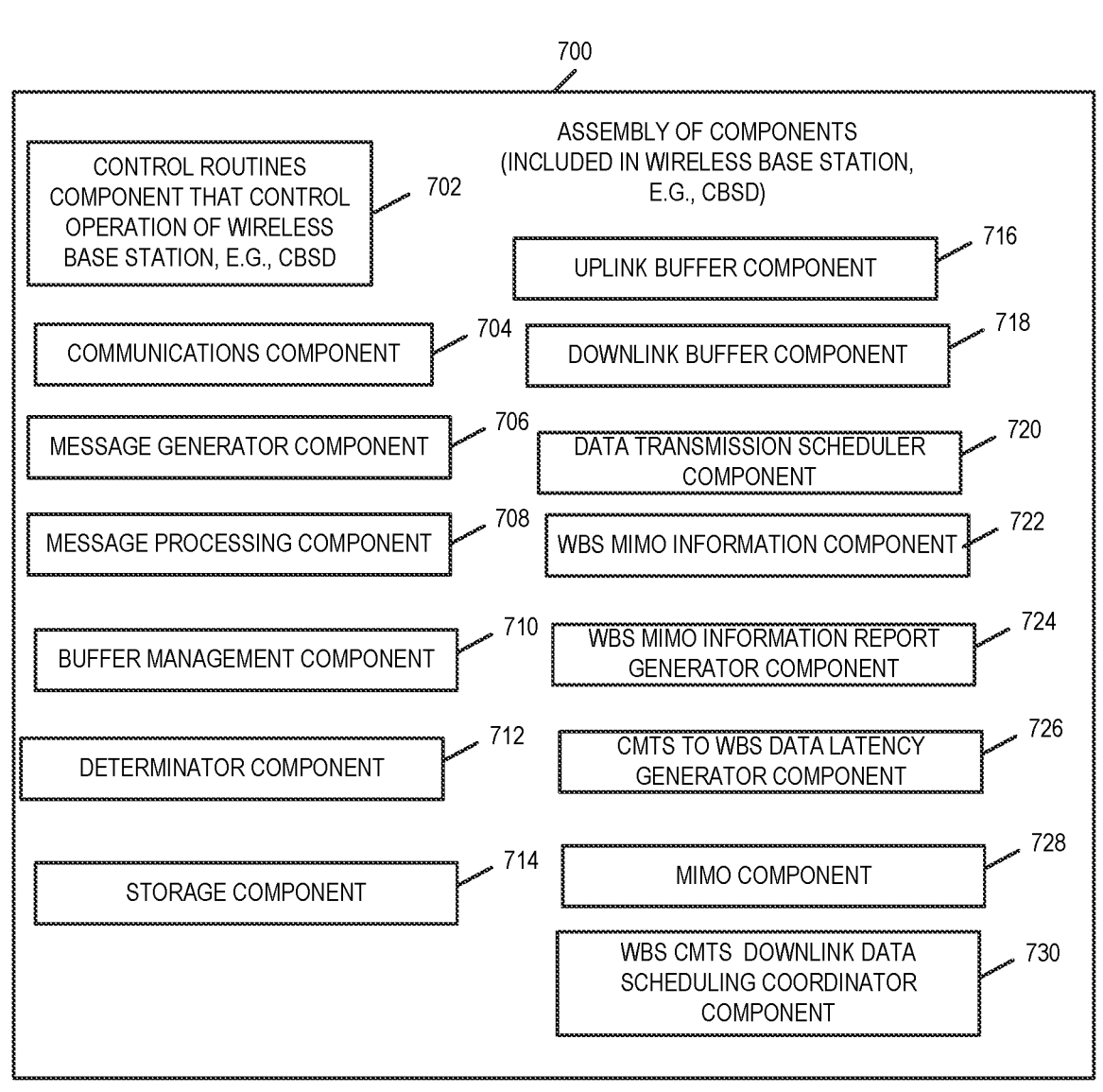
FIG. 7 illustrates an exemplary assembly of components for a wireless base station (e.g., CBSD) in accordance with an embodiment of the present invention.

FIG. 7 is a drawing of an exemplary assembly of components 700 which may be included in an exemplary wireless base station (e.g., exemplary wireless base station 400 of FIG. 4), in accordance with an exemplary embodiment. The components in the assembly of components 700 can, and in some embodiments are, implemented fully in hardware within a processor, e.g., processor 406, e.g., as individual circuits. The components in the assembly of components 700 can, and in some embodiments are, implemented fully in hardware within the assembly of hardware components 408, e.g., as individual circuits corresponding to the different components. In other embodiments some of the components are implemented, e.g., as circuits, within processor 406 with other components being implemented, e.g., as circuits within assembly of components 408, external to and coupled to the processor 406. As should be appreciated the level of integration of components on the processor and/or with some components being external to the processor may be one of design choice. Alternatively, rather than being implemented as circuits, all or some of the components may be implemented in software and stored in the memory 412 of the wireless base station 400, with the components controlling operation of wireless base station device 400 to implement the functions corresponding to the components when the components are executed by a processor e.g., processor 406. In some such embodiments, the assembly of components 700 is included in the memory 412 as assembly of software components 414. In still other embodiments, various components in assembly of components 700 are implemented as a combination of hardware and software, e.g., with another circuit external to the processor providing input to the processor which then under software control operates to perform a portion of a component's function.

When implemented in software the components include code, which when executed by a processor, e.g., processor 406, configure the processor to implement the function corresponding to the component. In embodiments where the assembly of components 700 is stored in the memory 412, the memory 412 is a computer program product comprising a computer readable medium comprising code, e.g., individual code for each component, for causing at least one computer, e.g., processor 406, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the wireless base station 400 or elements therein such as the processor 406, to perform the functions of corresponding steps illustrated and/or described in the method of one or more of the flowcharts, signaling diagrams and/or described with respect to any of the Figures. Thus the assembly of components 700 includes various components that perform functions of corresponding one or more described and/or illustrated steps of an exemplary method.

Assembly of components 700 includes a control routines component 702, a communications component 704, a message generator component 706, a message processing component 708, a buffer management component 710, a determinator component 712, a storage component 714, an uplink buffer component 716, and a downlink buffer component 718, a data transmission scheduler component 720, a wireless base station (WBS), Multiple Input Multiple Output (MIMO) information component 722, a wireless base station (WBS) MIMO information report generator component 724, a CMTS to wireless base station data latency generator component 726, a MIMO component 728, a wireless base station downlink data scheduling coordinator component 730.

The control routines component 702 is configured to control operation of the wireless base station (e.g., CBSD). The communication component 704 is configured to handle communications, e.g., transmission and reception of messages, and protocol signaling for the wireless base station (e.g., CBSD). The message generator component 706 is configured to generate messages for transmission to other devices, e.g., wireless base station MIMO information reporting message, CMTS to wireless base station data transmission latency reporting message, and ping response messages. The message processing component 708 is configured to process messages received from other devices, e.g., messages from user equipment devices, messages from a cable modem, messages from the CMTS, messages from an Spectrum Access System, and policy control function devices.

The buffer management component 710 is configured to implement all aspects related to buffer management including creation and management of uplink data buffer(s) for storing data from user equipment devices to be transmitted to the CMTS via the cable modem, creation of downlink buffer(s) for storing data received from the CMTS via the cable modem, providing wireless base station buffer information to the CMTS including uplink and downlink buffer size and fill rates, buffer ID, information correlating wireless base station downlink buffers to user equipment devices for which the buffer is being used to store downlink data, buffer status reports, buffer management mode of operation messages, creation of buffer status reports, creation of buffer mode of operation messages, notifications regarding buffer status, buffer capacity threshold generation and management for different UEs, uplink and downlink buffer sizes.

The determinator component 712 is configured to make determinations and decisions for the wireless base station including for example: buffer size, buffer capacity thresholds, when a buffer capacity threshold has been exceeded, when to send buffer status reports to the CMTS for a wireless base station downlink data buffer, number of antennas at the wireless base station, number of beams formed, generated, created, and/or used at the wireless base station over a period of time, CMTS to wireless base station data transmission latency or delay, downlink data transmission schedule to user equipment devices to which services are being provided, when to send MIMO information to the CMTS, determining timing information such as when the wireless base station requires data be received from the CMTS.

The storage component 714 is configured to manage the storage, and retrieval of data and/or instructions to/and from memory, buffers in memory, hardware buffers and/or storage device coupled and/or connected to the wireless base station.

The uplink buffer component 716 is configured to handle uplink buffer creation and modification, e.g., increase and decrease in buffer size, management, storage and retrieval of data to the uplink buffer, flushing and/or transmittal of data from the uplink buffer to the cable modem, provide notifications when thresholds have been exceeded with respect to buffer storage, provide notifications when the uplink buffer is fill, determine the uplink buffer size, increase uplink buffer size, determine uplink buffer fill rate, determine amount of time it takes for the uplink buffer to become fill, respond to queries and/or requests from the cable modem termination system to provide uplink buffer information. In some embodiments, uplink buffer component 716 is a sub-component of buffer management component 710 or storage component 714.

The downlink buffer component 718 is configured to handle downlink buffer creation and modification, e.g., increase and decrease in buffer size, management, storage and retrieval of data to the downlink buffer, increase downlink buffer size, flushing and/or transmittal of data from the downlink buffer to the user equipment devices, provide notifications when thresholds have been exceeded with respect to buffer storage, provide notifications when the downlink buffer is full, generate buffer status reports, send buffer status reports to the CMTS, determine the downlink buffer size for each downlink buffer, respond to queries and/or requests from the cable modem termination system to provide downlink buffer information. Determine buffer capacity threshold values for downlink data buffers. Determine when downlink buffer capacity threshold values have been exceeded. Determine when to send buffer status reports to a CMTS. In some embodiments, downlink buffer component 718 is a sub-component of buffer management component 710 or storage component 714.

The data transmission scheduler component 720 generates a schedule to send data to each of the user equipment devices it is servicing based on channel conditions, signal strength, data requirements, e.g., amount of data to be transmitted to the user equipment device. The data transmission scheduler component 720 also implements MIMO features to determine the number of beams to form, create, generate and/or use to transmit data to the user equipment devices it is providing services to.

The wireless base station MIMO information component 722 generates wireless base station MIMO information, e.g., number of antennas, e.g., MIMO antennas, at wireless base station, number of beams formed, created, generated, and/or used within a time period, e.g., average number of beams formed during N wireless base station downlink data transmission scheduling cycles, timing information that indicates when the wireless base station needs to receive data from the CMTS, e.g., to optimize MIMO operations and increase or maximize downlink throughput to the user equipment devices being serviced by the wireless base station.

The wireless base station MIMO information report generator component 724 generates report(s) and/or report message(s) (e.g., initial MIMO reports and updated MIMO reports) including wireless base station MIMO information such as for example, the number of antennas at the wireless base station, the number of beams being formed, generated, created and/or used during a time period to transmit data to user equipment devices, timing information to coordinate receipt of data transmission from the CMTS to optimize downlink data throughput to the user equipment devices being serviced by the wireless base station.

The CMTS to wireless base station data latency generator component 726 generates and/or determines information indicating the transmission latency or delay for data transmitted by the CMTS to be received by the wireless base station. The CMTS to wireless base station data latency generator component 726 in some embodiments, determines the data transmission latency from the CMTS to the wireless base station from a ping message received from the CMTS, e.g., by subtracting the time the ping message was transmitted from the CMTS from the time the wireless base station received the ping message (Latency=Ping time received−Ping time transmitted).

The MIMO component 728 provides MIMO functionality, e.g., multi-user massive MIMO functionality, at the wireless base station.

The wireless base station data downlink scheduling coordinator component 730 implements functionality for coordinating and/or managing the transmission of downlink data from the CMTS via a cable modem to the wireless base station including generating wireless base station MIMO information, communicating the wireless base station MIMO information to the CMTS, determining CMTS to wireless base station latency information and/or communicating the CMTS to wireless base station information to the CMTS, determining number of antennas at the wireless base station, determining number of beams used, created, generated and/or formed at the wireless base station during a period of time, determining and communicating updated wireless base station MIMO information to the CMTS, determining timing information and communicating it to the CMTS, the timing information indicating when (e.g., time or time period) that data needs to be received at the wireless base station to increase, optimize and/or maximize downlink data throughput for the wireless base station.

Figure 8:
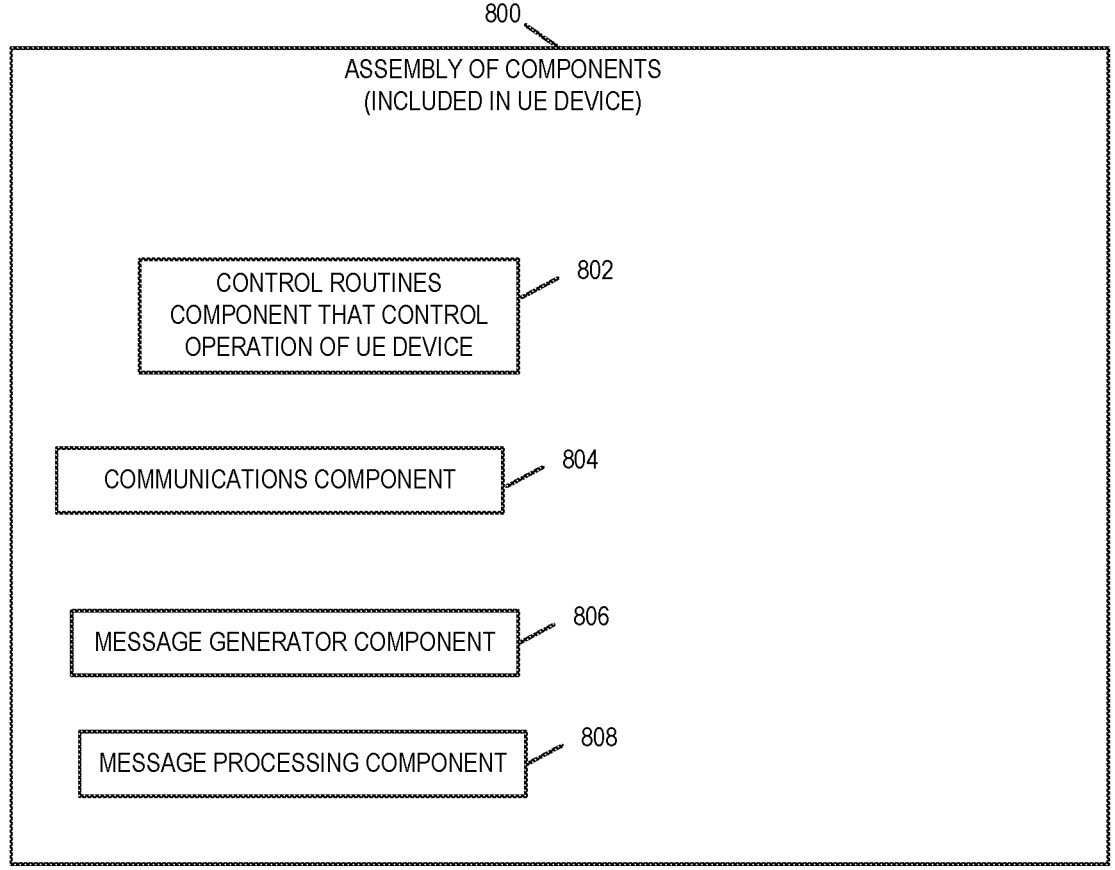
FIG. 8 illustrates an exemplary assembly of components for a user equipment device in accordance with an embodiment of the present invention.

FIG. 8 is a drawing of an exemplary assembly of components 800 which may be included in an exemplary user equipment (UE) device, e.g., UE device 500 of FIG. 5, in accordance with an exemplary embodiment. The components in the assembly of components 800 can, and in some embodiments are, implemented fully in hardware within a processor, e.g., processor 506, e.g., as individual circuits. The components in the assembly of components 800 can, and in some embodiments are, implemented fully in hardware within the assembly of hardware components 508, e.g., as individual circuits corresponding to the different components. In other embodiments some of the components are implemented, e.g., as circuits, within processor 506 with other components being implemented, e.g., as circuits within assembly of components 508, external to and coupled to the processor 506. As should be appreciated the level of integration of components on the processor and/or with some components being external to the processor may be one of design choice. Alternatively, rather than being implemented as circuits, all or some of the components may be implemented in software and stored in the memory 512 of the UE device 500, with the components controlling operation of UE device 500 to implement the functions corresponding to the components when the components are executed by a processor e.g., processor 506. In some such embodiments, the assembly of components 800 is included in the memory 512 as assembly of software components 514. In still other embodiments, various components in assembly of components 800 are implemented as a combination of hardware and software, e.g., with another circuit external to the processor providing input to the processor which then under software control operates to perform a portion of a component's function. When implemented in software the components include code, which when executed by a processor, e.g., processor 506, configure the processor to implement the function corresponding to the component. In embodiments where the assembly of components 800 is stored in the memory 512, the memory 512 is a computer program product comprising a computer readable medium comprising code, e.g., individual code for each component, for causing at least one computer, e.g., processor 506, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the UE device 500 or elements therein such as the processor 506, to perform the functions of corresponding steps illustrated and/or described in the method of one or more of the flowcharts, signaling diagrams and/or described with respect to any of the Figures. Thus the assembly of components 800 includes various components that perform functions of corresponding one or more described and/or illustrated steps of an exemplary method.

Assembly of components 800 includes a control routines component 802, a communications component 804, a message generator component 806, a message processing component 808.

The control routines component 802 is configured to control operation of the UE. The communication component 804 is configured to handle communications, e.g., receipt and transmission of signals and provide protocol signal processing for one or protocols for the UE. The message generator component 806 is configured to generate messages for transmission to the wireless base stations (e.g., CBSD devices) such as messages including user data and/or user data requests, control messages, etc. In some embodiments, the message generator component 806 is a sub-component of the communications component 804. The message processing component 808 processes received messages, e.g., requests for information. In some embodiments, the message processing component is a sub-component of the communications component 808.

Figure 9:
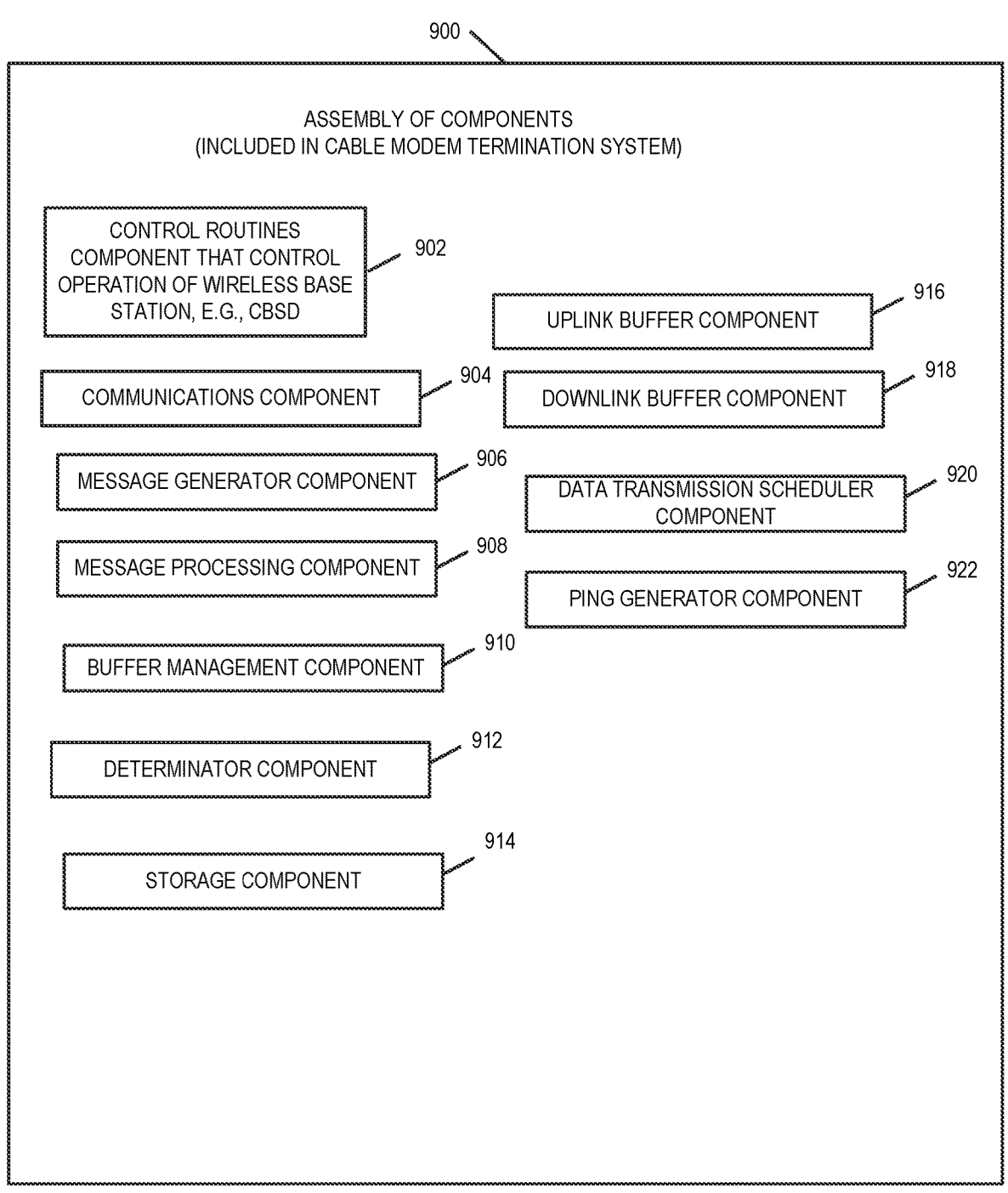
FIG. 9 illustrates an exemplary assembly of components for a cable modem termination system in accordance with an embodiment of the present invention.

FIG. 9 is a drawing of an exemplary assembly of components 900 which may be included in a cable modem termination system, e.g., cable modem termination system 600 of FIG. 6, in accordance with an exemplary embodiment. The components in the assembly of components 900 can, and in some embodiments are, implemented fully in hardware within a processor or one or more processors, e.g., processor(s) 606, e.g., as individual circuits. The components in the assembly of components 900 can, and in some embodiments are, implemented fully in hardware within the assembly of hardware components 608, e.g., as individual circuits corresponding to the different components. In other embodiments some of the components are implemented, e.g., as circuits, within processor(s) 606 with other components being implemented, e.g., as circuits within assembly of components 608, external to and coupled to the processor(s) 606. As should be appreciated the level of integration of components on the processor and/or with some components being external to the processor may be one of design choice. Alternatively, rather than being implemented as circuits, all or some of the components may be implemented in software and stored in the memory 612 of the cable modem termination system 600, with the components controlling operation of the cable modem termination system 600 to implement the functions corresponding to the components when the components are executed by a processor e.g., processor 606. In some such embodiments, the assembly of components 900 is included in the memory 612 as assembly of software components 614. In still other embodiments, various components in assembly of components 900 are implemented as a combination of hardware and software, e.g., with another circuit external to the processor providing input to the processor which then under software control operates to perform a portion of a component's function.

When implemented in software the components include code, which when executed by a processor or one or more processors, e.g., processor(s) 606, configure the processor(s) to implement the function corresponding to the component. In embodiments where the assembly of components 900 is stored in the memory 612, the memory 612 is a computer program product comprising a computer readable medium comprising code, e.g., individual code for each component, for causing at least one computer, e.g., processor 606, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 9 control and/or configure the cable modem termination system 600 or elements therein such as the processor(s) 606, to perform the functions of corresponding steps illustrated and/or described in the method of one or more of the flowcharts, signaling diagrams and/or described with respect to any of the Figures. Thus the assembly of components 900 includes various components that perform functions of corresponding one or more described and/or illustrated steps of an exemplary method.

Assembly of components 900 includes a control routines component 902, a communications component 904, a message generator component 906, a message processing component 908, a buffer management component 910, a determinator component 912, a storage component 914, an uplink buffer component 916, a downlink buffer component 918, data transmission scheduler component 920, a ping generator 922.

The control routines component 902 is configured to control operation of the cable modem termination system. The communication component 904 is configured to handle communications, e.g., transmission and reception of messages, and protocol signaling for the cable modem termination system. The message generator component 906 is configured to generate messages for transmission to other devices. The message processing component 908 is configured to process messages received from other devices, e.g., messages from cable modems, messages from core network, and messages from wireless base station, e.g., buffer management mode of operation messages, buffer status reports, buffer information messages.

The buffer management component 910 is configured to implement all aspects related to buffer management including creation and management of uplink data buffer(s) for storing data from cable modem devices to be transmitted to the core network devices, creation of downlink buffer(s) for storing data received from devices, e.g., core network devices for transmission to user equipment devices via cable modems and wireless base station(s).

The determinator component 912 is configured to make determinations and decisions for the cable modem termination system including for example: determining a downlink data transmission schedule for transmitting data to each cable modem and determining downlink data transmission latency between the CMTS and each wireless base station.

The storage component 914 is configured to manage the storage, and retrieval of data and/or instructions to/and from memory, buffers in memory, hardware buffers and/or storage device coupled and/or connected to the wireless base station.

The uplink buffer component 916 is configured to handle uplink buffer creation and modification, e.g., increases and decreases in buffer size, management, storage and retrieval of data to the uplink buffer, flushing and/or transmittal of data from the uplink buffer to the other devices, e.g., devices in the core network. In some embodiments, uplink buffer component 916 is a sub-component of buffer management component 910 or storage component 914.

The downlink buffer component 918 is configured to handle downlink buffer creation and modification, e.g., increases and/or decreases to buffer size, management, storage and retrieval of data to the downlink buffer, flushing and/or transmittal of data from the downlink buffer to the cable modem, determine the downlink buffer size, determine when the downlink buffer should not send data to the wireless base station but should instead store and/or maintain the data in a CMTS buffer. In some embodiments, downlink buffer component 918 is a sub-component of buffer management component 910 or storage component 914.

The data transmission scheduler component 920 generates a downlink data transmission schedule for transmitting data to cable modems attached to the CMTS. Exemplary data transmission schedule which are generated by the data transmission scheduler are shown in table 1700 of FIG. 17.

The ping generator component 922 generates ping messages which are sent to wireless base station which connected to the CMTS via cable modems.

Figure 11:
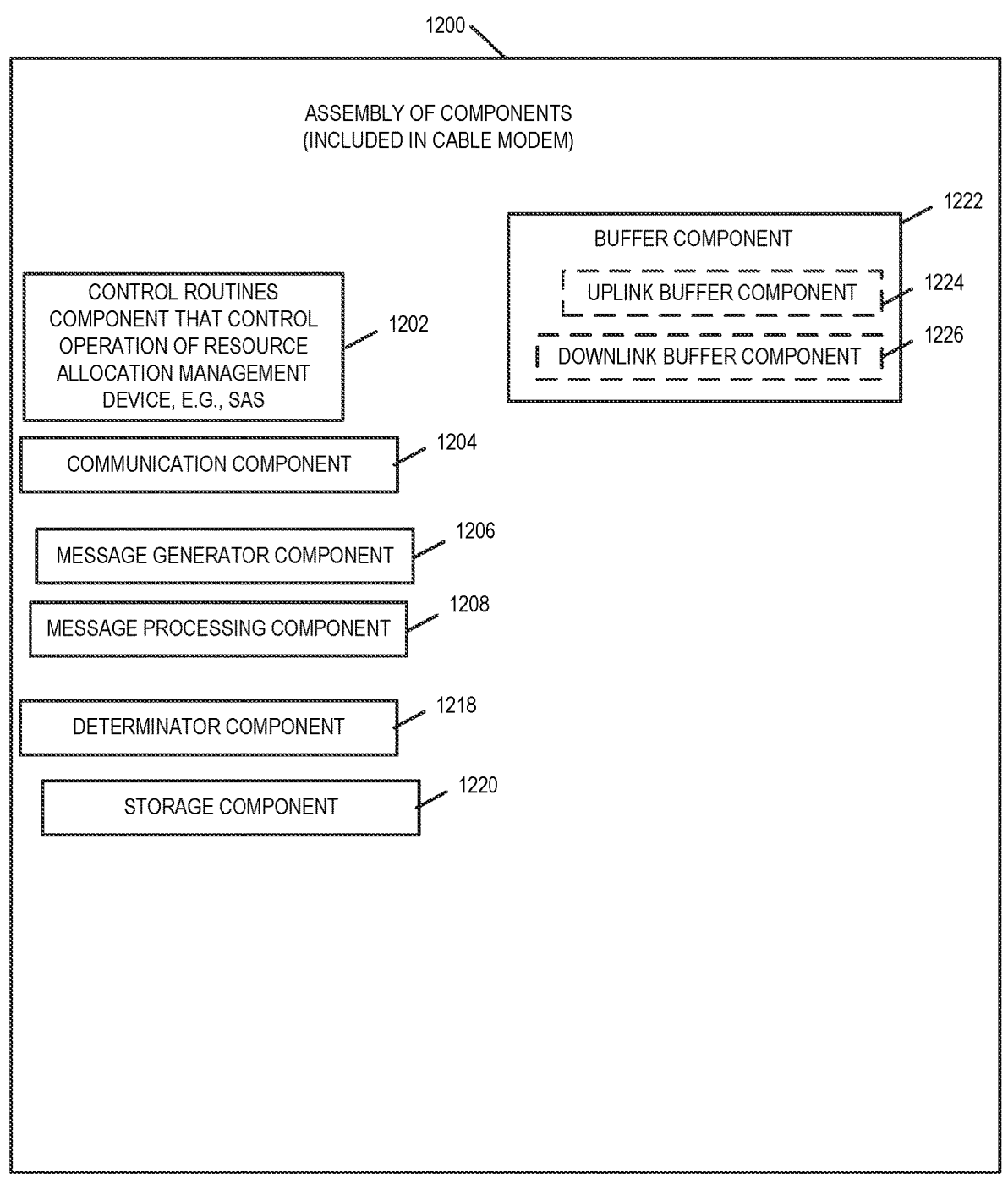
FIG. 11 illustrates details of an exemplary assembly of components for a cable modem in accordance with an embodiment of the present invention.

FIG. 11 is a drawing of an exemplary assembly of components 1200 which may be included in an exemplary cable modem (e.g., exemplary cable modem 200 of FIG. 2), in accordance with an exemplary embodiment. The components in the assembly of components 200 can, and in some embodiments are, implemented fully in hardware within a processor, e.g., processor 206, e.g., as individual circuits. The components in the assembly of components 200 can, and in some embodiments are, implemented fully in hardware within the assembly of hardware components 208, e.g., as individual circuits corresponding to the different components. In other embodiments some of the components are implemented, e.g., as circuits, within processor 206 with other components being implemented, e.g., as circuits within assembly of components 208, external to and coupled to the processor 206. As should be appreciated the level of integration of components on the processor and/or with some components being external to the processor may be one of design choice. Alternatively, rather than being implemented as circuits, all or some of the components may be implemented in software and stored in the memory 212 of the cable modem 200, with the components controlling operation of cable modem 200 to implement the functions corresponding to the components when the components are executed by a processor e.g., processor 206. In some such embodiments, the assembly of components 1200 is included in the memory 212 as assembly of software components 214. In still other embodiments, various components in assembly of components 1200 are implemented as a combination of hardware and software, e.g., with another circuit external to the processor providing input to the processor which then under software control operates to perform a portion of a component's function.

When implemented in software the components include code, which when executed by a processor, e.g., processor 206, configure the processor to implement the function corresponding to the component. In embodiments where the assembly of components 200 is stored in the memory 212, the memory 212 is a computer program product comprising a computer readable medium comprising code, e.g., individual code for each component, for causing at least one computer, e.g., processor 406, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 2 control and/or configure the cable modem 200 or elements therein such as the processor 206, to perform the functions of corresponding steps illustrated and/or described in the method of one or more of the flowcharts, signaling diagrams and/or described with respect to any of the Figures. Thus the assembly of components 1200 includes various components that perform functions of corresponding one or more described and/or illustrated steps of an exemplary method.

Assembly of components 1200 includes a control routines component 1202, a communications component 1204, a message generator component 1206, a message processing component 1208, a determinator component 1218, a storage component 1220, and a buffer component 1222. In some embodiments, the buffer component 1222 includes one or more of the following sub-components: an uplink buffer component 1224 and a downlink buffer component 1226.

The control routines component 1202 is configured to control operation of the cable modem. The communication component 1104 is configured to handle communications, e.g., transmission and reception of messages, data packets, and protocol signaling for the cable modem. The message generator component 1206 is configured to generate messages for transmission to other devices such as for example messages to be sent to the cable modem termination system and/or the wireless base station. The message processing component 1208 is configured to process messages received from other devices, e.g., messages such as messages including wireless bae station buffer management mode of operation messages, wireless base station buffer information messages, wireless base station, buffer status messages and/or data packets from a wireless base station and/or a cable modem termination system.

The determinator component 1218 is configured to make determinations and decisions for the cable modem.

The storage component 1220 is configured to manage the storage, and retrieval of data and/or instructions to/and from memory, buffers in memory, hardware buffers and/or storage devices coupled and/or connected to the cable modem.

The buffer component 1222 is configured to control the cable modem to implement all aspects related to buffer management including creation and management of an uplink data buffer for storing data from wireless base station to be transmitted to the cable modem termination system, creation of downlink buffer for storing data received from the cable modem termination system. In some embodiments, the buffer component 1222 is a sub-component of the storage component 1220.

In some embodiments the buffer component 1222 includes uplink buffer component 1224. The uplink buffer component 1224 is a sub-component of the buffer component 1222 and is configured to perform operations relating to the uplink buffer including uplink buffer creation and modification, e.g., increase and decrease in buffer size, management, storage and retrieval of data to the uplink buffer, flushing and/or transmittal of data from the uplink buffer to the cable modem termination system. In some embodiments, uplink buffer component 1224 is not a sub-component of buffer component 1222 but is a separate component. In some embodiments, the uplink buffer component 1224 is a sub-component of the storage component 1220.

In some embodiments the buffer component 1222 includes downlink buffer component 1226. The downlink buffer component 1226 is a sub-component of the buffer component 1222 and is configured to perform operations relating to the downlink buffer including downlink buffer creation and modification, e.g., increase and decrease in buffer size, management, storage and retrieval of data to the downlink buffer, flushing and/or transmittal of data from the downlink buffer to the wireless base station. In some embodiments, downlink buffer component 1226 is not a sub-component of buffer component 1222 but is a separate component. In some embodiments, the downlink buffer component 1226 is a sub-component of the storage component 1220.

Figure 10D:
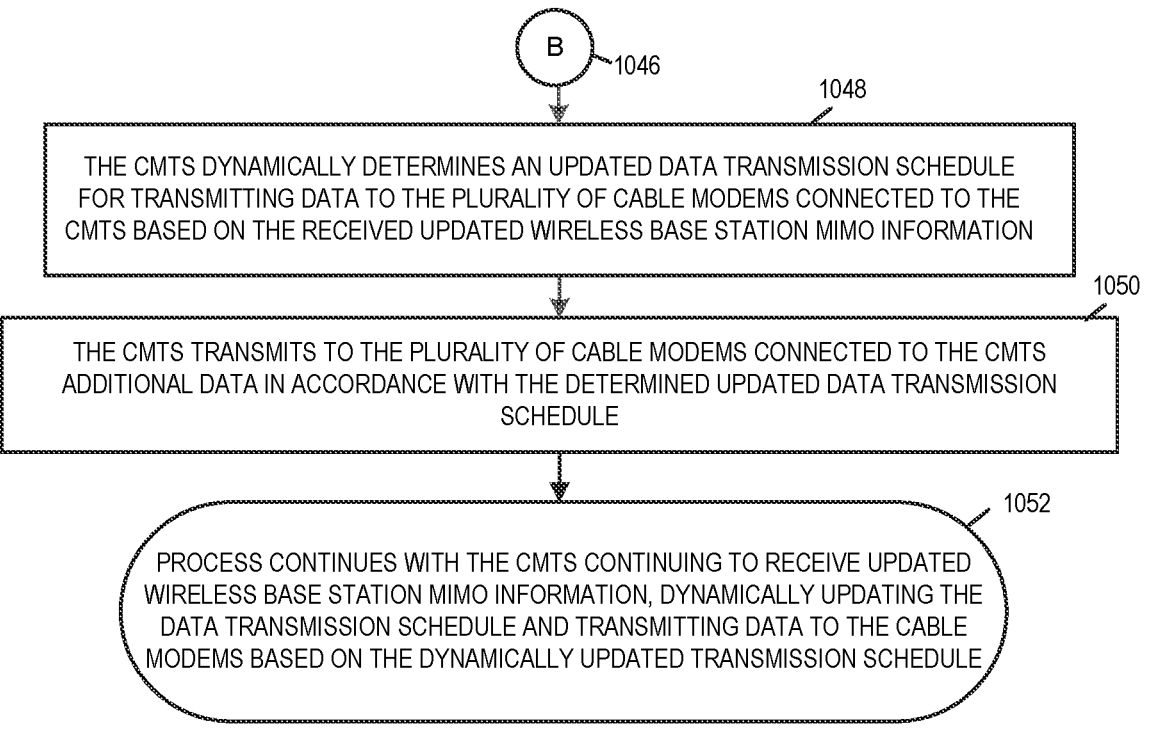
FIG. 10D illustrates the steps of the fourth part of an exemplary method in accordance with an embodiment of the present invention.

FIG. 10 illustrates the steps of a flowchart of a method 1000 which illustrates another exemplary method embodiment for dynamically managing communications between a cable modem termination system and a wireless base station. FIG. 10 illustrates the combination of FIGS. 10A, 10B, 10C, and 10D. FIG. 10A illustrates the steps of the first part of an exemplary method in accordance with an embodiment of the present invention. FIG. 10B illustrates the steps of the second part of an exemplary method in accordance with one embodiment of the present invention. FIG. 10C illustrates the steps of the third part of an exemplary method in accordance with an embodiment of the present invention. FIG. 10D illustrates the steps of the fourth part of an exemplary method in accordance with an embodiment of the present invention.

For explanatory purposes the exemplary method 1000 will be explained in connection with the exemplary communications system 100 illustrated in FIG. 1 wherein the wireless network is a CBRS network, the wireless base stations are CBSD devices which support MIMO operation, the resource allocation management devices are SAS devices, the user equipment devices are mobile terminals which support MIMO operation, and cables connect the cable modem 1 104, . . . , CM Y 114 to the cable modem termination system 1 122. The cable modem termination system 1 122 supplying power to the cable modems which in turn supplies power to the wireless base station 1 (CBSD 1) 102 and wireless base station 2 (CBSD 2) 112. However, it should be understood that the method may be implemented using other systems, e.g., other non-CBRS wireless systems as well as other system configurations then those illustrated in FIG. 1. While it will be readily understood that additional steps and signaling are performed in connection with communicating information, messages, and packets between devices, the method 1000 focuses on and discusses the steps and signaling for understanding the invention.

The method 1000 shown in FIG. 10 will now be discussed in detail. The method starts in start step 1002 shown on FIG. 10A.

Operation proceeds from start step 1002 to step 1004 shown on FIG. 10A.

In step 1004, a cable modem termination system (CMTS) (e.g., cable modem termination system 1 122 of system 100) receives wireless base station Multiple Input Multiple Output (MIMO) information. In some embodiments step 1004 includes sub-step 1006. In sub-step 1006, the cable modem termination system receives wireless base station MIMO information, said MIMO information including one or more of the following wireless base station antenna information (e.g., an indication of the number of antennas at each individual wireless base station connected to one of a plurality of cable modems connected to the CMTS), wireless base station beam information (e.g., an indication of a number of beams generated, created, formed and/or used at each individual wireless base station connected to one of the plurality of cable modems during a period of time). Operation proceeds from step 1004 to step 1008.

In step 1008, the CMTS determines a data transmission latency between the CMTS and each of the individual wireless base stations connected to one of the plurality of cable modems connected to the CMTS. In some embodiments, step 1008 includes one or more sub-steps 1010, 1012, and 1014.

In sub-step 1010, the CMTS sends a ping message to each of the individual wireless base stations connected to a cable modem connected to the CMTS.

In sub-step 1012, the CMTS receives a message back from each of the individual wireless base stations to which a ping message was sent by the CMTS with a data transmission latency value determined for the transmission of the ping message from the CMTS to the individual wireless base station. That is the data transmission latency value received from each individual wireless base station being the data transmission latency for a message sent from the CMTS to the individual wireless base station also sometimes referred to as the data transmission latency between the CMTS and the wireless base station.

In sub-step 1014, the CMTS determines the data transmission latency between the CMTS and each of the individual wireless base station connected to one of the plurality of cable modems connected to the CMTS based on the data transmission latency value determined by each wireless base station and reported to the CMTS in response to a ping message sent by the CMTS to each individual wireless base station. It is to be understood that the data transmission latency is the latency introduced on the downlink path from the CMTS to the wireless base station and includes any latency introduced by the cable modem which connects or couples the CMTS to the wireless base station and via which the ping message is communicated from the CMTS to the wireless base station. Operation proceeds from step 1014 via connection node A 1016 to step 1018 part A shown on FIG. 10B.

In step 1018, the CMTS determines a data transmission schedule for transmitting data to a plurality of cable modems connected to the CMTS. In some embodiments, step 1018 includes one or more sub-steps 1020, 1034, and 1038. Sub-steps 1034 and 1038 are shown on step 1018' part B shown on FIG. 10C.

In sub-step 1020, the CMTS determines a data transmission schedule for transmitting data to the plurality of cable modems connected to the CMTS based on the received wireless base station MIMO information. In some embodiments, sub-step 1020 includes one or more sub-steps 1022, 1026, 1028, and 1032.

In sub-step 1022, the CMTS determines a data transmission schedule for transmitting data to the plurality of cable modems connected to the CMTS based on wireless base station antenna information. The wireless base station MIMO information including the wireless base station antenna information. The wireless base station antenna information including an indication of the number of antennas at each individual wireless base station connected to the one of the plurality of cable modems. In some embodiments, sub-step 1022 includes sub-step 1024. In sub-step 1024, the CMTS determines a data transmission schedule for transmitting data to the plurality of cable modems connected to the CMTS based on the number of antennas at each of the individual wireless base stations connected to the one of the plurality of cable modems.

In sub-step 1026, the CMTS determines a data transmission schedule that includes scheduling a larger number of time slots in a data transmission schedule cycle for transmitting data to a first cable modem than for transmitting data to a second cable modem. The plurality of cable modems including the first cable modem and the second cable modem. The first cable modem is connected to a first wireless base station. The second cable modem is connected to a second wireless base station. The first wireless base station having more antennas than said second wireless base station. In various embodiments, the CMTS equates the number of antennas a wireless base station has with the amount of downlink data that a cable modem connected to and providing services for the wireless base station will receive from a core network via the CMTS. The higher the number of antennas the larger the amount of downlink data.

In sub-step 1028, the CMTS determines a data transmission schedule for transmitting data to the plurality of cable modems connected to the CMTS based on wireless base station beam information, said wireless base station MIMO information including the wireless base station beam information. The wireless base station beam information indicating a number of beams generated, formed, created, and/or used at each individual wireless base station connected to the one of the plurality of cable modems during a period of time. In some embodiments, sub-step 1018 includes sub-step 1030. In sub-step 1030, the CMTS determines a data transmission schedule for transmitting data to the plurality of cable modems connected to the CMTS based on the number of beams generated, formed, created, and/or used at each of individual wireless base stations connected to one of the plurality of cable modems during the period of time.

In sub-step 1032, the CMTS determines a data transmission schedule that includes scheduling a larger number of time slots in a data transmission schedule cycle for transmitting data to a first cable modem than for transmitting data to a second cable modem. The plurality of cable modems including the first cable modem and the second cable modem. The first cable modem is connected to a first wireless base station. The second cable modem is connected to a second wireless base station. The first wireless base station having generated, formed, created and/or used more beams than said second wireless base station during a first period of time.

In sub-step 1034 shown on FIG. 10C in step 1018' part B, the CMTS determines a data transmission schedule for transmitting data to the plurality of cable modems connected to the CMTS based on wireless base station antenna information and/or wireless base station beam information. In some embodiments, step 1034 includes sub-step 1036. In sub-step 1036, the CMTS determines a data transmission schedule for transmitting data to the plurality of cable modems connected to the CMTS based on the number of antennas at each of the individual wireless base stations and the number of beams generated, created, formed and/or used by each of the individual wireless base stations connected to a cable modem connected to the CMTS during a period of time.

In sub-step 1038, the CMTS determines a data transmission schedule for transmitting data to the plurality of cable modems connected to the CMTS based on data transmission latency between the CMTS and each individual wireless base station connected to one of the plurality of cable modems connected to the CMTS in addition to the received wireless base station MIMO information (e.g., wireless base station antenna information and/or wireless base station beam information (e.g., number of antennas at each of the individual wireless base stations and/or number of beams generated, created, formed and/or used at each of the individual wireless base stations during a period of time. Operation proceeds from step 1018 to step 1040.

In step 1040, the CMTS transmits to the plurality of cable modems connected to the CMTS data in accordance with the determined data transmission schedule. Operation proceeds from step 1040 to step 1042.

In step 1042, the CMTS receives updated wireless base station MIMO information. In some embodiments, step 1042 includes sub-step 1044. In sub-step 1044, the CMTS receives updated wireless base station MIMO information which includes one or more of the following: (i) updated wireless base station information (e.g., an updated indication of the number of antennas at each individual wireless base station connected to one of the plurality of cable modems connected to the CMTS), (ii) updated wireless base station beam information (e.g., an updated indication of a number of beams generated, created, formed and/or used at each of the individual wireless base stations connected to one of the plurality of cable modems during an additional time period. Operation proceeds from step 1042 via connection node B 1046 to step 1048 shown on FIG. 10D.

In step 1048, the CMTS dynamically determines an updated data transmission schedule for transmitting data to the plurality of cable modems connected to the CMTS based on the received updated wireless base station MIMO information. Operation proceeds from step 1048 to step 1050.

In step 1050, the CMTS transmits to the plurality of cable modems connected to the CMTS additional data in accordance with the determined updated data transmission schedule. Operation proceeds from step 1050 to step 1052.

In step 1052, the process continues with the CMTS continuing to receive updated wireless base station MIMO information, dynamically updating the data transmission schedule, and transmitting data to the cable modems based on the dynamically updated transmission schedule.

Various implementations and optional features of the method 1000 will now be discussed.

While the method 1000 has been described for a single CMTS the method is applicable to multiple cable modem termination systems which are each supporting a plurality of cable modems connected to wireless base station operating in a MIMO mode of operation.

Figure 12:
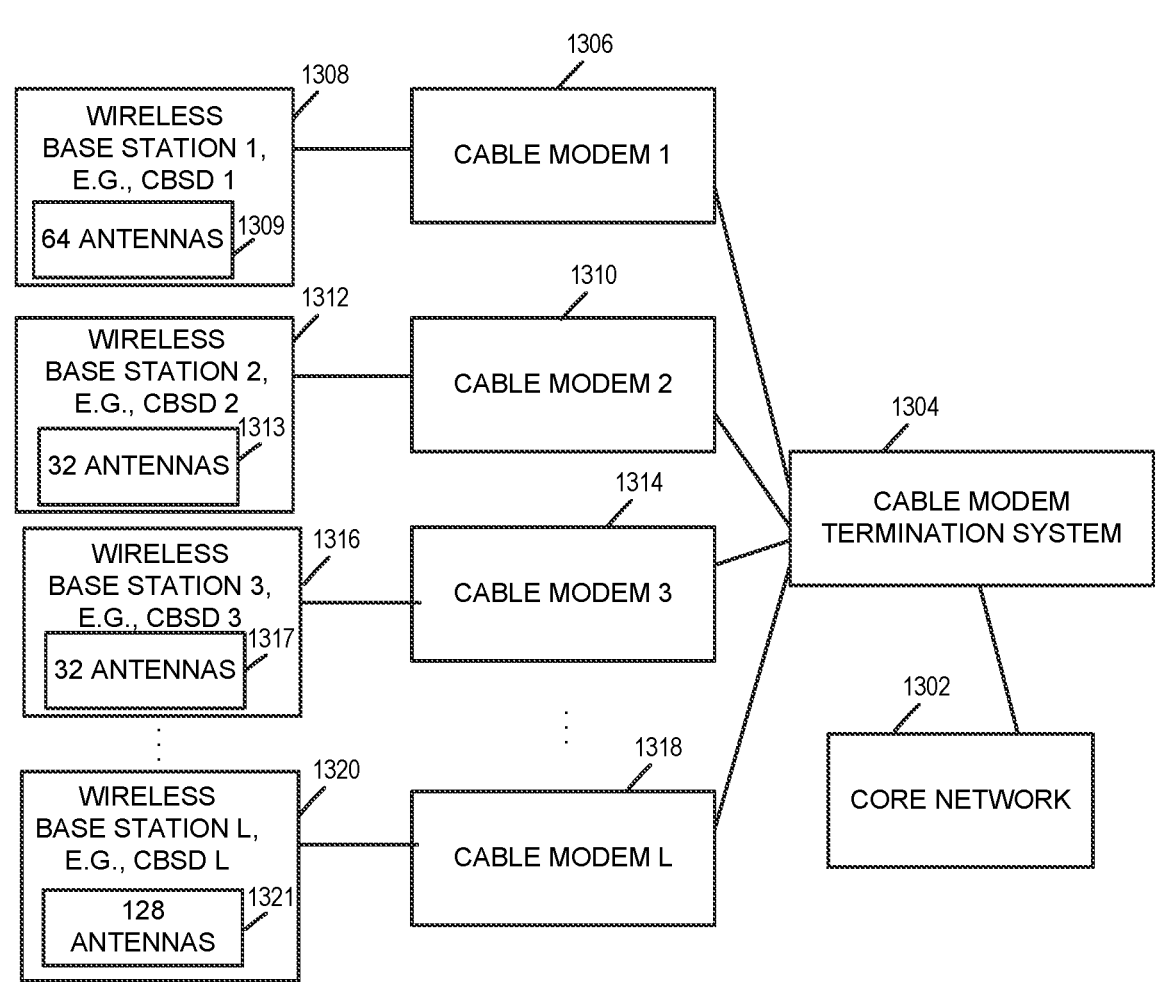
FIG. 12 illustrates another exemplary system in accordance with an embodiment of the present invention.

FIG. 12 illustrates another exemplary system in accordance with an embodiment of the present invention. System 1300 includes a core network 1302, a cable modem termination system 1304, a plurality of cable modems (cable modem 1 1306, cable modem 2 1310, cable modem 3 1314, cable modem, . . . , cable modem L 1318 (L being an integer greater than 3), and a plurality of wireless base stations (wireless base station 1 (e.g., CBSD 1) 1308, wireless base station 2 (e.g., CBSD 2) 1312, wireless base station 3 (e.g., CBSD 3) 1316, . . . , wireless base station L (e.g., CBSD L) 1320, (L being an integer greater than 3). The core network 1302 being connected to the cable termination system 1304. The cable termination system 1304 being connected to cable modem 1 1306, cable modem 2 1310, cable modem 3 1314, . . . , cable modem L 1318 e.g., via a wire(s), cable(s), a cable network, and/or an optical network. The cable modem termination system 1304 providing power to each of the cable modems 1 1306, 2 1310, 3 1314, . . . , L 1318. The wireless base station 1 1308 is connected to the cable modem 1 1306; wireless base station 2 1312 is connected to cable modem 2 1310, wireless base station 3 1316 is connected to cable modem 3 1314, . . . , wireless base station L 1320 is connected to cable modem L 1318. The wireless base stations are powered by the cable modems to which they are connected. In this exemplary system a cable modem is only connected to a single wireless base station. There is a one to one relationship between wireless base stations and cable modems. Each wireless base station 1, 2, 3, . . . , L is connected to and powered by a single cable modem. Communications between the core network and the wireless base station following the path of core network to CMTS to cable modem to wireless base station. For example, data from the core network for wireless base station 1 1308 follows the path core network 1302 to cable modem termination system 1304 to cable modem 1 1306 to wireless base station 1 1308. The wireless base stations of the plurality of wireless base station support Multiple Input Multiple Output (MIMO) operation in communicating with user equipment devices, e.g., mobile terminal, which connect to any of the individual wireless base stations. Wireless base station 1 1308 has 64 antennas 1309. Wireless base station 2 1312 has 32 antennas 1313. Wireless base station 1316 has 32 antennas 1317. Wireless base station L 1320 has 128 antennas.

Figure 13:
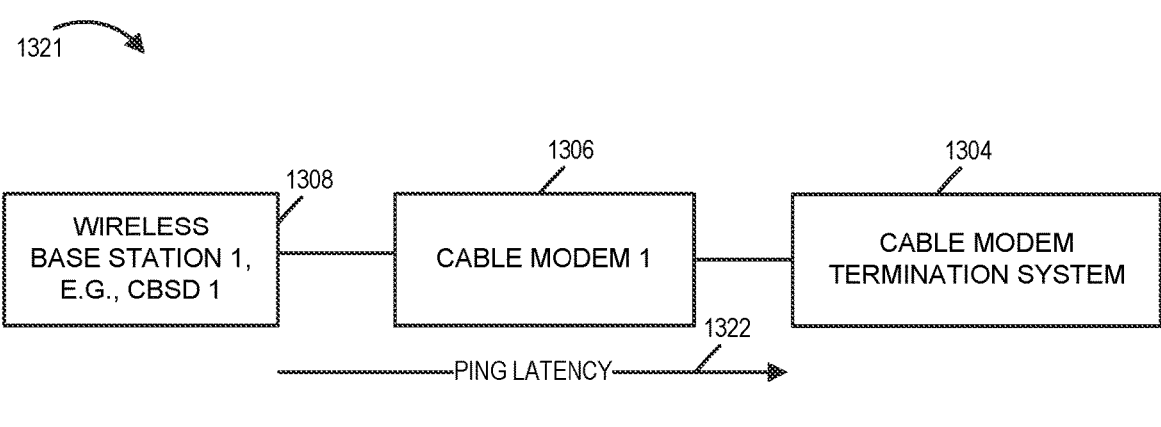
FIG. 13 illustrates an exemplary wireless base station sending ping latency information to a cable modem termination system in accordance with an embodiment of the present invention.

Diagram 1321 of FIG. 13 illustrates wireless base station 1 1308 sending ping latency information 1322, e.g., as a ping latency report message, to cable modem termination system 1304 via cable modem 1. The ping latency information 1322 is typically sent in response to a ping message sent by the cable modem termination system to a wireless base station. While only the ping latency for the downlink transmission path from the cable modem termination system 1304 to the wireless base station 1 1308 is shown, it is exemplary. The CMTS determines the downlink data transmission latency for each of the wireless base station connected to it in a similar manner by sending a ping message to each individual wireless base station and receiving a ping latency back from each of the wireless base stations. While this is one method of determining the downlink transmission latency between the cable modem termination system and the wireless base station to which it is providing services other methods may be, and in some embodiments are utilized such as dividing a round trip time by 2. However, using the round trip time is not as accurate for determining downlink transmission time.

Figure 14:
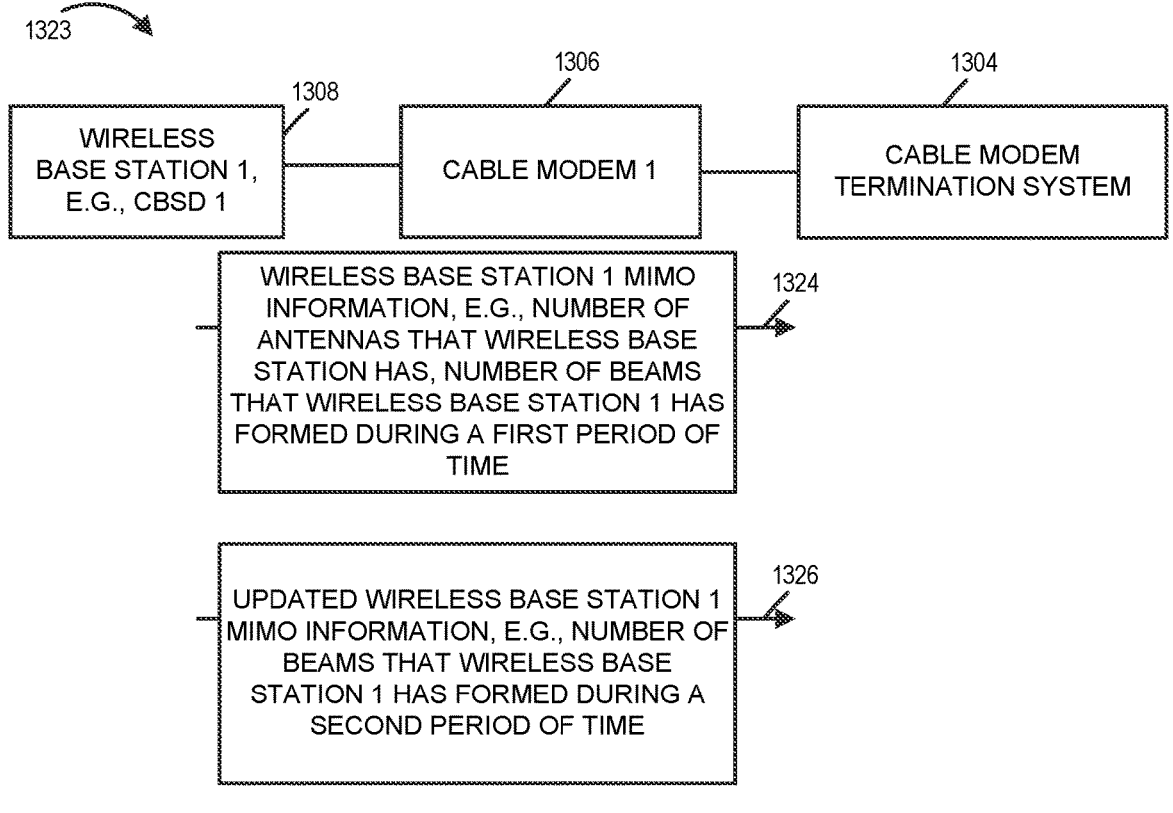
FIG. 14 illustrates an exemplary wireless base station sending wireless base station MIMO information to a cable modem termination system in accordance with an embodiment of the present invention.

Diagram 1323 of FIG. 14 illustrates a wireless base station providing or reporting wireless base station MIMO information. Wireless base station 1 1308 communicates, e.g., transmits, wireless station 1 MIMO information message 1324, e.g., which includes for example the number of antennas that wireless base station 1 has which is 64 and a number of beams that wireless base station 1 has formed during a first period of time (e.g., an average number of beams formed during a first time period, the first time period being the last N downlink data cycles, N being 100) which in this example is 100. The wireless base station MIMO information message 1324 is sent from the wireless base station 1 1308 via cable modem 1 1306 to cable modem termination system 1304. The cable modem termination system 1304 stores the received wireless base station MIMO information in memory or a storage device, e.g., a database and associated with the information an identifier of the wireless base station corresponding to the wireless base station 1 MIMO information and the cable modem from which it was received which in this example is cable modem 1. In many instances, the wireless base station 1 MIMO information message 1324 includes a wireless base station identifier which may be, and in some embodiments is, an Internet Protocol address for the wireless base station. Diagram 1323 also shows wireless base station 1 1308 communicating an updated wireless base station 1 MIMO information message 1326 to the cable modem termination system 1304. The updated wireless base station 1 MIMO information message is communicated after the wireless base station 1 MIMO information message 1324. The updated wireless base station 1 MIMO information message 1326 includes updated wireless base station 1 MIMO information such as for example, the number of beams that wireless base station 1 formed during a second period of time. The second period of time following the first period of time. In various embodiments, the first period of time and second period of time are included in the wireless base station 1 MIMO message 1324 and wireless base station 1 MIMO message 1326 respectively so that the cable modem termination system can determine the normalize the information with respect to other wireless base station MIMO information. The cable modem termination system 1304 upon receiving the updated wireless base station 1 MIMO message 1326 stores the updated MIMO information in memory or a storage device along with an identifier for the wireless base station 1 to which it corresponds and an identifier for cable modem 1 from which it was received. In some embodiments, the cable modem termination system updates the previously stored wireless base station 1 MIMO information. While the sending or reporting of wireless base station MIMO information has been shown with respect to the first wireless base station, each of the individual wireless base stations (wireless base station 1, 2, 3, . . . , L) connected to the cable modem termination system 1304 send or report their individual wireless base station MIMO information to the cable modem termination system 1304 via the cable modem which connects them to the cable modem termination system 1304.

FIG. 15 illustrates an exemplary table 1500 generated by the cable modem termination system 1304 in which the cable modem termination system 1304 stores records containing wireless base station information including wireless MIMO information and data transmission latency. The cable modem termination system accesses these records and/or information to determine its downlink data transmission schedule for transmitting data to the cable modems which are providing services to the wireless base stations. Each record including a cable modem identifier, a wireless base station identifier, number of antennas at the wireless base station with the wireless base station identifier, number of beams formed during a time period, and data transmission latency for downlink messages sent from the cable modem termination system to the wireless base station with the wireless base station identifier. The rows 1514, 1516, 1518, 1520, 1522 are records with the information in the row corresponding to a particular cable modem and wireless base station.

Table 1500 includes columns 1502, 1504, 1506, 1508 and 1510 and rows 1512, 1514, 1516, 1518, 1520, 1522. The first row 1512 includes labels identifying the information contained in the each of the columns. The entry (column 1502, row 1512) indicates that the entries in column 1502 includes cable modem IDs for cable modems connected to the wireless base station. The entries in column 1504 are wireless base station identifiers (col. 1504, row 1512 entry) which identify which wireless base station the information in the same record/row corresponds or belongs to. The entries in column 1506 identify the number of antennas (col. 1506, row 1512 entry) for the wireless base station identified in the same row. The entries in column 1508 identify the average number of beams, e.g., formed, (col. 1506, row 1512 entry) by the wireless base station identified in the same row during a time period, e.g., last N downlink data cycles, where N is a positive integer such as for example 100. The entries in column 1510 identify the downlink data transmission latency (col. 1510, row 1512 entry from the CMTS via the cable modem identified in the same row to the wireless base station identified in the same row).

Row 1514 includes information for the cable modem 1 (col. 1502, row 1514 entry) that indicates: (i) the cable modem 1 (col. 1502, row 1514 entry) is connected to and providing services to wireless base station 1 (WBS 1) (col. 1504, row 1514), (iii) the wireless base station 1 has 64 antennas (col 1506, row 1514), (iv) the wireless base station 1 formed 100 beams during a time period (col. 1508, row 1514), (v) the data transmission latency from the CMTS to the wireless base station 1 via cable modem 1 is 10 milliseconds (col. 1510, row 1514).

Row 1516 includes information for the cable modem 2 (col. 1502, row 1516 entry) that indicates: (i) the cable modem 2 (col. 1502, row 1516 entry) is connected to and providing services to wireless base station 2 (WBS 2) (col. 1504, row 1516), (iii) the wireless base station 2 has 32 antennas (col 1506, row 1516), (iv) the wireless base station 2 formed 50 beams during a time period (col. 1508, row 1516), (v) the data transmission latency from the CMTS to the wireless base station 2 via cable modem 2 is 100 milliseconds (col. 1510, row 1516).

Row 1518 includes information for the cable modem 3 (col. 1502, row 1518 entry) that indicates: (i) the cable modem 3 (col. 1502, row 1518 entry) is connected to and providing services to wireless base station 3 (WBS 3) (col. 1504, row 1518), (iii) the wireless base station 3 has 32 antennas (col 1506, row 1518), (iv) the wireless base station 3 formed 60 beams during a time period (col. 1508, row 1518), (v) the data transmission latency from the CMTS to the wireless base station 3 via cable modem 3 is 5 milliseconds (col. 1510, row 1518).

The . . . in row 1520 represent additional records with information for additional cable modems supporting wireless base stations.

Row 1522 includes information for the cable modem L (col. 1502, row 1522 entry) that indicates: (i) the cable modem L (col. 1502, row 1522 entry) is connected to and providing services to wireless base station L (WBS L) (col. 1504, row 1522), (iii) the wireless base station L has 128 antennas (col 1506, row 1522), (iv) the wireless base station L formed 500 beams during a time period (col. 1508, row 1522), (v) the data transmission latency from the CMTS to the wireless base station L via cable modem L is 500 milliseconds (col. 1510, row 1522).

As previously discussed, diagram 1600 of FIG. 16 illustrates that cable modem termination system 1304 includes a cable modem termination system data scheduler 1305. The cable modem termination system data scheduler 1305 generates or creates a downlink data transmission schedule. In this exemplary system 1300, the CMTS 1304 operates in a time division mode of operation in which it divides up a period of time for transmitting downlink data to the plurality of cable modems to which it is connected. The period of time is sometimes referred to as a downlink data transmission cycle or frame.

Diagram 1600 shown in FIG. 16 includes an example wherein, the downlink data transmission data cycle includes a set of N downlink data time slots 1340. The set of N downlink data time slots includes time slot 1 1330, time slot 2 1332, time slot 3 1334, . . . 1336, time slot N 1338. The cable modem termination system data scheduler determines a downlink data transmission schedule which identifies which time slot of the set of N downlink data time slots will be used to transmit downlink data to each cable modem. For example, time slots 1 and 2 may be used to transmit downlink data to the second wireless base station via the second cable modem and remaining time slots of the set of N time slots may be used to transmit data to the first wireless base station via first cable modem. The arrows from the cable modem termination system 1304 represent data being transmitted during the time slots. The CMTS downlink data transmission cycle repeats with a recurring set of N downlink data time slots. The CMTS data scheduler determining and assigning for each of the downlink data transmission cycles which slots will be used to transmit data to which cable modems. The CMTS data scheduler making the determinations and/or assignments based on the received wireless base station MIMO information.

Figure 17:
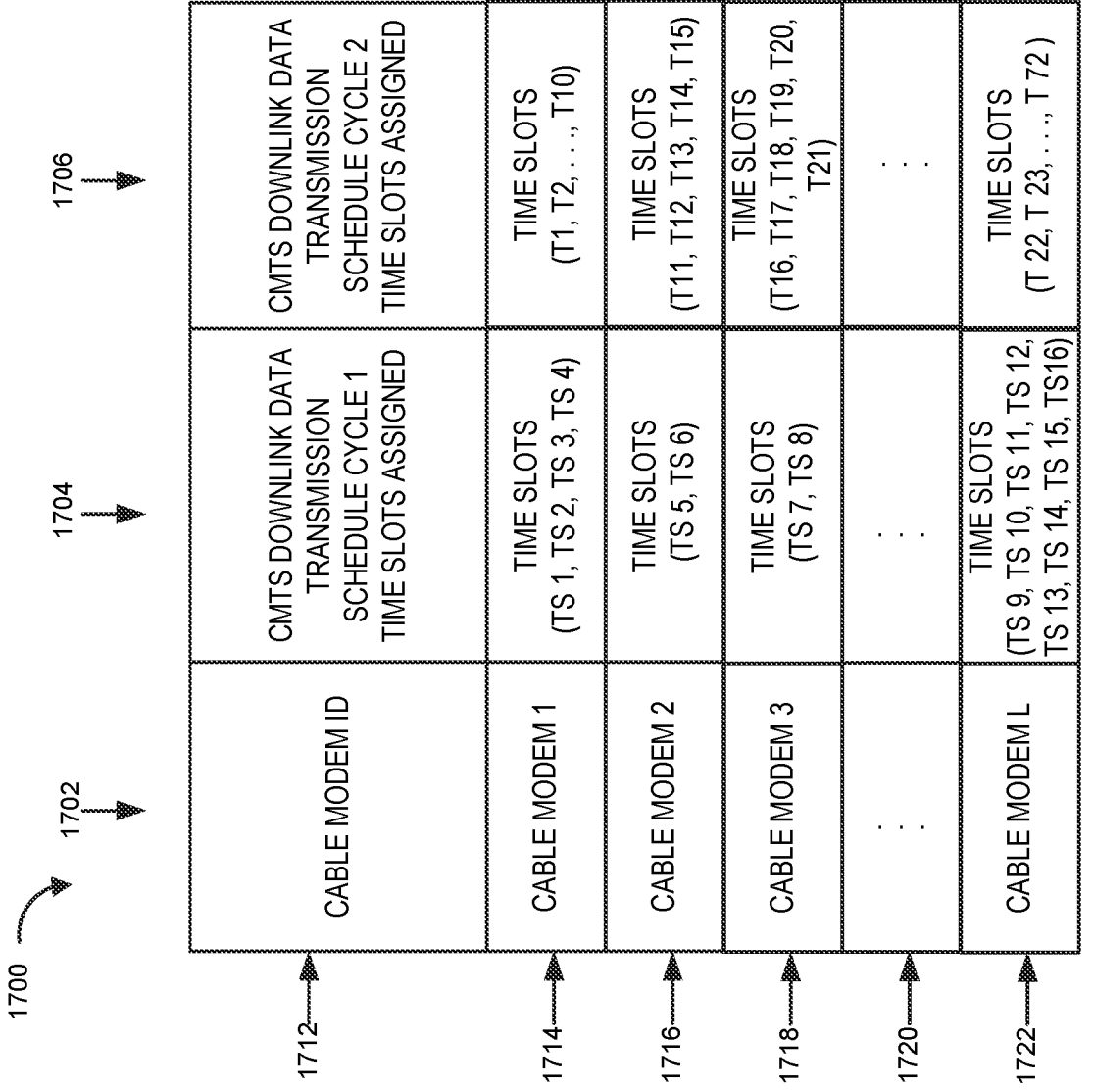
FIG. 17 illustrates a table including cable modem termination system downlink data transmission schedule information in accordance with an exemplary embodiment of the present invention.

FIG. 17 illustrates an exemplary CMTS downlink data transmission schedule for the system 1300 generated, created, and/or determined by the cable modem data scheduler 1305 of cable modem termination system 1304.

Table 1700 includes columns 1702, 1704, and 1706 and rows 1712, 1714, 1716, 1718, 1720, and 1722. The first row 1712 includes labels identifying the information contained in the each of the columns. The entry (column 1702, row 1712) indicates that the entries in column 1702 includes cable modem IDs for cable modems connected to the cable modem termination system. The entries in column 1704 are CMTS downlink data transmission schedule cycle 1 time slot assignments (col. 1704, row 1712 entry) which identify which time slots of the CMTS downlink data transmission cycle 1 are assigned to the cable modem identified in the same row. The entries in column 1706 identify the CMTS downlink data transmission schedule cycle 2 time slots assignments.

Row 1714 includes information for the cable modem 1 (col. 1702, row 1714 entry) that indicates: (i) the cable modem 1 (col. 1702, row 1714 entry) has been assigned time slots (TS) 1, 2, 3, and 4 (col. 1704, row 1714) in the CMTS downlink data transmission schedule cycle 1, and (ii) time slots 1, 2, 3, 4, 5, 6, 7, 8, 9 and 10 in the CMTS downlink data schedule cycle 2 (col 1706, row 1714).

Row 1716 includes information for the cable modem 2 (col. 1702, row 1716 entry) that indicates: (i) the cable modem 2 (col. 1702, row 1716 entry) has been assigned time slots (TS) 5 and 6 (col. 1704, row 1716) in the CMTS downlink data transmission schedule cycle 1, and (ii) time slots 11, 12, 13, 14, and 15 in the CMTS downlink data schedule cycle 2 (col 1706, row 1716).

Row 1718 includes information for the cable modem 3 (col. 1702, row 1718 entry) that indicates: (i) the cable modem 3 (col. 1702, row 1718 entry) has been assigned time slots (TS) 7 and 8 (col. 1704, row 1718) in the CMTS downlink data transmission schedule cycle 1, and (ii) time slots 16, 17, 18, 19, 20, and 21 in the CMTS downlink data schedule cycle 2 (col 1706, row 1718).

The . . . in row 1720 represent other cable modems connected to the CMTS and their corresponding data transmission schedule information for the fir CMTS downlink data transmission cycle 1 and CMTS downlink data transmission cycle 2.

Row 1722 includes information for the cable modem L (col. 1702, row 1722 entry) that indicates: (i) the cable modem L (col. 1702, row 1722 entry) has been assigned time slots (TS) 9, 10, 11, 12, 13, 14, 15 and 16 (col. 1704, row 1722) in the CMTS downlink data transmission schedule cycle 1, and (ii) time slots 22, 23, 24, . . . , 72 in the CMTS downlink data schedule cycle 2 (col 1706, row 1722).

In some embodiments, the CMTS data scheduler 1305 determines the time slots in the CMTS downlink data transmission schedule cycle, e.g., CMTS downlink data transmission schedule cycle 1, based on the received wireless base station MIMO information and the downlink latency transmission delay between the CMTS and each of the wireless base stations 1, 2, 3, . . . , L. In the example shown, the CMTS scheduler determined the number of time slots in the CMTS downlink data transmission schedule cycle 1 based on the number of antennas with the number of time slots assigned being a function of the number of antennas at the wireless base station to which the cable modem is connected. One time slot assigned per 16 antennas resulting in 4 time slots for cable modem 1 which has 64 antennas, 2 time slots for cable modem 2 which had 32 antennas, 2 time slots for cable modem 3 which has 32 antennas and 8 time slots for cable modem L which has 128 antennas. The CMTS data scheduler determines which time slots of the set of N time slots are assigned to each of the cable modems based on the downlink data transmission latency from the CMTS to each of the wireless base stations to which the cable modems are connected. The cable modem termination system identifying per cable modem time slots which are time of arrival at the an individual wireless base station—T (T being the downlink data transmission latency for the individual wireless base station). For example, with respect to cable modem 1 the CMTS will schedule data in time slot T1 which is in this example is 10 ms before the data is to arrive at the wireless base station 1. The CMTS in this way can coordinate with the wireless base station 1 that wireless base station 1 receives its downlink data from the CMTS before wireless base station 1 begins its next downlink data cycle of data transmissions to the user equipment devices it is supporting. In some embodiments, the CMTS sets an initial data transmission schedule based on the number of antennas at each wireless base station until it has received a plurality of reports from the wireless base station including beam information.

In some embodiments, the CMTS data scheduler 1305 determines the time slots in the CMTS downlink data transmission schedule cycle, e.g., CMTS downlink data transmission schedule cycle 2, based on the received wireless base station MIMO information and the downlink data transmission latency/delay between the CMTS and each of the wireless base stations 1, 2, 3, . . . , L. In the example, the CMTS scheduler determined for the CMTS downlink data transmission schedule cycle 2, the number of time slots based on beam information received from the cable modems which originated at the wireless base station connected to the cable modems. The number of time slots assigned by the CMTS data scheduler being a function of the number of beams e.g., formed, during a period at the wireless base station to which the cable modem is connected. In the example shown in table 1500, the average number of beams formed during a time period, e.g., last N downlink data cycles, was 100 for CM 1, 50 for cable modem 2, 60 for cable modem 3, and 500 for cable modem L. The CMTS data schedule assigned in the 1 time slot for every 10 beams formed during the time period resulting in 10 time slots for cable modem 1, 5 time slots for cable modem 2, 6 time slots for cable modem 3 and 50 time slots for cable modem L. The CMTS data scheduler may, and in some embodiments, does determine the particular time slots for the cable modems based on the data transmission latency of CMTS transmission to wireless base stations as previously described.

In some embodiments, the CMTS determines the number of time slots to provide to each cable modem based on the number of antennas at the wireless base station to which the cable modem is connected and the number beams formed, created, generated, and/or used or a time period by the wireless base station to which the cable modem is connected.

In some embodiments, the percentage of total time slots in a data transmission schedule cycle is determined for each cable modem based on: (i) the total number of time slots in a data transmission schedule cycle, (ii) a weighting factor W10 for number of antennas associated with a cable modem, (iii) the number of antennas associated with a cable modem, (iv) a weighting factor W2 for the number of beams associated with a cable modem, (v) number of beams associated with the cable modem. W1 and W2 being weighting factors that are used to factor in the importance of the number of antennas versus the number of beams associated with a cable modem via the wireless base station the cable modem is serving. In various embodiments, the CMTS serves both cable modems connected to wireless base stations and cable modems which are not connected to wireless base stations. The CMTS assigns a default number of time slots to the cable modems which are not serving wireless base stations. In various embodiments, the number of time slots assigned to a cable modem in a data transmission schedule cycle is also based on the amount of data that has been received and/or buffered at the CMTS. For example, when a CMTS downlink data buffer for a cable modem exceeds a threshold value the CMTS will assign additional time slots to the cable modem to reduce the amount of data being stored at the CMTS in connection with the cable modem.

In some embodiments, the wireless base stations are part of a wireless network operated by a first service provider. In some embodiments, the cable modems are part of a cable network operated by the first service provider. In some embodiments, the cable modem termination system is part of the cable network operated by the first service provider. In some embodiments, the wireless base stations are Citizens Broadband Service Device (CBSD) which support MIMO operation (e.g., CBSDs supporting 5G NR MIMO operation) and the wireless network is a Citizens Broadband Radio Service (CBRS) network, e.g., a 5G CBRS network. In most embodiments, the cable modems are powered by the cable modem termination system. In various embodiments, the wireless base stations are powered by the cable modem termination system via the cable modem.

Various exemplary numbered embodiments illustrating different features of the present invention will now be discussed. The various features discussed may be used in variety of different combinations. The numbered embodiments are only exemplary and are not meant to be limiting to the scope of the invention. The various method embodiments may be, and in some embodiments are, implemented on system 100 of FIG. 1 or system 1300 of FIG. 12.

List of Exemplary Numbered Method Embodiments

Method Embodiment 1: A communications method comprising: receiving, at a cable modem termination system (CMTS), wireless base station multiple input multiple output (MIMO) information; and determining, at the CMTS, a data transmission schedule for transmitting data to a plurality of cable modems connected to the CMTS based on the received wireless base station MIMO information.

Method Embodiment 2. The communications method of Method Embodiment 1, further comprising: transmitting from the CMTS to the plurality of cable modems connected to the CMTS data in accordance with the determined data transmission schedule.

Method Embodiment 3. The communications method of Method Embodiment 1, wherein the wireless base station MIMO information includes: wireless base station antenna information, said wireless base station antenna information indicating a number of antennas at each individual wireless base station connected to one of the plurality of cable modems.

Method Embodiment 4. The communications method of Method Embodiment 3, wherein said determining, at the CMTS, a data transmission schedule for transmitting data to a plurality of cable modems connected to the CMTS based on the received wireless base station MIMO information includes: determining the data transmission schedule based on the number of antennas at each of the individual wireless base stations connected to one of the plurality of cable modems.

Method Embodiment 5. The communications method of Method Embodiment 4, wherein cable modems connected to wireless base stations with a higher number of antennas are assigned more time slots in the data transmission schedule than cable modems connected to wireless base stations with a lesser number of antennas (e.g., cable modem 1 is connected to wireless base station 1 which is operating in MIMO mode of operation and has 16 antennas is assigned more time slots in the data transmission schedule than cable modem 2 which is connected to wireless base station 2 which is operating in MIMO mode of operation and has 4 antennas).

Method Embodiment 5A. The communications method of Method Embodiment 4, wherein each data schedule cycle of the data transmission schedule includes a plurality of time slots, the number of time slots assigned to each of the plurality of cable modems being proportional to the number of antennas at the individual wireless base station to which the cable modem is connected.

Method Embodiment 5B. The communications method of Method Embodiment 3, wherein said determining, at the CMTS, a data transmission schedule for transmitting data to a plurality of cable modems connected to the CMTS based on the received wireless base station MIMO information includes: determining a data transmission schedule that includes scheduling a larger number of time slots in a data transmission schedule cycle for transmitting data to a first cable modem than for transmitting data to a second cable modem, said first cable modem providing services to a first wireless base station, said second cable modem providing services to a second wireless base station, said first wireless base station having more antennas than said second wireless base station.

Method Embodiment 6. The communications method of Method Embodiment 1, wherein the wireless base station MIMO information includes: wireless base station beam information, said wireless base station beam information indicating a number of beams formed at each individual wireless base station connected to one of the plurality of cable modems during a period of time.

Method Embodiment 6A. The communications method of Method Embodiment 6, wherein the period of time is one of the following: (i) a period of time specified by the CMTS, (ii) a period of time based on a CMTS downlink data transmission scheduling cycle, (iii) a period of time based on each individual wireless base station's downlink data transmission scheduling cycle, and (iv) a period of time included with an indication of the number of beams formed at an individual wireless base station during said period of time.

Method Embodiment 7. The communications method of Method Embodiment 6, wherein said determining, at the CMTS, a data transmission schedule for transmitting data to a plurality of cable modems connected to the CMTS based on the received wireless base station MIMO information includes: determining the data transmission schedule based on the number of beams formed during the period of time at each of the individual wireless base stations connected to one of the plurality of cable modems.

Method Embodiment 8. The communications method of Method Embodiment 7, wherein cable modems connected to wireless base stations with a higher number of beams are assigned more time slots in the data transmission schedule than cable modems connected to wireless base stations with a lesser number of beams (e.g., cable modem 1 is connected to wireless base station 1 which is operating in MIMO mode of operation and has 100 beams formed during a first period of time is assigned more time slots in the data transmission schedule than cable modem 2 which is connected to wireless base station 2 which is operating in MIMO mode of operation and has 50 beams formed during the first period of time).

Method Embodiment 9. The communications method of Method Embodiment 4, wherein the wireless base station MIMO information further includes: wireless base station beam information, said wireless base station beam information indicating a number of beams formed at each individual wireless base station connected to one of the plurality of cable modems during a period of time; and wherein said determining, at the CMTS, a data transmission schedule for transmitting data to a plurality of cable modems connected to the CMTS based on the received wireless base station MIMO information includes: determining the data transmission schedule based on the number of beams formed at each of the individual wireless base stations connected to one of the plurality of cable modems during a period of time in addition to said number of antennas at each individual wireless base station connected to one of the plurality of cable modems.

Method Embodiment 10. The communications method of Method Embodiment 3, further comprising: determining, by the CMTS, a data transmission latency between the CMTS and each of the individual wireless base stations connected to one of the plurality of cable modems connected to the CMTS.

Method Embodiment 10A. The communications method of Method Embodiment 10, wherein said determining, by the CMTS, a data transmission latency between the CMTS and each individual wireless base station connected to one of the plurality of cable modems connected to the CMTS includes: (i) sending a ping message to each of said individual wireless base stations, and (ii) receiving a message back from each of the individual wireless base stations with a data transmission latency value determined by the individual wireless base station indicating the data transmission latency between the CMTS and the individual wireless base station.

Method Embodiment 11. The communications method of Method Embodiment 10, wherein the data transmission schedule for transmitting data to a plurality of cable modems connected to the CMTS is also based on said determined data transmission latency between the CMTS and each of said individual wireless base stations in addition to said number of antennas at each individual wireless base station connected to one of the plurality of cable modems.

Method Embodiment 11A. The communications method of Method Embodiment 10, wherein the determining, at the CMTS, a data transmission schedule for transmitting data to a plurality of cable modems connected to the CMTS based on the received wireless base station MIMO information further incudes: basing said data transmission schedule on said determined data transmission latency between the CMTS and each of the said individual wireless base stations in addition to said number of antennas at each individual wireless base station connected to one of the plurality of cable modems.

Method Embodiment 12. The communications method of Method Embodiment 1, further comprising: determining, by the CMTS, a data transmission latency between the CMTS and each of the individual wireless base stations connected to one of the plurality of cable modems connected to the CMTS; wherein the wireless base station MIMO information includes: wireless base station beam information, said wireless base station beam information indicating a number of beams formed at each individual wireless base station connected to one of the plurality of cable modems during a period of time; and wherein the data transmission schedule for transmitting data to a plurality of cable modems connected to the CMTS is also based on said determined data transmission latency between the CMTS and each of said individual wireless base stations in addition to said number of beams formed at each individual wireless base station connected to one of the plurality of cable modems during the period of time.

Method Embodiment 12A. The communications method of Method Embodiment 3, further comprising: determining, by the CMTS, a data transmission latency between the CMTS and each of the individual wireless base stations connected to one of the plurality of cable modems connected to the CMTS; wherein the wireless base station MIMO information also includes: wireless base station beam information, said wireless base station beam information indicating a number of beams formed at each individual wireless base station connected to one of the plurality of cable modems during a period of time; and wherein the data transmission schedule for transmitting data to a plurality of cable modems connected to the CMTS is based on said determined data transmission latency between the CMTS and each of said individual wireless base stations in addition to said number of beams formed at each individual wireless base station connected to one of the plurality of cable modems during the period of time and said number of antennas at each individual wireless base station connected to one of the plurality of cable modems.

Method Embodiment 13. The communications method of Method Embodiment 1, further comprising: generating, at each individual wireless base station, connected to one of the plurality of cable modems a MIMO information report; and transmitting, by each of the individual wireless base stations, said generated MIMO information report to the CMTS via the cable modem to which the individual wireless base station is connected (e.g., by sending a MIMO information report message or the MIMO information report included in another message sent to the CMTS).

Method Embodiment 14. The communications method of Method Embodiment 13, wherein each of the MIMO information reports includes the number of antennas at the individual wireless base station and the number of beams formed by the individual wireless base station during a period of time.

Method Embodiment 15. The communications method of Method Embodiment 1, further comprising: distributing data stored at the CMTS to the plurality of cable modems connected to the CMTS using the determined data transmission schedule.

Method Embodiment 15B. The communications method of Method Embodiment 15, wherein said distributing data stored at the CMTS to the plurality of cable modems connected to the CMTS using the determined data transmission schedule includes: (i) identifying one or more time slots during a data transmission scheduling cycle during which data is to be transmitted to each of the cable modems connected to the CMTS, (ii) retrieving from CMTS storage an amount of downlink data for each cable modem, and (iii) transmitting the amount of downlink data retrieved from the CMTS storage for each cable modem during the one or more time slots identified for each cable modem connected to the CMTS.

Method Embodiment 15C. The communications method of Method Embodiment 15B, wherein said data transmission scheduling cycle comprises a set of N time slots, N being an integer greater than one.

Method Embodiment 15D. The communications method of Method Embodiment 15C, wherein each of the N time slots of the set of N time slots is assigned by the CMTS to one of the plurality of cable modems as part of determining at the CMTS, a data transmission schedule for transmitting data to a plurality of cable modems connected to the CMTS based on the received wireless base station MIMO information; and wherein data is distributed, by the CMTS, to the cable modems connected to the CMTS during the data transmission scheduling cycle with each of the N time slots being used to transmit data to an assigned cable modem in accordance with the determined data transmission schedule for the data transmission scheduling cycle.

Method Embodiment 16. The communications method of Method Embodiment 2, wherein the data transmission schedule is a time divided data transmission schedule including a plurality of time slots.

Method Embodiment 17. The communications method of Method Embodiment 3, wherein the data transmission schedule includes a set of N time slots for a first time period during which data will be transmitted from the CMTS to the cable modems connected to the CMTS, said first time period being a first data transmission scheduling cycle, N being a positive integer greater than one.

Method Embodiment 18. The communications method of Method Embodiment 1, wherein said receiving, at the CMTS, wireless base station multiple input multiple output (MIMO) information includes: receiving from at least two of the plurality of cable modems connected to the cable modem termination system a wireless base station report, each of said wireless base station reports including wireless base station MIMO information for a wireless base station connected to the cable modem from which it is received by the CMTS.

Method Embodiment 18A. The communications method of Method Embodiment 18, wherein said at least two of the plurality of cable modems connected to the CMTS include a first cable modem connected to a first wireless base station and a second cable modem connected to a second wireless base station.

Method Embodiment 18B. The communications method of Method Embodiment 18A, wherein receiving from at least two of the plurality of cable modems connected to the CMTS a wireless base station report includes: receiving a first wireless base station report from a first cable modem connected to a first wireless base station operating in a massive MIMO mode of operation; and receiving a second wireless base station report from a second cable modem connected to a second wireless base station operating in a massive MIMO mode of operation.

Method Embodiment 18C. The communications method of Method Embodiment 18B, wherein the first wireless base station report was generated by the first wireless base station; wherein the first wireless base station transmitted the first wireless base station report to the first cable modem for transmission to the CMTS; wherein the second wireless base station report was generated by the second wireless base station; wherein the second wireless base station transmitted the second wireless base station report to the second cable modem for transmission to the CMTS.

Method Embodiment 18D. The communications method of Method Embodiment 18C, wherein the first wireless base station report includes: (i) first wireless base station MIMO information for the first wireless base station, and (ii) a first wireless base station identifier, said first wireless base station identifier identifying the first wireless base station as the wireless base station to which the first wireless base station report corresponds; and wherein the second wireless base station report includes: (i) second wireless base station MIMO information for the second wireless base station, and (ii) a second wireless base station identifier, said second wireless base station identifier identifying the second wireless base station as the wireless base station to which the second wireless base station report corresponds; and wherein said first wireless base station MIMO information and said second wireless base station MIMO information are part of said wireless base station MIMO information received by the CMTS.

Method Embodiment 18E. The communications method of Method Embodiment 18D, wherein the wireless base station MIMO information received by the CMTS includes the first wireless base station MIMO information and the second wireless base station MIMO information.

Method Embodiment 18F. The communications method of Method Embodiment 18E, wherein the first wireless base station MIMO information includes the number of antennas at the first wireless base station; and wherein the second wireless base station MIMO information includes the number of antennas at the second wireless base station.

Method Embodiment 18G. The communications method of Method Embodiment 18F, wherein the first wireless base station MIMO information further includes an average number of beams formed by the first wireless base station during a first reporting time period; and wherein the second wireless base station MIMO information further includes an average number of beams formed by the second wireless base station during a second reporting time period.

Method Embodiment 18H. The communications method of Method Embodiment 18G, wherein the first reporting time period and the second reporting time period are for the same length of time.

Method Embodiment 19. The communications method of Method Embodiment 1, wherein the CMTS receives the wireless base station multiple input multiple output (MIMO) information from a plurality of wireless base stations operating in a MIMO mode of operation, each of said wireless base station being connected to the CMTS via a different cable modem; wherein the cable modems are connected to the CMTS via a cable network; and wherein the wireless base stations are CBSDs operating in a CBRS network.

Method Embodiment 20. The communications method of Method Embodiment 1, further comprising: receiving, at the CMTS, updated wireless base station multiple input multiple output (MIMO) information (e.g., an updated number of beams formed by each individual wireless base station since the prior MIMO information was provided by the individual wireless base stations); and dynamically determining, at the CMTS, an updated data transmission schedule for transmitting data to the plurality of cable modems connected to the CMTS based on the received updated wireless base station MIMO information (e.g., dynamically increasing or decreasing the number of time slots assigned to one or more of the plurality of cable modems in a data transmission schedule cycle based on the updated MIMO information, e.g., increasing the number of time slots assigned to a cable modem connected to a wireless base station whose number of formed beams in the updated MIMO information is higher than the number of beams formed in original received MIMO information, and/or in comparison to other cable modems connected to other wireless base stations).

Method Embodiment 21. The communications method of Method Embodiment 20, further comprising: transmitting from the CMTS to the plurality of cable modems connected to the CMTS data in accordance with the determined updated data transmission schedule.

Method Embodiment 22. The communications method of Method Embodiment 1, further comprising: determining the data transmission schedule for transmitting data to the plurality of cable modems based upon data transmission latencies between the CMTS and each of the plurality of wireless base stations connected to the plurality of cable modems in addition to the wireless base station MIMO information.

Method Embodiment 23. The communications method of Method Embodiment 22, wherein at least of the plurality of cable modems are connected to a wireless base station; wherein at least of the plurality of cable modems are not connected to a wireless base station; and wherein said determining, at the CMTS, a data transmission schedule for transmitting data to a plurality of cable modems connected to the CMTS based on received wireless base station MIMO information includes prioritizing transmitting data to the cable modems connected to wireless base station over cable modems that are not connected to wireless base station (e.g., scheduling more time slots for use in data transmission scheduling cycle to be used for cable modems connected to wireless base stations than to cable modems that are not connected to wireless base station).

Method Embodiment 24. The communications method of Method Embodiment 1, wherein the wireless base station MIMO information includes timing information for each individual wireless base station connected to a cable modem, the timing information indicating when, e.g., a time, time period or time window, during which each wireless base station requests receipt of the data from the CMTS.

List of Exemplary Numbered System Embodiments

System Embodiment 1. A communications system comprising: a cable modem termination system, said cable modem termination system (CMTS) including: a memory, and a first processor that controls the CMTS to perform the following operations: receiving wireless base station multiple input multiple output (MIMO) information; and determining a data transmission schedule for transmitting data to a plurality of cable modems connected to the CMTS based on the received wireless base station MIMO information.

System Embodiment 2. The communications system of System Embodiment 1, wherein the first processor further controls the CMTS to perform the additional operation of: transmitting from the CMTS to the plurality of cable modems connected to the CMTS data in accordance with the determined data transmission schedule.

System Embodiment 3. The communications system of System Embodiment 1, wherein the wireless base station MIMO information includes: wireless base station antenna information, said wireless base station antenna information indicating a number of antennas at each individual wireless base station connected to one of the plurality of cable modems.

System Embodiment 4. The communications system of System Embodiment 3, wherein said determining a data transmission schedule for transmitting data to a plurality of cable modems connected to the CMTS based on the received wireless base station MIMO information includes: determining the data transmission schedule based on the number of antennas at each of the individual wireless base stations connected to one of the plurality of cable modems.

System Embodiment 5. The communications system of System Embodiment 4, wherein cable modems connected to wireless base stations with a higher number of antennas are assigned more time slots in the data transmission schedule than cable modems connected to wireless base stations with a lesser number of antennas (e.g., cable modem 1 is connected to wireless base station 1 which is operating in MIMO mode of operation and has 16 antennas is assigned more time slots in the data transmission schedule than cable modem 2 which is connected to wireless base station 2 which is operating in MIMO mode of operation and has 4 antennas).

System Embodiment 5A. The communications system of System Embodiment 4, wherein each data schedule cycle of the data transmission schedule includes a plurality of time slots, the number of time slots assigned to each of the plurality of cable modems being proportional to the number of antennas at the individual wireless base station to which the cable modem is connected.

System Embodiment 5B. The communications system of System Embodiment 3, wherein said determining a data transmission schedule for transmitting data to a plurality of cable modems connected to the CMTS based on the received wireless base station MIMO information includes: determining a data transmission schedule that includes scheduling a larger number of time slots in a data transmission schedule cycle for transmitting data to a first cable modem than for transmitting data to a second cable modem, said first cable modem providing services to a first wireless base station, said second cable modem providing services to a second wireless base station, said first wireless base station having more antennas than said second wireless base station.

System Embodiment 6. The communications system of System Embodiment 1, wherein the wireless base station MIMO information includes: wireless base station beam information, said wireless base station beam information indicating a number of beams formed at each individual wireless base station connected to one of the plurality of cable modems during a period of time.

System Embodiment 6A. The communications system of System Embodiment 6, wherein the period of time is one of the following: (i) a period of time specified by the CMTS, (ii) a period of time based on a CMTS downlink data transmission scheduling cycle, (iii) a period of time based on each individual wireless base station's downlink data transmission scheduling cycle, and (iv) a period of time included with an indication of the number of beams formed at an individual wireless base station during said period of time.

System Embodiment 7. The communications system of System Embodiment 6, wherein said determining a data transmission schedule for transmitting data to a plurality of cable modems connected to the CMTS based on the received wireless base station MIMO information includes: determining the data transmission schedule based on the number of beams formed during the period of time at each of the individual wireless base stations connected to one of the plurality of cable modems.

System Embodiment 8. The communications system of System Embodiment 7, wherein cable modems connected to wireless base stations with a higher number of beams are assigned more time slots in the data transmission schedule than cable modems connected to wireless base stations with a lesser number of beams (e.g., cable modem 1 is connected to wireless base station 1 which is operating in MIMO mode of operation and has 100 beams formed during a first period of time is assigned more time slots in the data transmission schedule than cable modem 2 which is connected to wireless base station 2 which is operating in MIMO mode of operation and has 50 beams formed during the first period of time).

System Embodiment 9. The communications system of System Embodiment 4, wherein the wireless base station MIMO information further includes: wireless base station beam information, said wireless base station beam information indicating a number of beams formed at each individual wireless base station connected to one of the plurality of cable modems during a period of time; and wherein said determining a data transmission schedule for transmitting data to a plurality of cable modems connected to the CMTS based on the received wireless base station MIMO information includes: determining the data transmission schedule based on the number of beams formed at each of the individual wireless base stations connected to one of the plurality of cable modems during a period of time in addition to said number of antennas at each individual wireless base station connected to one of the plurality of cable modems.

System Embodiment 10. The communications system of System Embodiment 3, wherein the first processor further controls the CMTS to perform the additional operation of: determining a data transmission latency between the CMTS and each of the individual wireless base stations connected to one of the plurality of cable modems connected to the CMTS.

System Embodiment 10A. The communications system of System Embodiment 10, wherein said determining, by the CMTS, a data transmission latency between the CMTS and each individual wireless base station connected to one of the plurality of cable modems connected to the CMTS includes: (i) sending a ping message to each of said individual wireless base stations, and (ii) receiving a message back from each of the individual wireless base stations with a data transmission latency value determined by the individual wireless base station indicating the data transmission latency between the CMTS and the individual wireless base station.

System Embodiment 11. The communications system of System Embodiment 10, wherein the data transmission schedule for transmitting data to a plurality of cable modems connected to the CMTS is also based on said determined data transmission latency between the CMTS and each of said individual wireless base stations in addition to said number of antennas at each individual wireless base station connected to one of the plurality of cable modems.

System Embodiment 11A. The communications system of System Embodiment 10, wherein the determining a data transmission schedule for transmitting data to a plurality of cable modems connected to the CMTS based on the received wireless base station MIMO information further incudes: basing said data transmission schedule on said determined data transmission latency between the CMTS and each of the said individual wireless base stations in addition to said number of antennas at each individual wireless base station connected to one of the plurality of cable modems.

System Embodiment 12. The communications system of System Embodiment 1, wherein the first processor further controls the CMTS to perform the additional operation of: determining, by the CMTS, a data transmission latency between the CMTS and each of the individual wireless base stations connected to one of the plurality of cable modems connected to the CMTS; wherein the wireless base station MIMO information includes: wireless base station beam information, said wireless base station beam information indicating a number of beams formed at each individual wireless base station connected to one of the plurality of cable modems during a period of time; and wherein the data transmission schedule for transmitting data to a plurality of cable modems connected to the CMTS is based on the following: said determined data transmission latency between the CMTS and each of said individual wireless base stations in addition to the number of beams formed by each individual wireless base station connected to one of the plurality of cable modems during the period of time.

System Embodiment 12A. The communications system of System Embodiment 3, wherein the first processor further controls the CMTS to perform the additional operation of: determining, by the CMTS, a data transmission latency between the CMTS and each of the individual wireless base stations connected to one of the plurality of cable modems connected to the CMTS; wherein the wireless base station MIMO information includes: wireless base station beam information, said wireless base station beam information indicating a number of beams formed at each individual wireless base station connected to one of the plurality of cable modems during a period of time; and wherein the data transmission schedule for transmitting data to a plurality of cable modems connected to the CMTS is based on the following: (i) said determined data transmission latency between the CMTS and each of said individual wireless base stations, (ii) the number of antennas at each individual wireless base station connected to one of the plurality of cable modems, and (iii) the number of beams formed by each individual wireless base station connected to one of the plurality of cable modems during the period of time.

System Embodiment 13. The communications system of System Embodiment 1, wherein a processor included in each of the individual wireless base stations controls the individual wireless base station in which the processor is included to perform the operation of: generating, at each individual wireless base station, connected to one of the plurality of cable modems a MIMO information report; and transmitting, by each of the individual wireless base stations, said generated MIMO information report to the CMTS via the cable modem to which the individual wireless base station is connected (e.g., by sending a MIMO information report message or the MIMO information report included in another message sent to the CMTS).

System Embodiment 14. The communications system of System Embodiment 13, wherein each of the MIMO information reports includes the number of antennas at the individual wireless base station and the number of beams formed by the individual wireless base station during a period of time.

System Embodiment 15. The communications system of System Embodiment 1, wherein the first processor further controls the CMTS to perform the additional operation of: distributing data stored at the CMTS to the plurality of cable modems connected to the CMTS using the determined data transmission schedule.

System Embodiment 15B. The communications system of System Embodiment 15, wherein said distributing data stored at the CMTS to the plurality of cable modems connected to the CMTS using the determined data transmission schedule includes: (i) identifying one or more time slots during a data transmission scheduling cycle during which data is to be transmitted to each of the cable modems connected to the CMTS, (ii) retrieving from CMTS storage an amount of downlink data for each cable modem, and (iii) transmitting the amount of downlink data retrieved from the CMTS storage for each cable modem during the one or more time slots identified for each cable modem connected to the CMTS.

System Embodiment 15C. The communications system of System Embodiment 15B, wherein said data transmission scheduling cycle comprises a set of N time slots, N being an integer greater than one.

System Embodiment 15D. The communications system of System Embodiment 15C, wherein each of the N time slots of the set of N time slots is assigned by the CMTS to one of the plurality of cable modems as part of determining at the CMTS, a data transmission schedule for transmitting data to a plurality of cable modems connected to the CMTS based on the received wireless base station MIMO information; and wherein data is distributed, by the CMTS, to the cable modems connected to the CMTS during the data transmission scheduling cycle with each of the N time slots being used to transmit data to an assigned cable modem in accordance with the determined data transmission schedule for the data transmission scheduling cycle.

System Embodiment 16. The communications system of System Embodiment 2, wherein the data transmission schedule is a time divided data transmission schedule including a plurality of time slots.

System Embodiment 17. The communications system of System Embodiment 3, wherein the data transmission schedule includes a set of N time slots for a first time period during which data will be transmitted from the CMTS to the cable modems connected to the CMTS, said first time period being a first data transmission scheduling cycle, N being a positive integer greater than one.

System Embodiment 18. The communications system of System Embodiment 1, wherein said receiving, at a CMTS, wireless base station multiple input multiple output (MIMO) information includes: receiving from at least two of the plurality of cable modems connected to the CMTS a wireless base station report, each of said wireless base station reports including wireless base station MIMO information for a wireless base station connected to the cable modem from which it is received by the CMTS.

System Embodiment 18A. The communications system of System Embodiment 18, wherein said at least two of the plurality of cable modems connected to the CMTS include a first cable modem connected to a first wireless base station and a second cable modem connected to a second wireless base station.

System Embodiment 18B. The communications system of System Embodiment 18A, wherein receiving from at least two of the plurality of cable modems connected to the CMTS a wireless base station report includes:
  receiving a first wireless base station report from a first cable modem connected to a first wireless base station operating in a massive MIMO mode of operation; and receiving a second wireless base station report from a second cable modem connected to a second wireless base station operating in a massive MIMO mode of operation.

System Embodiment 18C. The communications system of System Embodiment 18B, wherein the first wireless base station report was generated by the first wireless base station; wherein the first wireless base station transmitted the first wireless base station report to the first cable modem for transmission to the CMTS; wherein the second wireless base station report was generated by the second wireless base station; wherein the second wireless base station transmitted the second wireless base station report to the second cable modem for transmission to the CMTS.

System Embodiment 18D. The communications system of System Embodiment 18C, wherein the first wireless base station report includes: (i) first wireless base station MIMO information for the first wireless base station, and (ii) a first wireless base station identifier, said first wireless base station identifier identifying the first wireless base station as the wireless base station to which the first wireless base station report corresponds; and wherein the second wireless base station report includes: (i) second wireless base station MIMO information for the second wireless base station, and (ii) a second wireless base station identifier, said second wireless base station identifier identifying the second wireless base station as the wireless base station to which the second wireless base station report corresponds; and wherein said first wireless base station MIMO information and said second wireless base station MIMO information are part of said wireless base station MIMO information received by the CMTS.

System Embodiment 18E. The communications system of System Embodiment 18D, wherein the wireless base station MIMO information received by the CMTS includes the first wireless base station MIMO information and the second wireless base station MIMO information.

System Embodiment 18F. The communications system of System Embodiment 18E, wherein the first wireless base station MIMO information includes the number of antennas at the first wireless base station; and wherein the second wireless base station MIMO information includes the number of antennas at the second wireless base station.

System Embodiment 18G. The communications system of System Embodiment 18F, wherein the first wireless base station MIMO information further includes an average number of beams formed by the first wireless base station during a first reporting time period; and wherein the second wireless base station MIMO information further includes an average number of beams formed by the second wireless base station during a second reporting time period.

System Embodiment 18H. The communication system of System Embodiment 18G, wherein the first reporting time period and the second reporting time period are for the same length of time.

System Embodiment 19. The communications system of System Embodiment 1, wherein the CMTS receives the wireless base station multiple input multiple output (MIMO) information from a plurality of wireless base stations operating in a MIMO mode of operation, each of said wireless base station being connected to the CMTS via a different cable modem; and wherein the cable modems are connected to the CMTS via a cable network; and wherein the wireless base stations are CBSDs operating in a CBRS network.

System Embodiment 20. The communications system of System Embodiment 1, wherein the first processor further controls the CMTS to perform the following additional operations: receiving, at CMTS, updated wireless base station multiple input multiple output (MIMO) information (e.g., an updated number of beams formed by each individual wireless base station since the prior MIMO information was provided by the individual wireless base stations); and dynamically determining, at the CMTS, an updated data transmission schedule for transmitting data to the plurality of cable modems connected to the CMTS based on the received updated wireless base station MIMO information (e.g., dynamically increasing or decreasing the number of time slots assigned to one or more of the plurality of cable modems in a data transmission schedule cycle based on the updated MIMO information, e.g., increasing the number of time slots assigned to a cable modem connected to a wireless base station whose number of formed beams in the updated MIMO information is higher than the number of beams formed in original received MIMO information, and/or in comparison to other cable modems connected to other wireless base stations).

System Embodiment 21. The communications system of System Embodiment 20, wherein the first processor further controls the CMTS to perform the following operation: transmitting from the CMTS to the plurality of cable modems connected to the CMTS data in accordance with the determined updated data transmission schedule.

System Embodiment 22. The communications system of System Embodiment 1, wherein the first processor further controls the CMTS to perform the following operation: determining the data transmission schedule for transmitting data to the plurality of cable modems based upon data transmission latencies between the CMTS and each of the plurality of wireless base stations connected to the plurality of cable modems in addition to the wireless base station MIMO information.

System Embodiment 23. The communications system of System Embodiment 22, wherein one or more of the plurality of cable modems are connected to a wireless base station; wherein one or more of the plurality of cable modems are not connected to a wireless base station; and wherein said determining, at the CMTS, a data transmission schedule for transmitting data to a plurality of cable modems connected to the CMTS based on received wireless base station MIMO information includes prioritizing transmitting data to the cable modems connected to wireless base station over cable modems that are not connected to wireless base station (e.g., scheduling more time slots for use in data transmission scheduling cycle to be used for cable modems connected to wireless base stations than to cable modems that are not connected to wireless base station).

System Embodiment 24. The communications system of System Embodiment 1, wherein the wireless base station MIMO information includes timing information for each individual wireless base station connected to a cable modem, the timing information indicating when, e.g., a time, time period or time window, during which each wireless base station requests receipt of the data from the CMTS.

List of Exemplary Numbered Non-Transitory Computer Readable Medium Embodiments

Non-Transitory Computer Readable Medium Embodiment 1

A non-transitory computer readable medium including a first set of computer executable instructions which when executed by a processor of a cable modem termination system (CMTS) cause the CMTS to perform the steps of: receiving, at a cable modem termination system (CMTS), wireless base station multiple input multiple output (MIMO) information; and determining, at the CMTS, a data transmission schedule for transmitting data to a plurality of cable modems connected to the CMTS based on the received wireless base station MIMO information.

Non-Transitory Computer Readable Medium Embodiment 2

The non-transitory computer readable medium of Non-transitory Computer Readable Medium Embodiment 1, wherein the first set of computer executable instructions which when executed by the processor of the CMTS further cause the CMTS to perform the additional steps of: transmitting from the CMTS to the plurality of cable modems connected to the CMTS data in accordance with the determined data transmission schedule.

Non-Transitory Computer Readable Medium Embodiment 3

The non-transitory computer readable medium of Non-transitory Computer Readable Medium Embodiment 1, wherein the wireless base station MIMO information includes: wireless base station antenna information, said wireless base station antenna information indicating a number of antennas at each individual wireless base station connected to one of the plurality of cable modems.

Non-Transitory Computer Readable Medium Embodiment 4

The non-transitory computer readable medium of Non-transitory Computer Readable Medium Embodiment 3, wherein said determining at the CMTS a data transmission schedule for transmitting data to a plurality of cable modems connected to the CMTS based on the received wireless base station MIMO information includes: determining the data transmission schedule based on the number of antennas at each of the individual wireless base stations connected to one of the plurality of cable modems.

The techniques of various embodiments may be implemented using software, hardware and/or a combination of software and hardware. Various embodiments are directed to apparatus, e.g., cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements. Various embodiments are also directed to methods, e.g., method of controlling and/or operating cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements. Various embodiments are also directed to machine, e.g., computer, readable medium, e.g., ROM, RAM, CDs, hard discs, etc. which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements or steps are implemented using hardware circuitry.

In various embodiments devices, e.g., cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements described herein are implemented using one or more components to perform the steps corresponding to one or more methods, for example, generating or creating buffers, implementing timers, connections, message reception, message transmission, powering on and off receivers, transmitters, and or transceivers, buffering data, flushing data from buffers, determining buffer sizes and amount of time for a buffer to fill to its capacity, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements are configured to perform the steps of the methods described as being performed by the cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements, with a processor which includes a component corresponding to each of the steps of the various described methods performed by the device in which the processor is included. In some but not all embodiments a device, e.g., cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above. Depending on the embodiment, the computer program product can, and sometimes does, include different code for each step to be performed. Thus, the computer program product may, and sometimes does, include code for each individual step of a method, e.g., a method of controlling a device, e.g., cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements, Session Management Function nodes/devices, subscriber devices, servers, nodes and/or elements. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method comprising:
   receiving, at a cable modem termination system (CMTS), wireless base station multiple input multiple output (MIMO) information;
   determining, at the CMTS, a data transmission schedule for transmitting data to a plurality of cable modems connected to the CMTS based on the received wireless base station MIMO information, said wireless base station MIMO information including wireless base station antenna information, said wireless base station antenna information indicating a number of antennas at each individual wireless base station connected to one of the plurality of cable modems; and

wherein said determining at the CMTS a data transmission schedule for transmitting data to a plurality of cable modems connected to the CMTS based on the received wireless base station MIMO information includes: determining that cable modems connected to wireless base stations with a higher number of antennas are assigned more time slots in the data transmission schedule than cable modems connected to wireless base stations with a lesser number of antennas.

2. The communications method of claim 1, further comprising:

transmitting from the CMTS to the plurality of cable modems connected to the CMTS data in accordance with the determined data transmission schedule.

3. A communications method comprising:

receiving, at a cable modem termination system (CMTS), wireless base station multiple input multiple output (MIMO) information; and determining, at the CMTS, a data transmission schedule for transmitting data to a plurality of cable modems connected to the CMTS based on the received wireless base station MIMO information, said wireless base station MIMO information including wireless base station beam information, said wireless base station beam information indicating a number of beams formed at each individual wireless base station connected to one of the plurality of cable modems during a period of time; and wherein said determining at the CMTS a data transmission schedule for transmitting data to a plurality of cable modems connected to the CMTS based on the received wireless base station MIMO information includes: determining the data transmission schedule based on the number of beams formed during the period of time at each of the individual wireless base stations connected to one of the plurality of cable modems.

4. The communications method of claim 3, wherein cable modems connected to wireless base stations with a higher number of beams are assigned more time slots in the data transmission schedule than cable modems connected to wireless base stations with a lesser number of beams.

5. The communications method of claim 3, wherein said determining at the CMTS a data transmission schedule for transmitting data to a plurality of cable modems connected to the CMTS based on the received wireless base station MIMO information further includes: determining the data transmission schedule also based on a number of antennas at each individual wireless base station connected to one of the plurality of cable modems.

6. A communications method comprising:

receiving, at a cable modem termination system (CMTS), wireless base station multiple input multiple output (MIMO) information, said wireless base station MIMO information including wireless base station antenna information, said wireless base station antenna information indicating a number of antennas at each individual wireless base station connected to one of the plurality of cable modems;

determining, by the CMTS, a data transmission latency between the CMTS and each of the individual wireless base stations connected to one of the plurality of cable modems connected to the CMTS; and determining, at the CMTS, a data transmission schedule for transmitting data to a plurality of cable modems connected to the CMTS based on the received wireless base station MIMO information.

7. The communications method of claim 6, wherein the data transmission schedule for transmitting data to a plurality of cable modems connected to the CMTS is also based on said determined data transmission latency between the CMTS and each of said individual wireless base stations in addition to said wireless base station MIMO information which includes said number of antennas at each individual wireless base station connected to one of the plurality of cable modems.

8. The communications method of claim 3, further comprising:

determining, by the CMTS, a data transmission latency between the CMTS and each of the individual wireless base stations connected to one of the plurality of cable modems connected to the CMTS; and wherein the data transmission schedule for transmitting data to a plurality of cable modems connected to the CMTS is also based on said determined data transmission latency between the CMTS and each of said individual wireless base stations in addition to said number of beams formed at each individual wireless base station connected to one of the plurality of cable modems during the period of time.

9. A communications system comprising:

a cable modem termination system (CMTS), said CMTS including:

a memory; and a first processor that controls the CMTS to perform the following operations:

receiving wireless base station multiple input multiple output (MIMO) information; and determining a data transmission schedule for transmitting data to a plurality of cable modems connected to the CMTS based on the received wireless base station MIMO information, said wireless base station MIMO information including wireless base station antenna information, said wireless base station antenna information indicating a number of antennas at each individual wireless base station connected to one of the plurality of cable modems; and wherein said determining at the CMTS a data transmission schedule for transmitting data to a plurality of cable modems connected to the CMTS based on the received wireless base station MIMO information includes: determining that cable modems connected to wireless base stations with a higher number of antennas are assigned more time slots in the data transmission schedule than cable modems connected to wireless base stations with a lesser number of antennas.

10. The communications system of claim 9, wherein the first processor further controls the CMTS to perform the additional operation of:

transmitting from the CMTS to the plurality of cable modems connected to the CMTS data in accordance with the determined data transmission schedule.

11. A communications system comprising:

a cable modem termination system (CMTS), said CMTS including:

memory; and a first processor that controls the CMTS to perform the following operations:

receiving wireless base station multiple input multiple output (MIMO) information; and determining a data transmission schedule for transmitting data to a plurality of cable modems connected to the CMTS based on the received wireless base station MIMO information;

wherein the wireless base station MIMO information includes: wireless base station beam information, said wireless base station beam information indicating a number of beams formed at each individual wireless base station connected to one of the plurality of cable modems during a period of time; and wherein said determining a data transmission schedule for transmitting data to a plurality of cable modems connected to the CMTS based on the received wireless base station MIMO information includes: determining the data transmission schedule based on the number of beams formed during the period of time at each of the individual wireless base stations connected to one of the plurality of cable modems.

12. A non-transitory computer readable medium including a first set of computer executable instructions which when executed by a processor of a cable modem termination system (CMTS) cause the CMTS to perform the steps of:

receiving, at the CMTS, wireless base station multiple input multiple output (MIMO) information;

determining, at the CMTS, a data transmission schedule for transmitting data to a plurality of cable modems connected to the CMTS based on the received wireless base station MIMO information, said wireless base station MIMO information including wireless base station antenna information, said wireless base station antenna information indicating a number of antennas at each individual wireless base station connected to one of the plurality of cable modems; and wherein said determining at the CMTS a data transmission schedule for transmitting data to a plurality of cable modems connected to the CMTS based on the received wireless base station MIMO information includes: determining that cable modems connected to wireless base stations with a higher number of antennas are assigned more time slots in the data transmission schedule than cable modems connected to wireless base stations with a lesser number of antennas.

13. A communications system comprising:

a cable modem termination system (CMTS), said CMTS including:

a memory; and a first processor that controls the CMTS to perform the following operations:

receiving wireless base station multiple input multiple output (MIMO) information, said wireless base station MIMO information including wireless base station antenna information, said wireless base station antenna information indicating a number of antennas at each individual wireless base station connected to one of the plurality of cable modems;

determining a data transmission latency between the CMTS and each of the individual wireless base stations connected to one of the plurality of cable modems connected to the CMTS; and determining a data transmission schedule for transmitting data to a plurality of cable modems connected to the CMTS based on the received wireless base station MIMO information.

14. The communications system of claim 13, wherein the data transmission schedule for transmitting data to a plurality of cable modems connected to the CMTS is also based on said determined data transmission latency between the CMTS and each of said individual wireless base stations in addition to said wireless base station MIMO information.

15. The communications system of claim 11, wherein the first processor further controls the CMTS to perform the following additional operation:

determining, by the CMTS, a data transmission latency between the CMTS and each of the individual wireless base stations connected to one of the plurality of cable modems connected to the CMTS; and wherein the data transmission schedule for transmitting data to a plurality of cable modems connected to the CMTS is also based on said determined data transmission latency between the CMTS and each of said individual wireless base stations in addition to said number of beams formed at each individual wireless base station connected to one of the plurality of cable modems during the period of time.

16. The communications method of claim 1, wherein each data schedule cycle of the data transmission schedule includes a plurality of time slots, the number of time slots assigned to each of the plurality of cable modems being proportional to the number of antennas at the individual wireless base station to which the cable modem is connected.

17. The communications method of claim 3, wherein said period of time is one of the following: (i) a period of time specified by the CMTS, (ii) a period of time based on a CMTS downlink data transmission scheduling cycle, (iii) a period of time based on each individual wireless base station's downlink data transmission scheduling cycle, and (iv) a period of time included with said wireless base station MIMO information indicating the number of beams formed at an individual wireless base station during said period of time.

18. The communications system of claim 9, wherein each data schedule cycle of the data transmission schedule includes a plurality of time slots, the number of time slots assigned to each of the plurality of cable modems being proportional to the number of antennas at the individual wireless base station to which the cable modem is connected.

19. The communications system of claim 11, wherein said period of time is one of the following: (i) a period of time specified by the CMTS, (ii) a period of time based on a CMTS downlink data transmission scheduling cycle, (iii) a period of time based on each individual wireless base station's downlink data transmission scheduling cycle, and (iv) a period of time included with said wireless base station MIMO information indicating the number of beams formed at an individual wireless base station during said period of time.

20. The communications method of claim 3, further comprising:

dynamically updating, at the CMTS, the data transmission schedule for transmitting data to the plurality of cable modems connected to the CMTS based on updated wireless base station beam information.

* * * * *